United States Patent
Asauchi

(10) Patent No.: US 8,429,437 B2
(45) Date of Patent: Apr. 23, 2013

(54) SYSTEM INCLUDING PLURALITY OF STORAGE DEVICES AND DATA TRANSMISSION METHOD FOR THE SAME

(75) Inventor: Noboru Asauchi, Yamagata (JP)

(73) Assignee: Seiko Epson Corporation, Tokyo (JP)

( * ) Notice: Subject to any disclaimer, the term of this patent is extended or adjusted under 35 U.S.C. 154(b) by 356 days.

(21) Appl. No.: 12/954,561

(22) Filed: Nov. 24, 2010

(65) Prior Publication Data

US 2011/0131441 A1 Jun. 2, 2011

(30) Foreign Application Priority Data

Nov. 27, 2009 (JP) ................................. 2009-269527

(51) Int. Cl.
*G06F 1/08* (2006.01)
(52) U.S. Cl.
USPC .................. 713/501; 713/322; 365/189.17
(58) Field of Classification Search .................. 713/322, 713/501; 365/189.17
See application file for complete search history.

(56) References Cited

U.S. PATENT DOCUMENTS

| | | | |
|---|---|---|---|
| 6,749,281 B2 | 6/2004 | Asauchi | |
| 7,370,221 B2 * | 5/2008 | Tang et al. | 713/501 |
| 8,296,597 B2 * | 10/2012 | Tu | 713/340 |
| 2008/0028249 A1 * | 1/2008 | Agrawal | 713/501 |
| 2009/0049314 A1 * | 2/2009 | Taha et al. | 713/300 |

FOREIGN PATENT DOCUMENTS

| JP | 2002-370383 A | 12/2002 |
|---|---|---|
| JP | 2004-299405 A | 10/2004 |

* cited by examiner

*Primary Examiner* — Thuan Du
(74) *Attorney, Agent, or Firm* — Kilpatrick Townsend & Stockton LLP

(57) ABSTRACT

A system includes a plurality of storage devices and a controller. The plurality of storage devices are bus-connected to one clock signal line and one data signal line connected to the controller. Each of the plurality of storage devices stores identification information in advance to distinguish the storage devices from each other. The controller transmits data using an identification information transmission period in which one storage device is selected from the plurality of storage devices by transmitting the identification information of the one storage device to the plurality of storage devices via the data signal line and a data transmission period in which the data is transmitted to the one selected storage device. A frequency of a clock signal during the identification information transmission period is set to be lower than a frequency of the clock signal during the data transmission period.

4 Claims, 25 Drawing Sheets

SYSTEM INCLUDING PLURALITY OF STORAGE DEVICES AND DATA TRANSMISSION METHOD FOR THE SAME

BACKGROUND

1. Technical Field

The present invention relates to a system including a plurality of storage devices, and more particularly, to a data transmission technique for the system.

2. Related Art

An ink container which is a detachable liquid container is generally mounted on an ink jet printing apparatus which is an example of a liquid ejecting apparatus. A storage device is installed in some ink containers. The storage device stores various kinds of information such as the amount of ink remaining in the ink container or the ink colors (JP-A-2002-370383 and JP-A-2004-299405). A control device installed in the printing apparatus communicates with the storage device of the ink container.

In the known technique, however, the reliability of communication between the control device installed in the printing apparatus and the storage device of the ink container is hardly taken into consideration. For example, a problem may arise in that the communication between the control device installed in the printing apparatus and the storage device of the ink container may fail due to the contact failure of an electric connection portion between the printing apparatus and the ink container. When the printing apparatus continues an operation in the communication failure state, a problem may arise where a fault occurs in the stored details of the storage device.

In general, it is desirable that the data transmission speed is as rapid as possible. For example, the data transmission speed can be made more rapid by increasing the clock frequency of data transmission. However, when the clock frequency is excessively increased, a problem may arise in that consumed current flowing in a data line is excessively increased. In an example according to the related art, little consideration was paid to the consumed current necessary for communication (data transmission) between the control device and the storage device. When the consumed current necessary for communication between the control device and the storage device is reduced, current capacity of a data transmission circuit can be reduced. Therefore, since the configuration of the circuit can be simplified, an advantage can be obtained so problems with heating or noise hardly occur. In an example according to the related art, however, the study regarding this point is not sufficiently conducted.

The above-mentioned problems occur not only in the printing apparatus but also in the system including a plurality of storage devices.

SUMMARY

An advantage of some aspects of the invention is that it provides a technique for accurate and high-speed data transmission in a system including a plurality of storage devices. Another advantage of some aspects of the invention is that it provides a technique for reducing consumed current when data are transmitted.

The following aspects or applications according to the invention can be realized.

Application 1

According to an aspect of the invention, there is provided a system including a plurality of storage devices and a controller. The plurality of storage devices are bus-connected to one clock signal line and one data signal line connected to the controller. Each of the plurality of storage devices stores identification information in advance to distinguish the storage devices from each other. The controller transmits data using (i) an identification information transmission period in which one storage device is selected from the plurality of storage devices by transmitting the identification information of the one storage device to the plurality of storage devices via the data signal line and (ii) a data transmission period in which the data is transmitted to the selected one storage device. A frequency of a clock signal during the identification information transmission period is set to be lower than a frequency of the clock signal during the data transmission period.

In the system, since the frequency of the clock signal during the identification information transmission period is set to be lower than the frequency of the clock signal during the data transmission period, it is possible to reduce the current consumption when the identification information is simultaneously transmitted to the plurality of storage devices. Moreover, since the clock signal with the higher frequency is used during the data transmission period, it is possible to transmit the data at a high speed.

Application 2

In the system described in Application 1, each storage device may set connection with the data signal line to a high impedance state during the data transmission period, when confirming that the identification information is not in accordance with each other during the identification information transmission period.

With such a configuration, the connection between the storage device to which the data is not transmitted and the data signal line is set to the high impedance state during the data transmission period, thereby reducing the current consumption during the data transmission period. Moreover, since only one storage device is connected to the data signal line, the capacity component (electrostatic capacity) of the data signal line is reduced, thereby realizing the data transmission at a high speed.

Application 3

In the system described in Application 2, each storage device may confirm whether the identification information is in accordance with each other bit by bit during the identification information transmission period and may set the connection with the data signal line to the high impedance state even during the subsequent identification information transmission period when confirming the identification information is not in accordance with each other.

With such a configuration, whether the identification information is in accordance with each other is confirmed sequentially bit by bit. When it is confirmed that the identification information in not in accordance with each other, the connection between the storage device and the data signal line is set to the high impedance state immediately, thereby quickly reducing the consumption of current by the data signal line.

Aspects of the invention can be realized in various forms. For example, the invention can be realized in the forms of: a substrate which can be connected to a liquid ejecting apparatus; a liquid container which can be mounted in a liquid ejecting apparatus; a method of receiving data to be written to a data storage unit from a host circuit; a system which includes a host circuit and a storage device detachably mounted with the host circuit; a liquid ejecting system; a computer program realizing the function of the method or the device; and a recordable medium which records the computer program. In the specification, the "recordable medium" refers to a tangible recordable medium such as a DVD or a hard disk.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the invention will be described in the following order.
A. Configuration of Printing System (see FIGS. 1 to 5)
B. First Embodiment (see FIGS. 6 to 11)
C. Second Embodiment (see FIGS. 12 to 25)
D. Modified Examples

A. CONFIGURATION OF PRINTING SYSTEM

Figure 1:
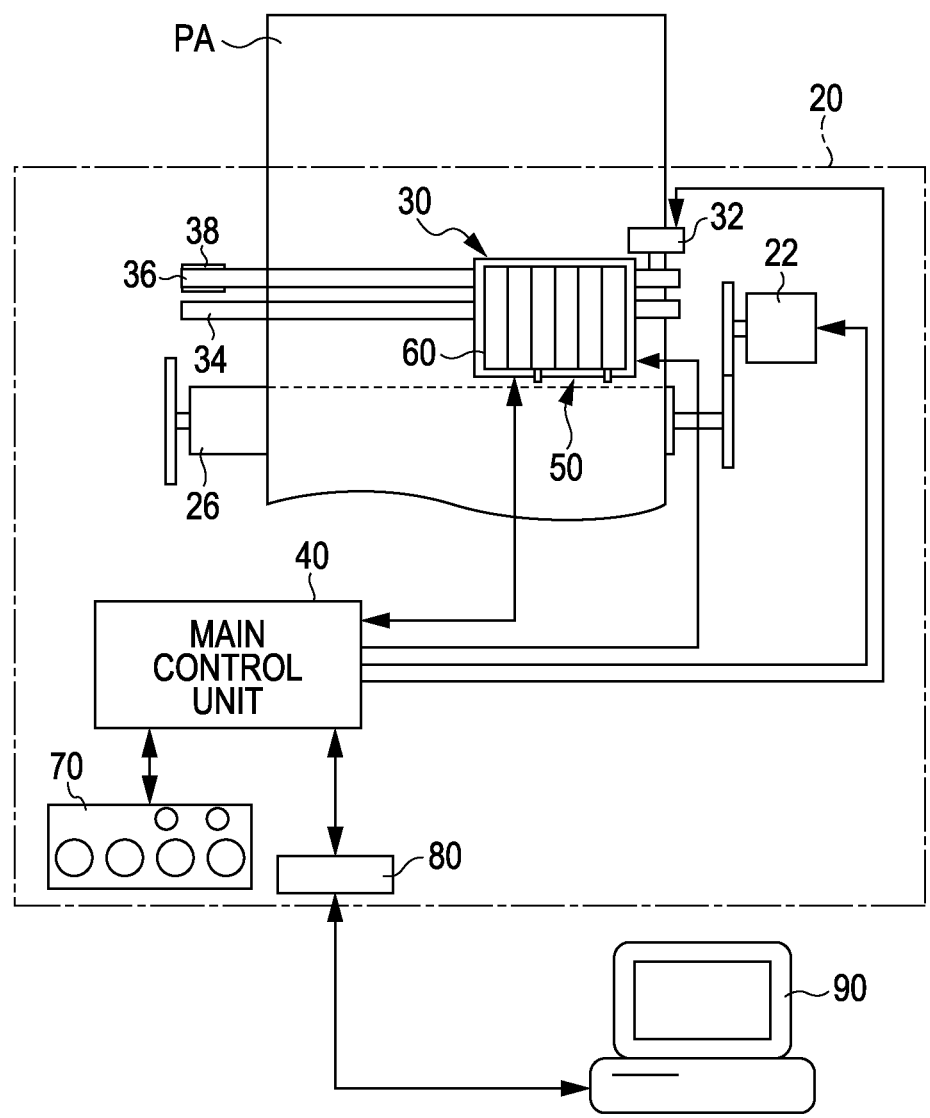
FIG. 1 is an explanatory diagram illustrating the overall configuration of a printing system.

FIG. 1 is an explanatory diagram illustrating the overall configuration of a printing system. The printing system includes a printer 20 serving as a printing apparatus and a computer 90. The printer 20 is connected to the computer 90 through a connector 80.

The printer 20 includes a sub-scanning transport mechanism, a main scanning transport mechanism, a head driving mechanism, and a main control unit 40. The sub-scanning transport mechanism includes a sheet-feeding transport motor 22 and a platen 26 and transports a sheet PA in a sub-scanning direction by transmitting rotation of the sheet-feeding transport motor 22 to the platen 26. The main scanning transport mechanism includes a carriage motor 32, a pulley 38, a driving belt 36 stretched tightly between the carriage motor 32 and the pulley 38, and a sliding shaft 34 installed in parallel with a shaft of the platen 26. The sliding shaft 34 slidably holds a carriage 30 fixed to the driving belt 36. When the rotation of the carriage motor 32 is transmitted to the carriage 30 through the driving belt 36, the carriage 30 reciprocates along the sliding shaft 34 in the axial direction (main scanning direction) of the platen 26. The head driving mechanism includes a print head unit 60 mounted on the carriage 30 and drives a print head to eject ink on the sheet PA. The main control unit 40 realizes a printing process by controlling the above-described mechanisms. The main control unit 40 receives a print work from a user via the computer 90, for example, controls the above-described mechanisms to perform a printing process based on the details of the received print work. The print head unit 60 includes a sub control unit 50 executing various kinds of control in cooperation with the main control unit 40. A plurality of ink cartridges can be detachably mounted on the print head unit 60, as described below. That is, the ink cartridges supplying ink to the print head are detachably mounted on the print head unit 60 by an operation of the user. The printer 20 includes an operation unit 70 used for the user to execute various settings on the printer or to confirm the status of the printer.

Figure 2A:
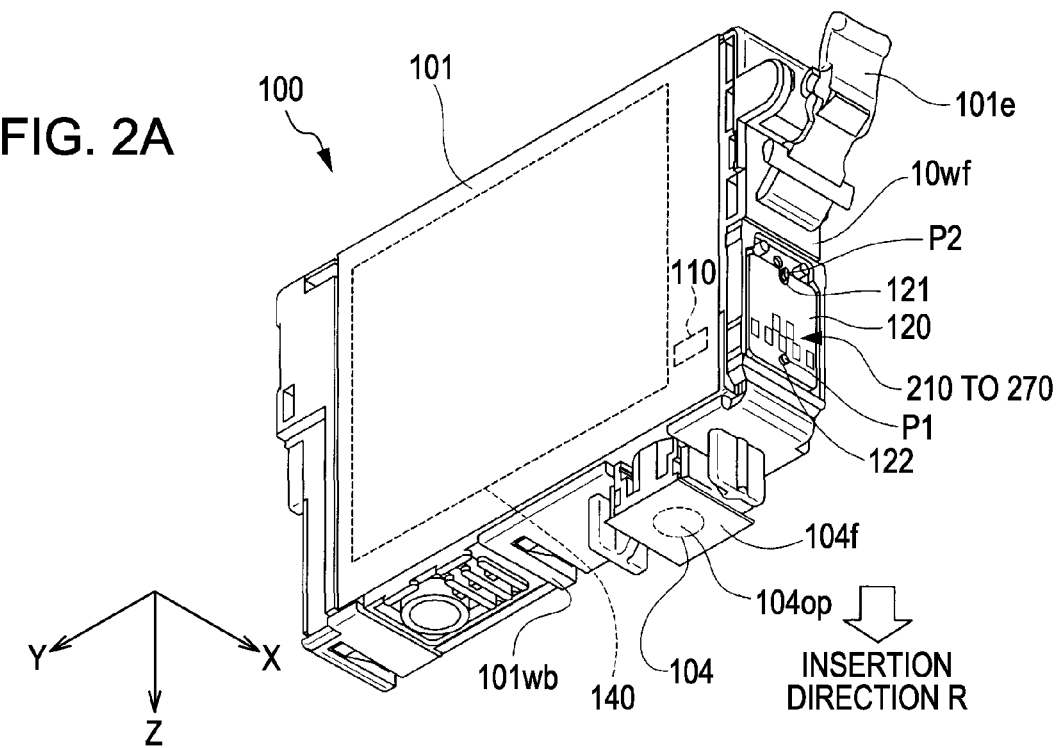
FIGS. 2A and 2B are perspective views illustrating the configuration of an ink cartridge according to embodiments of the invention.
Figure 2B:
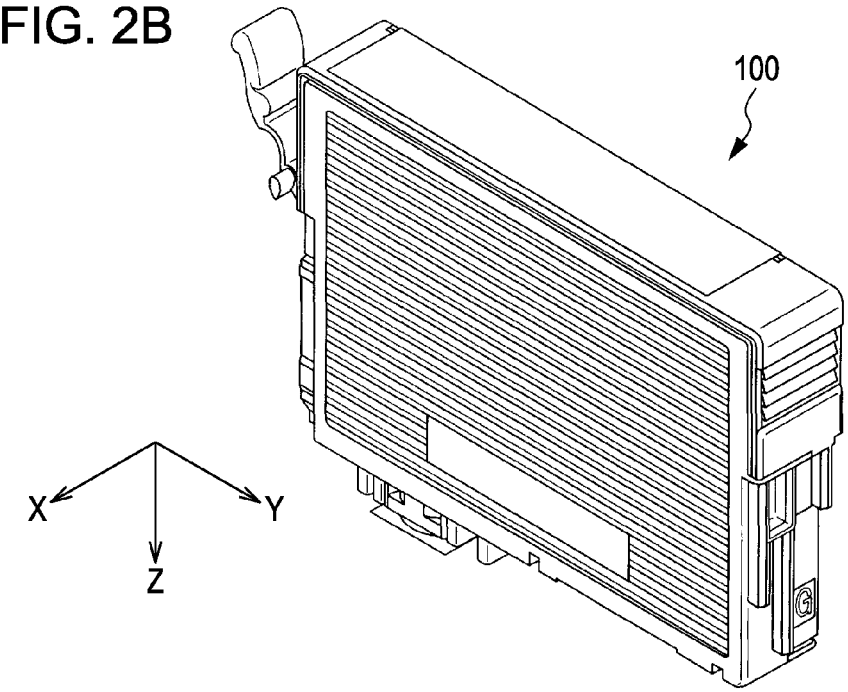

FIGS. 2A and 2B are perspective views illustrating the configuration of an ink cartridge according to the embodiments of the invention. The X direction in FIG. 2 indicates a thickness direction of an ink cartridge 100, the Y direction indicates a longitudinal direction (horizontal direction), and the Z direction indicates a height direction (vertical direction). A main body 101 of the ink cartridge 100 has a front wall 101wf and a bottom wall 101wb. The front wall 101wf intersects the bottom wall 101wb. In this embodiment, these walls 101wf and 101wb are perpendicular to each other. A print circuit substrate (hereinafter, simply referred to as a "circuit substrate" or a "substrate") 120 and an engagement protrusion 101e are disposed on the front wall 101wf of the main body 101. A plurality of terminals 210 to 270 are installed on the outer surface of the circuit substrate 120. An ink chamber 140 storing ink is formed inside the main body 101. A sensor 110 configured to detect the level of remaining ink is installed inside the main body 101. A sensor detecting the amount of ink using a piezoelectric element as a vibration element and a vibration detection element can be used as the sensor 110. An ink supply port 104 communicating with the ink chamber 140 is formed on the bottom surface of the main body 101. An opening 104op of the ink supply port 104 is sealed by a film 104f.

In the example of FIGS. 2A and 2B, one ink tank is configured as one ink cartridge, but a plurality of ink tanks may be configured as one ink cartridge.

Figure 3:
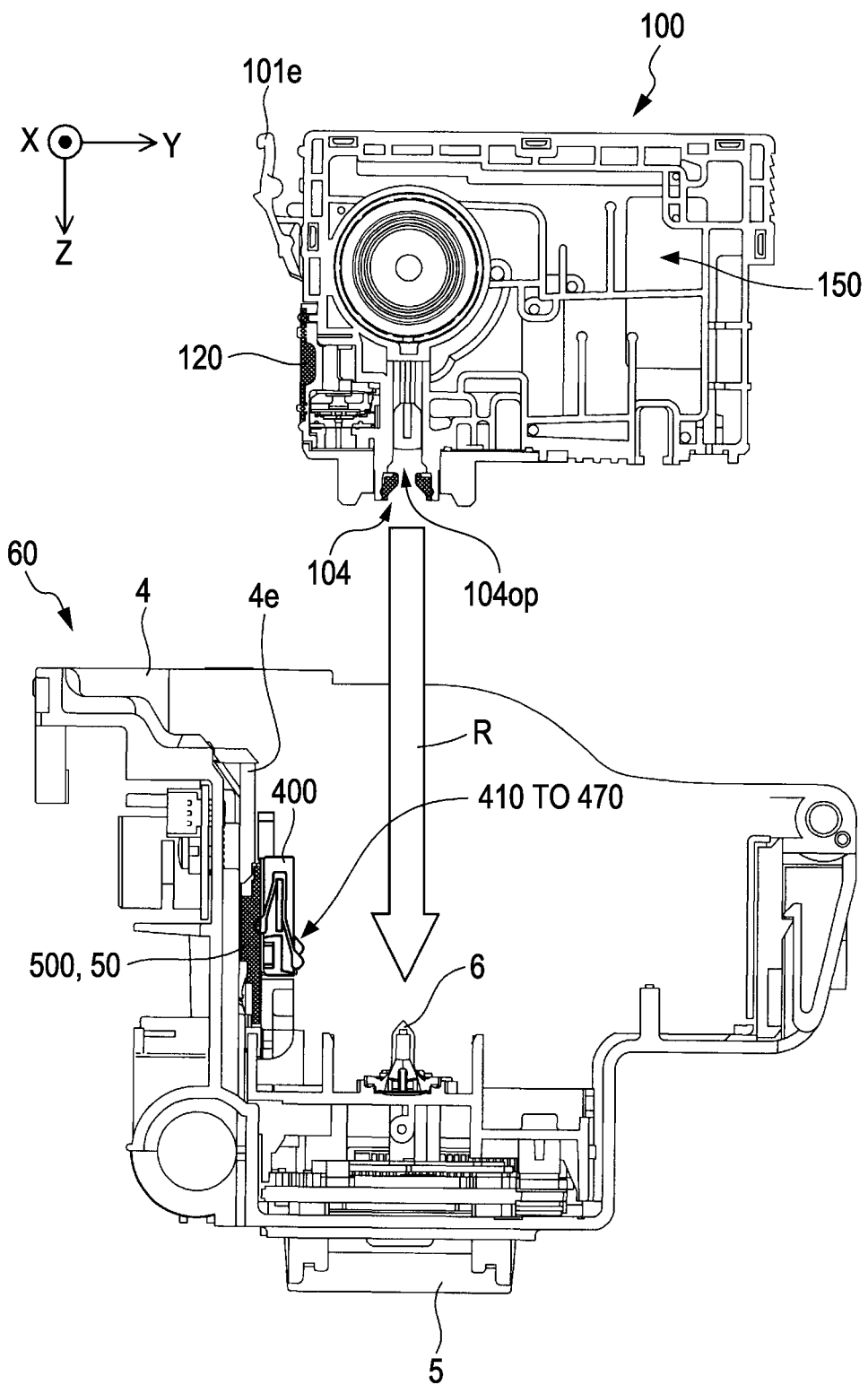
FIG. 3 is a diagram illustrating the configuration of a print head unit.

FIG. 3 is an explanatory diagram illustrating the ink cartridge 100 which is mounted on the print head unit 60. The print head unit 60 includes a holder 4, a connection mechanism 400, a print head 5, and a sub-control substrate 500. The connection mechanism 400 electrically connected to the terminals 210 to 270 of the circuit substrate 120 of the ink cartridge 100 and the sub-control unit 50 ("the carriage circuit 50") are packaged in the sub-control substrate 500. The holder 4 is configured to mount the plurality of ink cartridges 100 and is disposed on the print head 5. The connection mechanism 400 includes conductive connection terminals 410 to 470 electrically connecting the plurality of terminals 210 to 270 of the circuit substrate 120 of the ink cartridge 100 to the sub-control substrate 500. An ink supply needle 6 supplying ink from the ink cartridge 100 to the print head 5 is disposed on the print head 5.

The ink cartridge 100 is inserted in a +Z direction (insertion direction R) to be mounted on the holder 4. When the ink cartridge 100 is mounted on the holder 4, the engagement protrusion 101e of the ink cartridge 100 engages with an engagement port 4e of the holder 4, so that the ink cartridge 100 is prevented from unintentionally separating from the holder 4. When the ink cartridge 100 is pulled in an upward direction (−R direction) while the engagement protrusion 101e is pressed by a finger, the ink cartridge 100 can be taken out from the holder 4. The circuit substrate 120 mounted on the ink cartridge 100 is mounted on or detached from the printer 20, when the user mounts or detaches the ink cartridge 100. When the ink cartridge 100 is mounted on the printer 20, the circuit substrate 120 is electrically connected to the printer 20.

When the ink cartridge 100 is mounted on the print head unit 60, the ink supply needle 6 tears the film 104f (see FIGS. 2A and 2B) and is inserted into the ink supply port 104. As a consequence, the ink stored in the ink chamber 140 (see FIGS. 2A and 2B) can be supplied to the print head 5 of the printer 20 via the inks supply needle 6. The print head 5 includes a plurality of nozzles and a plurality of piezoelectric elements (piezo elements), and forms dots on the sheet PA by ejecting ink droplets from the respective nozzles in response to the voltage applied to the respective piezoelectric elements.

Figure 4A:
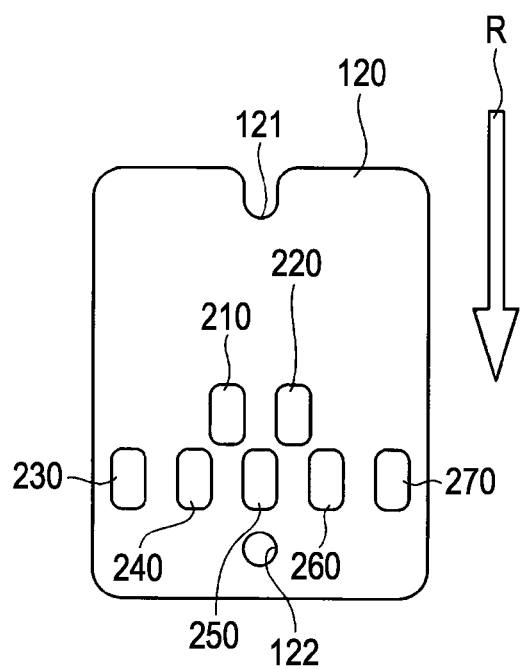
FIGS. 4A and 4B are diagrams illustrating the configuration of a substrate according to the embodiments of the invention.
Figure 4B:
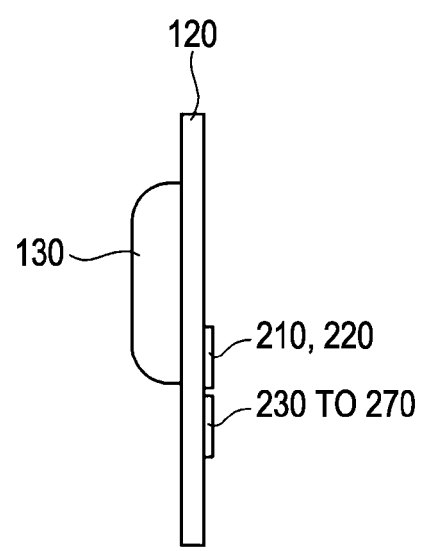

FIGS. 4A and 4B are diagrams illustrating the configuration of the circuit substrate 120. A hole 122 and a notch 121 used for fixing the circuit substrate 120 to the main body 101 of the ink cartridge are formed in the circuit substrate 120. On the other hand, two protrusions P1 and P2 are formed on the front wall 101wf (see FIGS. 2A and 2B) of the main body 101 of the ink cartridge. In the state where the circuit substrate 120 is mounted on the front wall 101wf, the protrusions P1 and P2 are inserted into the hole 122 and the notch 121, respectively. When the ink cartridge 100 is manufactured, the circuit substrate 120 is mounted on the front wall 101wf and then the leading ends of the protrusions P1 and P2 are crushed down so that the circuit substrate 120 is fixed to the front wall 101wf.

An arrow R in FIG. 4A indicates an insertion direction of the ink cartridge 100. As shown in FIG. 4B, the circuit substrate 120 includes a storage device 130 on the rear surface which is a rear surface of a surface connected to the printer 20 and includes a terminal group having seven terminals 210 to 270 on the front surface which is the surface connected to the printer 20. In this embodiment, the storage device 130 is a semiconductor storage device including a ferroelectric memory cell array. For example, the memory cell array stores various kinds of data, such as ink consumption amount data or the colors of ink, which are associated with the ink or the ink cartridge 100. The ink consumption amount data are data indicating a cumulative total of the amount of ink consumed upon performing a printing process or upon cleaning a head with respect to the ink stored in the ink cartridge. The ink consumption amount data may be data indicating the amount of consumed ink or may be data indicating the ratio of the amount of consumed ink to a reference ink amount determined in advance based on the amount of ink stored in the ink cartridge.

The terminals on the front surface of the circuit substrate 120 have a substantially rectangular shape and are arranged in two lines nearly perpendicular to the insertion direction R. Between the two terminal lines, the terminal line on the side of the insertion direction R (front end side of the insertion direction R), that is, the terminal line located on the lower side in FIG. 4A is referred to as a "lower terminal line" or a "lower line" and the terminal line on the opposite side of the insertion direction R, that is, the terminal line located on the upper side in FIG. 4A is referred to as an "upper terminal line" or an "upper line". Here, for the sake of convenience, the terms upper and lower are terms used for making description with reference to FIGS. 4A and 4B. The terminals 210 and 220 forming the upper terminal line and the terminals 230 to 270 forming the lower terminal line are alternately arranged so that the centers of the terminals are not lined in the insertion direction R. In particular, the terminals 240, 210, 250, 220, and 260 other than the terminals 230 and 270 disposed on both ends are arranged in a zigzag form.

The upper terminal line is formed by the ground terminal 210 and the supply terminal 220. The lower terminal line is formed by the first sensor driving terminal 230, the reset terminal 240, the clock terminal 250, the data terminal 260, and the second sensor driving terminal 270. The five terminals (the ground terminal 210, the supply terminal 220, the reset terminal 240, the clock terminal 250, and the data terminal 260) located in the middle of the terminal lines in right and left directions are connected to the storage device 130 via wiring pattern layers (not shown) on the front and rear surfaces of the circuit substrate 120 or via through-holes (not shown) formed in the circuit substrate 120. The two terminals (the first sensor driving terminal 230 and the second sensor driving terminal 270) located on both ends of the lower terminal line are connected to the sensor 110 (see FIGS. 2A and 2B) installed in the main body 101 of the ink cartridge.

On the circuit substrate 120, the five terminals 210, 220, and 240 to 260 connected to the storage device 130 and the two terminals 230 and 270 connected to the sensor 110 are positioned close to each other. Therefore, the connection terminals 410, 420, and 440 to 460 corresponding to the five terminals 210, 220, and 240 to 260 connected to the storage device 130 and the connection terminals 430 and 470 corresponding to the two terminals 230 and 270 connected to the sensor 110 are also positioned close to each other in the connection mechanism 400 (see FIG. 3) of the printer 20.

When the ink cartridge 100 is fixed to the holder 4, the terminals of the circuit substrate 120 come into contact with the connection terminals 410 to 470 of the connection mechanism 400 mounted on the holder 4 to be electrically connected to the connection terminals 410 to 470 of the connection mechanism 400. The connection terminals 410 to 470 of the connection mechanism 400 come into contact with a terminal group of the sub-control substrate 500 and are electrically connected thereto, and thus are electrically connected to the sub-control unit 50. That is, when the ink cartridge 100 is fixed to the holder 4, the terminals 210 to 270 of the circuit substrate are electrically connected to the sub-control unit 50.

Figure 5:
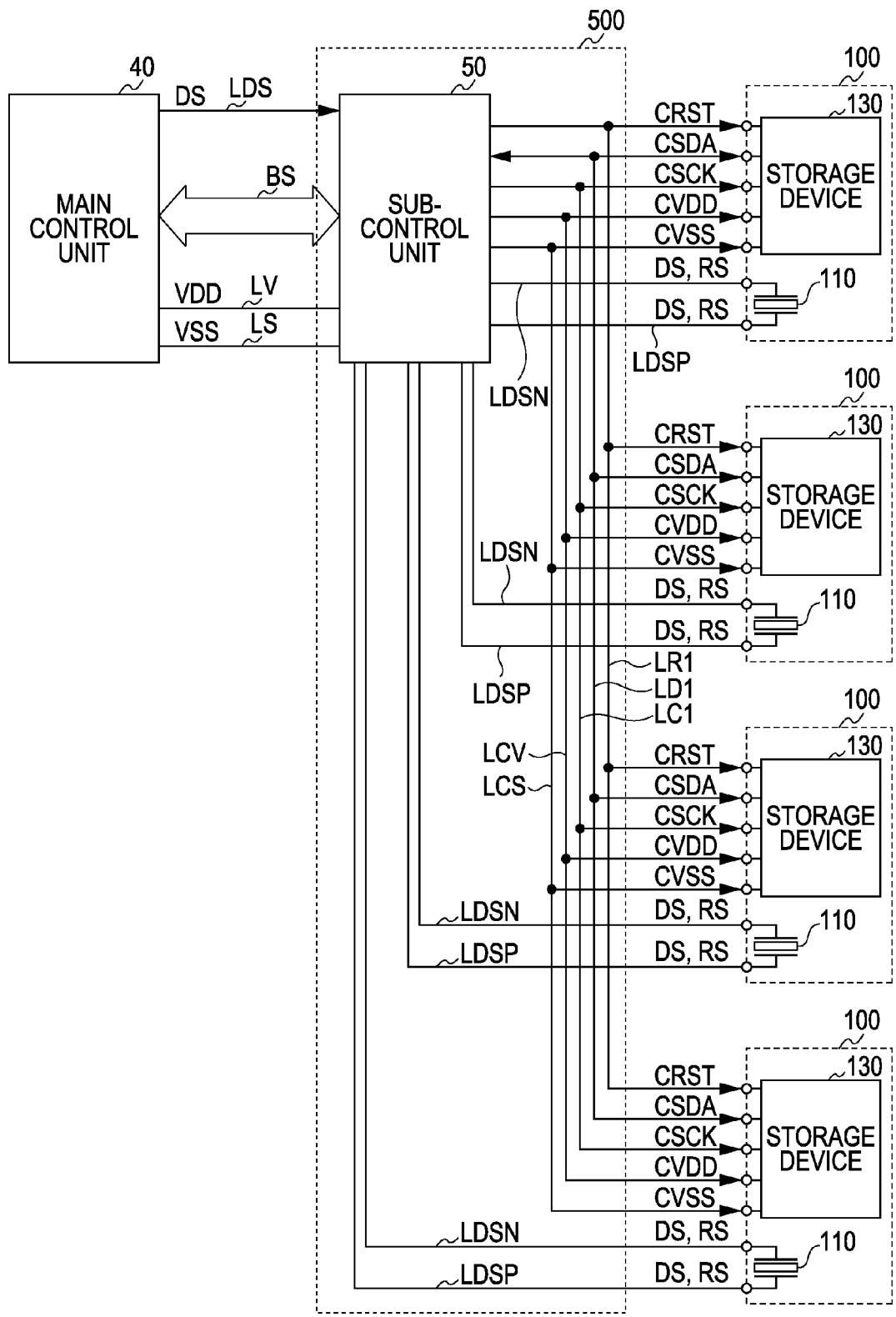
FIG. 5 is a first explanatory diagram illustrating the electric configuration of a printer.

FIG. 5 is a block diagram illustrating the circuit configuration of the main control unit 40, the sub-control unit 50, and the ink cartridge 100. The main control unit 40 and the sub-control unit 50 according to this embodiment correspond to a controller described in claims of the invention. Alternatively, the main control unit 40 and the sub-control unit 50 may be called a "host circuit". The storage device 130 and the control unit mounted on the ink cartridge 100 correspond to a "system including a plurality of storage devices and a controller".

The main control unit 40 and the sub-control unit 50 are electrically connected to each other by a plurality of wirings. The plurality of wirings includes a bus BS, a second supply line LV, a second ground line LS, and a third sensor driving signal line LDS. The bus BS is used to carry out data communication between the main control unit 40 and the sub-control unit 50. The second supply line LV and the second ground line LS are conductive lines that supply a supply voltage VDD and a ground potential VSS from the main control unit 40 to the sub-control unit 50, respectively. A potential with the same level as that of a supply voltage CVDD supplied to the storage device 130, that is, a potential of about 3.3 V, for example, for the ground potential VSS and a CVSS (0 V) is used as the supply voltage VDD. Of course, the potential level of the supply voltage VDD may be a different potential to correspond to the process generation of a logic IC of the sub-control unit 50. For example, 1.5 V or 2.0 V may be used. The third sensor driving signal line LDS is a conductive line that supplies the sensor driving signal DS to be applied to the sensor 110 from the main control unit 40 to the sub-control unit 50.

In this embodiment, the sub-control unit 50 writes data to the storage device 130 and reads the data from the storage device 130 by supplying power to the storage device 130 serving as a data storage unit and sending a command indicating the kind of access to the storage device 130.

Different 8-bit ID numbers (identification information) can be assigned to the storage devices 130 of the respective ink cartridges 100. The storage devices 130 of the plurality of ink cartridges 100 are connected in parallel (that is, bus-connected) to the wrings from the sub-control unit 50. When the sub-control unit 50 performs reading from or writing to the storage device 130 of a specific ink cartridge 100, as described below, the sub-control unit 50 transmits the ID numbers to all of the ink cartridges 100 to specify the ink cartridge 100 (that is, the storage device 130) to be accessed.

The lines electrically connecting the sub-control unit 50 to each ink cartridge 100 include a reset signal line LR1, a clock signal line LC1, a data signal line LD1, a first ground line LCS, a first supply line LCV, a first sensor driving signal line LDSN, and a second sensor driving signal line LDSP.

The reset signal line LR1 is a conductive line that supplies a reset signal CRST from the sub-control unit 50 to the storage device 130. When the reset signal CRST with a low level is supplied from the sub-control unit 50 to a memory control circuit of the storage device 130, the memory control circuit becomes an initial state (the inside of the memory control circuit is reset). For example, an address counter or a clock counter described below is reset to an initial value and a disable flag register 170 described below is set to 0. The clock signal line LC1 is a conductive line that supplies a clock signal CSCK from the sub-control unit 50 to the storage device 130. The data signal line LD1 is a conductive line that transmits a data signal CSDA bi-directionally between the sub-control unit 50 and the storage device 130. The data signal CSDA is transmitted and received in synchronization with the clock signal CSCK. For example, the data signal CSDA starts to be transmitted in synchronization with a descending edge of the clock signal CSCK and is received in synchronization with an ascending edge of the clock signal CSCK. The three wirings LR1, LC1, and LD1 connect the sub-control unit 50 to the plurality of ink cartridges 100. In other words, the plurality of storage devices 130 is bus-connected to the sub-control unit 50 via the three wirings LR1, LC1, and LD1. The reset signal CRST, the data signal CSDA, and the clock signal CSCK are all binary signals taking several values of a high level (for example, a CVDD potential (3.3 V)) or a low level (for example, a CVSS potential (0 V)). However, the potential level of the supply voltage CVDD may be a different potential to correspond to the process generation of the storage device 130. For example, 1.5 V or 2.0 V may be used. Hereinafter, a high level signal is indicated by "1" and a low level signal is indicated by "0".

The first ground line LCS is a conductive line that supplies a ground potential CVSS to the storage device 130. The first ground line LCS is electrically connected to the storage device 130 via the ground terminal 210 (see FIGS. 4A and 4B) of the circuit substrate 120. The ground potential CVSS is set to a low level (0 V), since the ground potential CVSS is connected to the ground potential VSS (=CVSS potential) supplied from the main control unit 40 to the sub-control unit 50 via the second ground line LS. The first supply line LCV is a conductive line that supplies the supply voltage CVDD, which serves as an operational voltage of the storage device 130, to the storage device 130. The first supply line LCV is connected to the storage device 130 via the supply terminal 220 of the circuit substrate 120. The plurality of storage devices 130 is bus-connected to the sub-control unit 50 through the first ground line LCS and the first supply line LCV.

The first sensor driving signal line LDSN and the second sensor driving signal line LDSP are conductive lines that apply driving voltages to the piezoelectric elements of the sensor 110 and also transmit the voltages generated by the piezoelectric effect of the piezoelectric elements after the application of the driving voltages to the sub-control unit 50 is stopped. The first sensor driving signal line LDSN and the second sensor driving signal line LDSP are a pair of wirings independent in each ink cartridge 100. The first sensor driving signal line LDSN is electrically connected to one electrode of the piezoelectric element of the sensor 110 via the first sensor driving terminal 230 (see FIGS. 4A and 4B). The second sensor driving signal line LDSP is electrically connected to the other electrode of the piezoelectric element of the sensor 110 via the second sensor driving terminal 270.

B. FIRST EMBODIMENT

Figure 6:
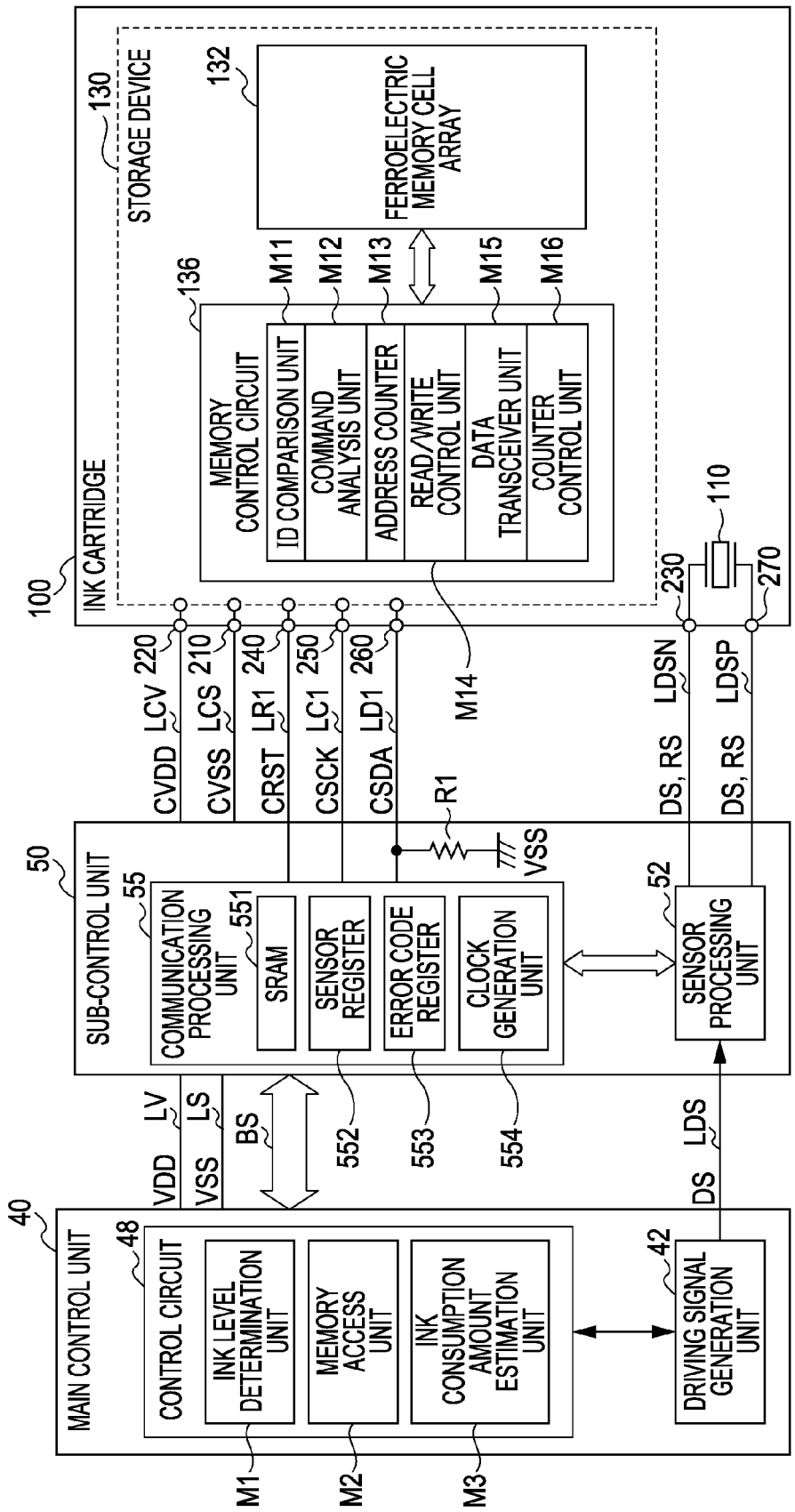
FIG. 6 is a second explanatory diagram illustrating the electric configuration of the printer.

FIG. 6 is a block diagram illustrating the functional configurations of the main control unit 40, the sub-control unit 50, and the ink cartridge 100 according to a first embodiment. The main control unit 40 includes a control circuit 48 and a driving signal generation circuit 42 and includes a ROM, a RAM, and an EEPROM (all of which are not shown). The ROM stores various programs to control the printer 20. The control circuit 48 includes a CPU (Central Processing Unit) and thus controls the printer 20 as a whole in cooperation with the memories such as the ROM, the RAM, and the EEPROM. The control circuit 48 includes, as functional blocks, an ink level determination unit M1, a memory access unit M2, and an ink consumption amount estimation unit M3.

The ink level determination unit M1 controls the sub-control unit 50 and the driving signal generation circuit 42 to drive the sensor 110 of the ink cartridge 100 and determines whether the amount of ink stored in the ink cartridge 100 is equal to or larger than a predetermined amount. The memory access unit M2 gains access to the storage device 130 of the ink cartridge 100 via the sub-control unit 50 to read information stored in the storage device 130 or updates the information stored in the storage device 130. The ink consumption amount estimation unit M3 counts ink dots ejected to a print sheet when the printer 20 performs a printing process and determines the amount of ink consumed in the printing process from the count value of the ink dots and the amount of ink consumed for every dot. The ink consumption amount estimation unit M3 also estimates the amount of ink consumed in the process of cleaning the head. Based on this amount of ink, the ink consumption amount estimation unit M3 counts a cumulative total of the estimated values of the ink consumption amount consumed from an ink cartridge 100 after the ink cartridge 100 is newly mounted on the printer 20.

The EEPROM of the main control unit 40 in advance stores data indicating the sensor driving signal DS for driving the sensor. The driving signal generation circuit 42 reads data indicating the waveform of the sensor driving signal DS from the EEPROM according to an instruction from the ink level determination M1 of the control circuit 48, and generates the sensor driving signal DS with a desired waveform. The sensor driving signal DS includes a potential higher than the supply voltage CVDD (3.3 V in this embodiment). In this embodiment, for example, the sensor driving signal DS includes a potential of about the maximum 36 V. Specifically, the sensor driving signal DS is a trapezoid pulse signal with a voltage of about the maximum 36 V.

In this embodiment, the driving signal generation circuit 42 has a function of generating a head driving signal to be supplied to the print head 5. That is, in order to determine the level of remaining ink, the control circuit 48 allows the driving signal generation circuit 42 to generate the sensor driving signal. In order to perform the printing, the control circuit 48 allows the driving signal generation circuit 42 to generate the head driving signal.

The sub-control unit 50 is formed by ASIC (Application Specific IC) and includes a communication processing unit 55 and a sensor processing unit 52.

The communication processing unit 55 performs communication processing to communicate with the main control unit 40 via the bus BS. The communication processing unit 55 performs communication processing to communicate with the storage device 130 of the ink cartridge 100 via the reset signal line LR1, the data signal line LD1, and the clock signal line LC1. The data signal line LD1 is connected to the ground potential CVSS (0 V) via a pull-down resistor R1 in the sub-control unit 50. As a consequence, when no data signal is transmitted or received between the sub-control unit 50 and the storage device 130, the potential of the data signal line LD1 is maintained at a low level. The communication processing unit 55 can detect whether the circuit substrate 120 of the ink cartridge 100 is electrically connected to the printer 20, that is, to detect whether the ink cartridge 100 is mounted on the printer 20 by detecting the potential of a specific terminal among the terminal group of the circuit substrate 120. The communication processing unit 55 notifies the main control unit 40 that the mounting of the ink cartridge 100 is detected. Then, the main control unit 40 can determine whether each ink cartridge 100 is mounted on a cartridge mounting unit. The main control unit 40 gains access to the storage device 130 of the ink cartridge 100 at predetermined timing through the communication processing unit 55, when it is determined that the circuit substrate 120 is electrically connected to the printer 20 and thus the ink cartridge 100 is mounted on the printer 20. This access will be described in detail below.

The communication processing unit 55 is a circuit that is driven with the supply voltage VDD (3.3 V in this embodiment). The ASIC forming the communication processing unit 55 includes a memory area (SRAM 551) and a logic area. The logic area includes a sensor register 552, an error code register 553, and a clock generation unit 554. The SRAM 551 is a memory that is used to store data temporarily when the communication processing unit 55 performs processing. For example, the SRRAM 551 temporarily stores data received from the main control unit 40 or data received from the sensor 110 or the storage device 130. The SRAM 551 stores the data read from the storage device 130 of each ink cartridge 100. The data stored in the SRAM 551 is updated, as necessary, when the printing is performed.

The sensor register 552 is a register that records the result of the ink level of each ink cartridge determined by the sensor processing unit 52. The error code register 553 is a register that writes a communication error or a memory cell error, which is described below, for each line of a rewritable area (which is described below) in each storage device 130. The clock generation unit 554 generates the clock signal CSCK for data transmission between the sub-control unit 50 and the storage device 130. The clock generation unit 554 has a function of changing the frequency of the clock signal CSCK into another value.

The sensor processing unit 52 executes an ink level determining process (sensor process) using the sensor 110. The sensor processing unit 52 includes a change-over switch. The change-over switch is used to supply the sensor driving signal DS to the sensor 110 of one ink cartridge 100 to be subjected to the sensor process via either the first sensor driving signal line LDSN or the second sensor driving signal line LDSP.

Although detailed illustration is omitted, the sensor 110 includes a cavity (resonant unit) forming a part of an ink passage near the ink supply port, a vibration plate forming a part of a wall surface of the cavity, and a piezoelectric element disposed on the vibration plate. The cavity and the vibration plate form a sensor chamber. The sensor processing unit 52 can vibrate the vibration plate via the piezoelectric element by sending the sensor driving signal DS to the piezoelectric element via the sensor driving terminals 230 and 270. Thereafter, when receiving a response signal RS with the frequency of the residual vibration of the vibration plate from the piezoelectric element, the sensor processing unit 52 can detect whether the ink exists in the cavity. Specifically, when the ink contained in the main body 101 is consumed, the inner state of the cavity is changed from an ink-filled state to an air-filled state, and thus the frequency of the residual vibration of the vibration plate is varied. The variation in the frequency is represented as a variation in the frequency of the response signal RS. The sensor processing unit 52 can detect whether the ink exists in the cavity by measuring the frequency of the response signal RS. The fact that it is detected that the ink "does not exist" in the cavity means that the level of the ink remaining in the main body 101 is equal to or lower than a first threshold value Vref1. The first threshold value Vref1 is a value corresponding to the volume of a downstream passage of the cavity of the sensor chamber. The fact that it is detected that the ink "exists" in the cavity means that the level of the ink remaining in the main body 101 is higher than a first threshold value Vref1.

Next, the electric configuration of the ink cartridge 100 will be described. The ink cartridge 100 includes the storage device 130 and the sensor 110. The storage device 130 includes a ferroelectric memory cell array 132 as a data storage unit and a memory control circuit 136. As indicated by white circles on a dashed line indicating the storage device 130 in FIG. 6, the storage device 130 includes a ground terminal electrically connected to the ground terminal 210 of the printed circuit substrate 120, a supply terminal electrically connected to the supply terminal 220, a reset terminal electrically connected to the reset terminal 240, a clock terminal electrically connected to the clock terminal 250, and a data terminal electrically connected to the data terminal 260. The storage device 130 is a memory that does not receive address data designating the address of an access destination from the outside. The storage device 130 can control designation of a memory cell to be accessed according to the clock signal CSCK and command data supplied from the outside without directly receiving the input of the address data.

The ferroelectric memory cell array 132 is a non-volatile semiconductor memory cell array using ferroelectric as a storage element and supplies a memory area where data can be rewritable.

The memory control circuit 136 is a circuit that relays access (reading and writing) from the sub-control unit 50 to the ferroelectric memory cell array 132 and analyzes the identification data or the command data transmitted from the sub-control unit 50. The memory control circuit 136 writes data in the ferroelectric memory cell array 132 based on write data received from the sub-control unit 50 at the writing time. The memory control circuit 136 transmits data to the sub-control unit 50 based on data read from the ferroelectric memory cell array 132 at the reading time. The memory control circuit 136 includes an ID comparison unit M11, a command analysis unit M12, an address counter M13, and a read/write control unit M14, a data transceiver unit M15, a counter control unit M16. The processing details of the respective units are as follows.

(1) ID Comparison Unit M11

The ID comparison unit M11 compares the ID number transmitted from the sub-control unit 50 to the ID number which can be assigned by the storage device 130 itself to determine whether the storage device 130 itself is an access target. The ID number which can be assigned by the storage device itself is stored in a memory cell connected to a word line selected based on the output of the address counter M13 when the access is started from the sub-control unit 50 after the storage device 130 is initialized. Here, the mentioned ID number is used to identify the access target storage device 130 of the sub-control unit 50 among the plurality of storage devices 130 which are bus-connected to the sub-control unit 50. For example, the ID number is determined in advance according to the color of ink stored in the ink cartridge 100.

(2) Command Analysis Unit M12

The command analysis unit M12 analyzes communication start data (SOF), communication end data (EOF), and command data transmitted from the sub-control unit 50 to determine start of access, end of access, and types (reading, writing, or the like) of access from the sub-control unit 50.

(3) Address Counter M13

The address counter M13 is a counter indicating an access target line address (word line) of the memory cell array 132. A count value of the address counter M13 is reset to an initial value when the reset signal CRST of a low level is input to the storage device 130 and the storage device 130 is initialized. The initial address value is a value indicating the line address of the memory cell storing an ID number. Thereafter, the address value according to the clock signal CSCK input to the storage device 130 appropriately counts up under the control of the counter control unit M16. The count value of the address counter M13 is output from the address counter M13 to an address decoder (line decoder) (not shown), when access to the memory cell array 132 is achieved under the control of the read/write control unit M14.

(4) Read/Write Control Unit M14

The read/write control unit M14 executes collective writing, collective reading, and the like by a row unit on the word line selected by the address counter M13 according to the details (type of access) of the command data analyzed by the command analysis unit M12. The read/write control unit M14 includes a register or a buffer (not shown).

(5) Data Transceiver Unit M15

Under the control of the read/write control unit M14, the data transceiver unit M15 receives the data signal CSDA transmitted from the sub-control unit 50 via the data signal line LD1 in synchronization with the clock signal CSCK or transmits the data signal CSDA via the data signal line LD1 in synchronization with the clock signal CSCK. That is, the data transceiver unit M15 sets directions in which the data signal CSDA transmitted and received between the storage device 130 and the sub-control unit 50.

(6) Counter Control Unit M16

The counter control unit M16 includes a clock counter counting the number of pulses of the clock signal CSCK and supplies a control signal instructing the address counter M13 to count up or count down based on the count value. That is, after the access from the sub-control unit 50 to the storage device 130 starts, the counter control unit M16 counts the number of clock pulses of the clock signal CSCK input to the storage device 130 and also outputs a control signal to the address counter M13 to count up or count down the count value of the address counter M13 whenever counting the predetermined number of pulses based on the result analyzed by the command analysis unit M12.

Figure 7:
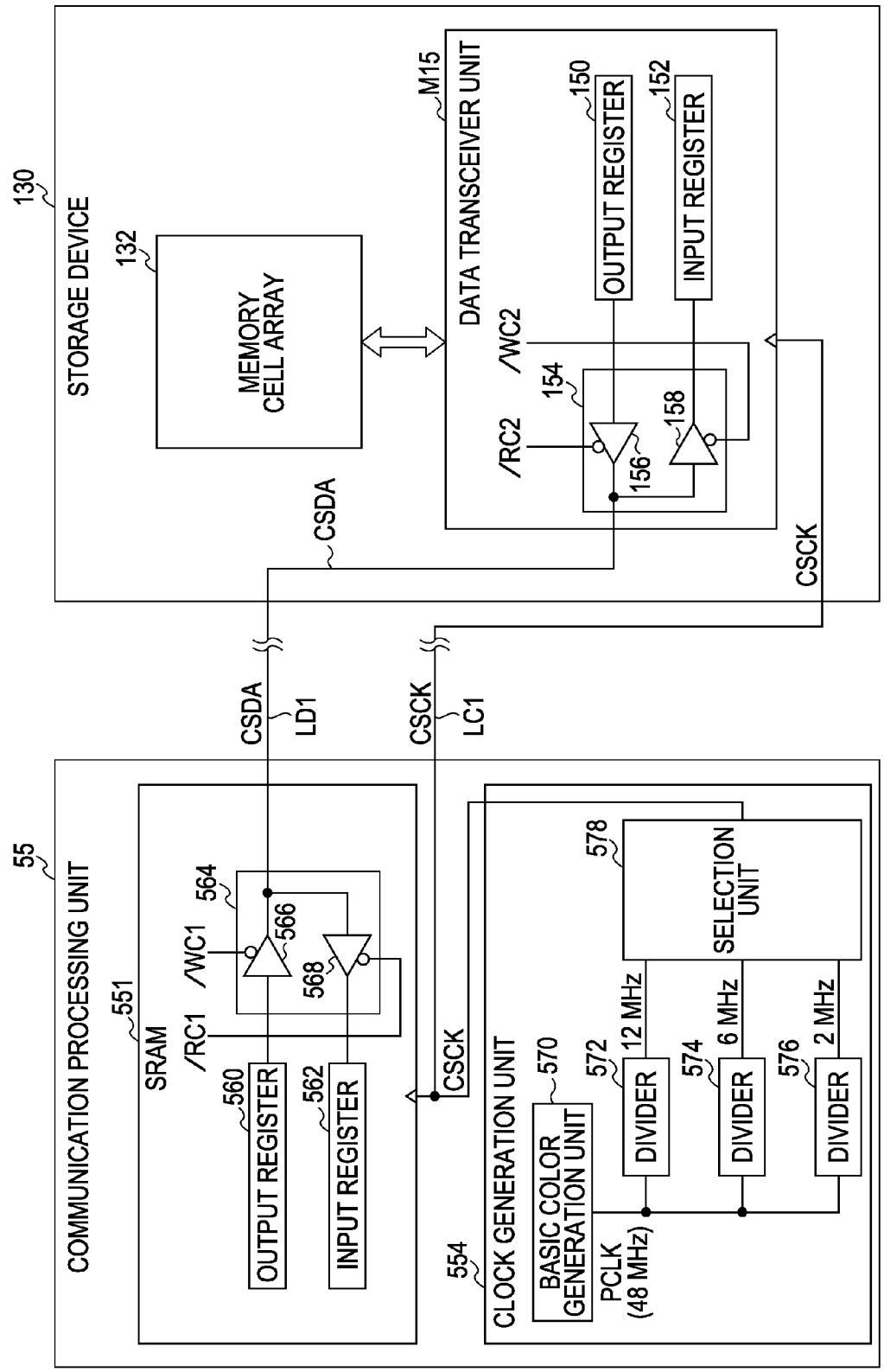
FIG. 7 is a block diagram illustrating the internal configurations of an I/O unit of an SRAM, a clock transmission unit, and a data transceiver unit.

FIG. 7 is a block diagram illustrating the internal configurations of an I/O unit of an SRAM 551 and a clock generation unit 554 in the communication processing unit 55 and the internal configuration of the data transceiver unit M15 in the storage device 130. The I/O unit of the SRAM 551 includes an output register 560, an input register 562, and a change-over circuit 564 switching transmission and reception directions. The output register 560 is a storage unit temporarily storing data to be transmitted to the storage device 130. The input register 562 is a storage unit temporarily storing the data received from the storage device 130. The change-over circuit 564 includes a first 3-state buffer circuit 566 connected to the output register 560 and a second 3-state buffer circuit 568 connected to the input register 562. Based on a writing control signal /WC 1 given from the logic circuit of the communication processing unit 55, the first 3-state buffer circuit 566 is set to a conductive state when transmitting data (when writing data) and is set to a high impedance state (non-conductive state), when receiving data (when reading data). Contrary to the first 3-state buffer circuit 566, based on a reading control signal /RC1, the second 3-state buffer circuit 568 is set to the high impedance state when transmitting data (when writing data) and is set to the conductive state when receiving data (when reading data). The second 3-state buffer circuit 568 for inputting data may be substituted by a normal buffer circuit.

In the specification, "data reading" means a process of reading data from the storage device 130 to the sub-control unit 50 (that is, to the printer), and "data writing" means a process of writing data from the sub-control unit 50 (that is, from the printer) to the storage device 130.

The data transceiver unit M15 of the storage device 130 also includes an output register 150, an input register 152, and a change-over circuit 154, like the SRAM 551. The change-over circuit 154 includes two 3-state buffer circuits 156 and 158. Based on a reading control signal /RC2 given from the read/write control unit M14 (see FIG. 6) of the storage device 130, the first 3-state buffer circuit 156 for output is set to a conductive state when transmitting data (when reading data) and is set to the high impedance state (non-conductive state) when receiving data (when writing data). Contrary to the first 3-state buffer circuit 156, based on a reading control signal /WC2, the second 3-state buffer circuit 158 is set to the high impedance state when transmitting data (when reading data) and is set to the conductive state when receiving data (when writing data).

In the initial state of the storage device 130, the transmission and reception directions of the change-over circuits 564 and 154 are set to a direction in which the storage device 130 receives data. That is, when the printer 20 turns on or the ink cartridge 100 is replaced, the mounting of the ink cartridge is detected and the storage device 130 is initialized. Thereafter, when access from the sub-control unit 50 to the storage device 130 starts, the transmission and reception directions of the change-over circuits 564 and 154 are set to a direction in which the storage device 130 receives data. When it is proved that the ID number (called "identification data" or "identification information") given from the communication processing unit 55 and the ID number stored in the storage device 130 are not in accordance with each other upon initializing the access to the storage device 130, the second 3-state buffer circuit 158 for input is set to the high impedance state. As a consequence, since the other storage devices 130 other than the access target storage device 130 become a state where data may not be received, the current of the data signal line LD1 is reduced, thereby achieving power reduction.

The clock generation unit 554 includes a basic clock generation unit 570, three dividers 572, 574, and 576, and a selection unit 578. The basic clock generation unit 570 generates a basic clock signal RCLK with the highest frequency f0. The basic clock signal RCLK is used as an operational clock of various circuits of the communication processing unit 55. The three dividers 572, 574, and 576 generate clock signals with three different kinds of frequencies f1, f2, and f3 by dividing the basic clock signal RCLK at different division ratios. In the example of FIG. 7, f0 is equal to 48 MHz, f1 is equal to 12 MHz, f2 is equal to 6 MHz, and f3 is equal to 2 MHz. However, the values of these frequencies can be set to any different values in advance. As for the number of frequencies of the clock signal, the arbitrary number of two or more frequencies may be used. The selection unit 578 selects one of the clock signals with three different frequencies f1, f2, and f3 based on a selection signal given from the outside and supplies the selected clock signal as the clock signal CSCK for transmitting data with the storage device 130 to another circuit (the SRAM 551 or the storage device 130). The clock generation unit 554 may have a function of changing the frequency of the clock signal CSCK and may have various configurations other than the configuration shown in FIG. 7. For example, a circuit configuration capable of changing the frequency of the clock signal to a plurality of arbitrary frequencies using a PLL circuit may be used.

Figure 8:
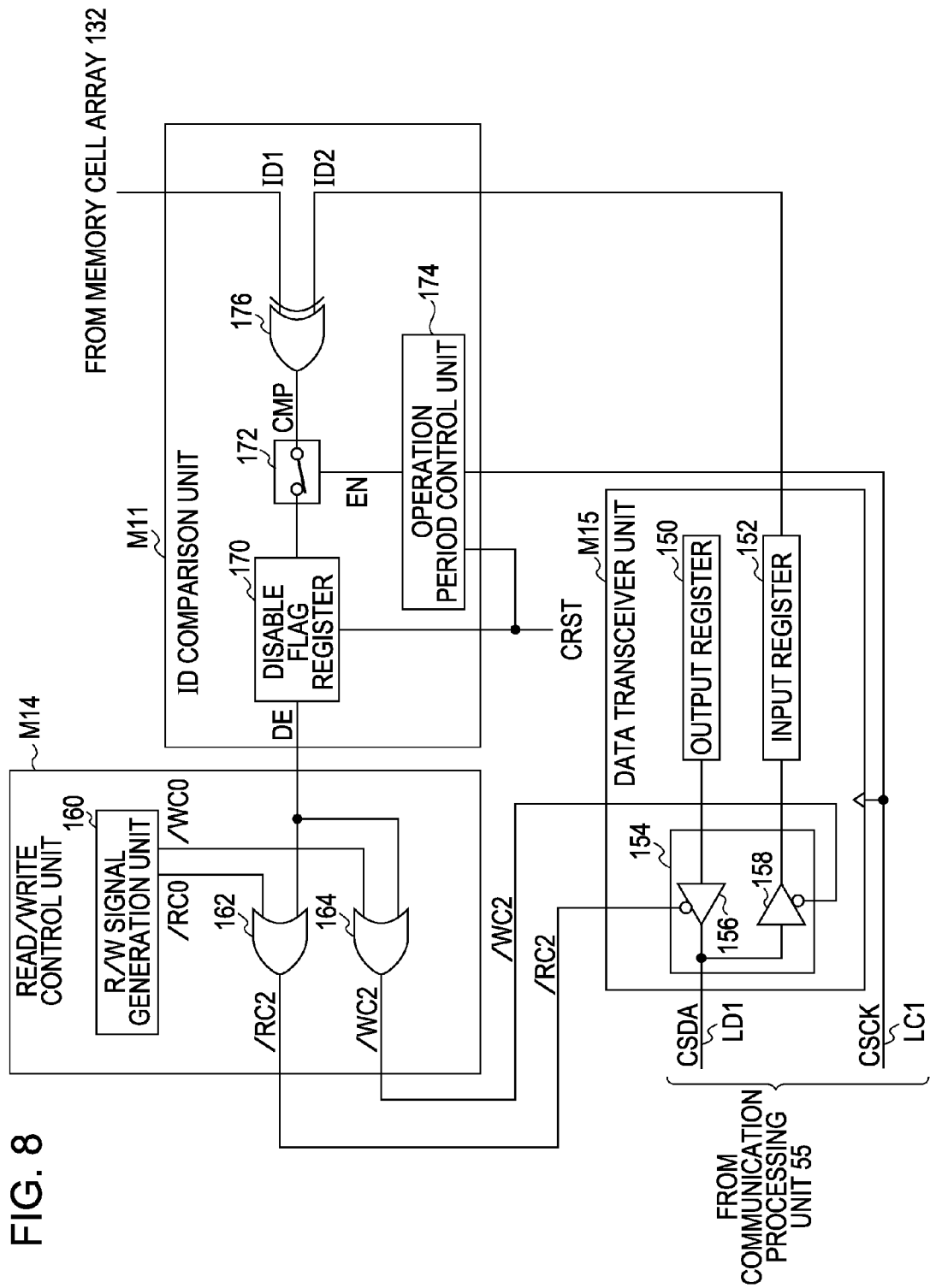
FIG. 8 is a block diagram illustrating the internal configurations of an ID comparison unit, a read/write control unit, and a data transceiver unit of the storage device according to a first embodiment.

FIG. 8 is an explanatory diagram illustrating the internal configurations of the ID comparison unit M11, the read/write control unit M14, and the data transceiver unit M15 of the storage device 130. The configuration of the data transceiver unit M15 is the same as the configuration shown in FIG. 7. The read/write control unit M14 includes a R/W signal generation unit 160 generating a reading control signal /RC0 and a writing control signal /WC0 and two OR circuits 162 and 164. Based on the command analysis result of the command analysis unit, the R/W signal generation unit generates the reading control signal /RC0 and the writing control signal /WC0. The reading control signal /RC0 has 0 when data is transmitted to the printer and has 1 at other times. On the other hand, the writing control signal /WC0 has 0 when data is received from the printer and has 1 at other times. In some cases, one or both of the reading control signal /RC0 and the writing control signal /WC0 have 1. In any case, however, neither the reading control signal /RC0 nor the writing control signal /WC0 has 0. The reading control signal /RC0 and the writing control signal /WC0 are input to one input terminals of the OR circuits 162 and 164, respectively, and a disable flag DE generated by the ID comparison unit M11 is input to the other input terminals thereof. The disable flag DE will be described below.

The ID comparison unit M11 includes a disable flag register 170, a switch 172, an operation period control unit 174, and an EX-OR circuit 176. The EX-OR circuit 176 is an accordance comparison circuit that determines whether an identification data value ID2 transmitted from the sub-control unit 50 (see FIG. 6) via the data transceiver unit M15 and an identification data value ID1 read from the memory cell array 132 are in accordance with each other by comparing the identification data value ID2 to the identification data value ID1 sequentially bit by bit. The EX-OR circuit 176 outputs a comparison signal CMP of a 0 level when the two identification data values ID1 and ID2 are in accordance with each other. The EX-OR circuit 176 outputs a comparison signal CMP of a 1 level when the two identification data values ID1 and ID2 are not in accordance with each other. The comparison signal CMP is supplied to the disable flag register 170 via the switch 172. When the value of the comparison signal CMP is set to 1, the disable flag register 170 ascends the disable flag DE from 0 to 1, and then maintains the value of the disable flag DE to 1. The operation period control unit 174 generates an operation period signal EN with the 1 level only during a period (an "ID comparison period", a "ID determination period", or an "identification information transmission period") in which the process of comparing the identification data has to be performed, and supplies the generated operation period signal EN to the switch 172. The switch 172 turns on in accordance with the operation period signal EN only during the ID comparison period. Accordingly, even when the value of the comparison signal CMP is set to 1 during a period before the ID comparison period, the value of the disable flag DE is not set to 1.

The disable flag DE set by the disable flag register 170 is input to the two OR circuits 162 and 164 of the read/write control unit M14. The first OR circuit 162 supplies the reading control signal /RC2 calculated with the reading control signal /RC0 by logical OR of the disable flag DE to a control terminal of the first 3-state buffer 154 of the data transceiver unit M15. Likewise, the second OR circuit 164 supplies the reading control signal /WC2 calculated with the writing control signal /WC0 by logical OR of the disable flag DE to a control terminal of the second 3-state buffer 156 of the data transceiver unit M15. Therefore, even when either the reading control signal /RC0 or the writing control signal /WC0 is 0 but the disable flag DE is 1 (that is, the ID numbers are not in accordance with each other), the connection between the data transceiver unit M15 and the data line is changed to the high impedance state, and thus the subsequent data transmission is banned. A specific example will be described in detail below.

The circuit configurations and the functional configurations described with reference to FIGS. 6 to 8 are just examples and may be modified arbitrarily. For example, the main control unit 40 and the sub-control unit 50 may be configured as a one control unit. The internal configuration (see FIG. 8) of the ID comparison unit M11 may be configured arbitrarily in such a manner that the identification data given from the printer 20 may be compared to the identification data stored in the storage device 130 in advance to generate the comparison result signal indicating the comparison result. Specifically, a multi-bit accordance detection circuit comparing all bits of two identification data may be used. However, when the 1-bit accordance detection circuit shown in FIG. 8 is used, an advantage that the circuit configuration can be further simplified is obtained. In the configuration of FIG. 8, since the identification data can be compared to each other bit by bit in received order to detect the accordance, an advantage can be obtained in that whether the identification data are in accordance with each other can be detected earlier compared to a case where the accordance detecting process waits until all bits of the identification data are received.

Figure 9:
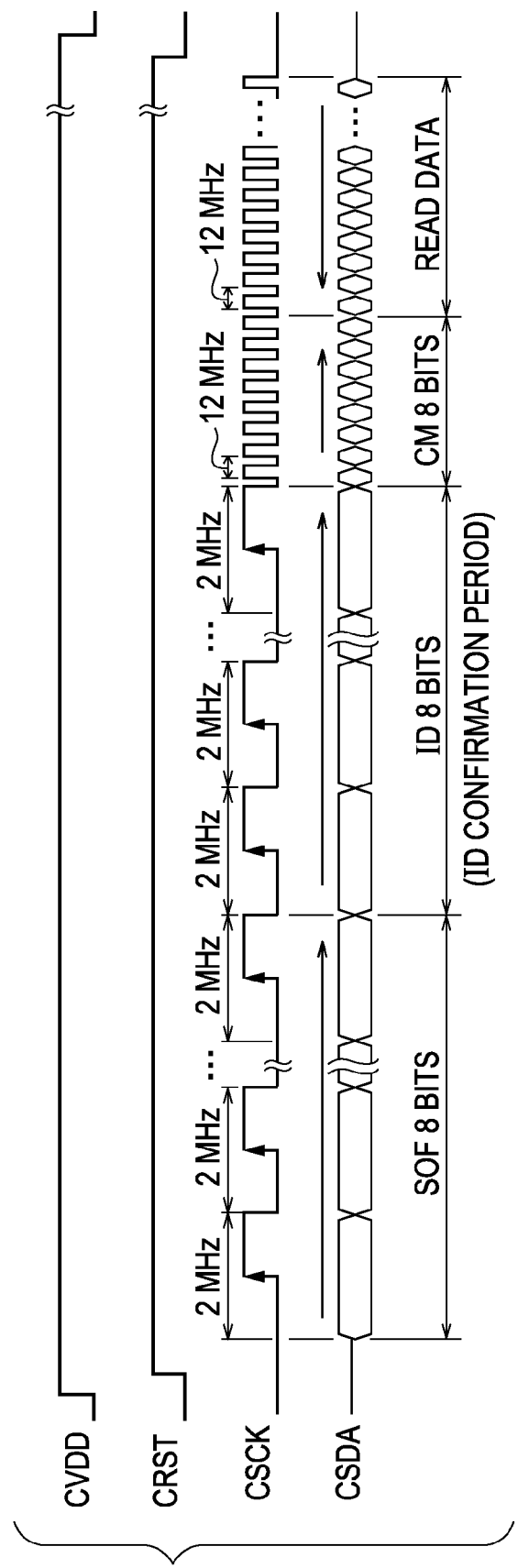
FIG. 9 is a timing chart schematically illustrating signals transmitted and received in a reading process performed by the storage device according to the first embodiment.

FIG. 9 is a timing chart schematically illustrating signals transmitted and received between the communication processing unit 55 of the printer 20 and the memory control circuit 136 of the storage device 130 in a one-time reading process performed by the storage device 130 according to the first embodiment. Here, the supply voltage CVDD, the reset signal CRST, the clock signal CSCK, and the data signal CSDA are illustrated as examples. The supply voltage CVDD, which is a signal transmitted through the first supply line LCV connecting the sub-control unit 50 to the storage device 130, is supplied from the sub-control unit 50 to the storage device 130. The reset signal CRST, which is a signal transmitted through the reset signal line LR1 connecting the sub-control unit 50 to the storage device 130, is supplied from the sub-control unit 50 to the storage device 130. The clock signal CSCK, which is a signal transmitted through the clock signal line LC1 connecting the sub-control unit 50 to the storage device 130, is supplied from the sub-control unit 50 to the storage device 130. The data signal CSDA is a signal transmitted through the data signal line LD1 connecting the sub-control unit 50 to the storage device 130. In FIG. 9, arrows indicating data directions of the data signal CSDA are illustrated. A right direction arrow indicates that the sub-control unit 50 is a transmission side and the storage device 130 is a reception side. A left direction arrow indicates that the sub-control unit 50 is a reception side and the storage device 130 is a transmission side. In this embodiment, the storage device 130 receives data in synchronization with an ascending edge of the clock signal CSCK supplied from the sub-control unit 50. That is, the storage device 130 receives, as effective data, the level of the data signal at the time point of the ascending edge of the clock signal CSCK.

The main control unit 40 (see FIG. 6) of the printer 20 transmits a reading command instructing the sub-control unit 50 to read data from the storage device 130 of the ink cartridge 100 via the bus BS. The communication processing unit 55 supplies the supply voltage CVDD to each ink cartridge 100 in response to the reading command. That is, the communication processing unit 55 supplies an operational voltage to the storage device 130 of each ink cartridge 100 and permits the storage device 130 to operate. After the supply voltage CVDD is supplied, a low-level reset signal CRST is supplied to initialize the storage device 130. Normally, the reset signal CRST is maintained at the low level when the previous access ends. Therefore, the reset signal CRST is at the low level before the supply voltage CVDD is supplied to the storage device 130.

The communication processing unit 55 of the sub-control unit 50 starts a reading process, when receiving a reading command from the main control unit 40. When the reading process starts, the communication processing unit 55 transfers the reset signal CRST from a low level to a high level and also transmits the clock signal CSCK with a predetermined frequency (here, 2 MHz). When the reset signal CRST is transferred from the low level to the high level, the storage device 130 prepares to receive the data signal CSDA from the communication processing unit 55. The communication processing unit 55 subsequently transmits SOF (Start Of Frame) data and the identification data and the command data of one storage device 130 to be accessed. One storage device 130 selected by the identification data reads data from the own memory cell array 132 and then transmits the data as read data to the communication processing unit 55. In this way, when the one-time reading process ends, the communication processing unit 55 lowers the levels of the reset signal CRST and the supply voltage CVDD to the low level and terminates the one-time reading process. The transmission of the SOF data may be omitted.

The SOF data is a signal used for the sub-control unit 50 to notify the storage device 130 of the start of communication. The identification data is information used to select one storage device 130 to be accessed. The command data CM is a command that indicates the details processed between the communication processing unit 55 and the storage device 130. In the example of FIG. 9, the command indicating the reading process is transmitted as the command data CM. Since one storage device 130 to be accessed and the kind of the data transmitting process are specified by the identification data and the command data CM, a combination of the two data ID and CM is called an "operation code".

As shown in FIG. 9, the frequency of the clock signal CSCK is set to a low frequency (2 MHz) during a transmission period of the SOF data and the identification data and is set to a high frequency (12 MHz) during a transmission period of the command data CM and the read data. The reasons for newly changing the clock frequency are as follows. As well known, a consumed current (consumed power) of a digital circuit such as a memory sharply increases with an increase in the clock frequency. When the identification data are transmitted, the identification data are transmitted to the plurality of storage devices 130 connected to the sub-control unit 50 and one storage device 130 to be accessed is selected. Therefore, at least in an initial period (called an "ID confirmed period") of the transmission period of the identification data, it is necessary to transmit the identification data to all of the storage devices 130. At this time, since all of the storage devices 130 operate, a problem may arise in that large consumed current flows in the data signal line LD1 when the clock frequency is increased. Moreover, when high current with high frequency flows in the data signal line LD1, there is a possibility that a circuit is overheated or large noise occurs. The capacity component (electrostatic capacity) of the data signal line LD1 increases in the state where the plurality of storage devices 130 is connected to the data signal line LD1. Therefore, when the clock frequency is excessively increased, a problem may also arise in that it is difficult to transmit the identification data accurately. Due to these reasons, by setting the clock frequency to the low value (2 MHz in the example of FIG. 9) during the period until the transmission of the identification data ends, the above-mentioned problems can be prevented. On the other hand, when only one storage device 130 to be accessed is selected by transmitting the identification data, the data transceiver unit M15 (see FIG. 8) of another storage device 130 sets the connection with the data signal line LD1 to the high impedance state. Accordingly, although the clock frequency is set to the high value (12 MHz in the example of FIG. 9) during the period after the transmission of the identification data ends, the above-mentioned problems do not occur. Moreover, when the clock frequency is set to a high value during the transmission period of the read data, the transmission speed of the read data can be increased.

In the example of FIG. 9, since net read data is transmitted after the transmission of the command data CM, a period after the transmission of the command data CM is a "data transmission period" in a narrow sense. However, a combined period of the transmission period of the command data CM and the transmission period of the read data may be called a "data transmission period". In the specification, the "data transmission period" is used in the broad sense, unless particularly mentioned. The command data CM may be transmitted before the identification data is transmitted. In this case, in terms of the above-described reasons, the clock frequency when the command data CM is transmitted is preferably set to a frequency (for example, 2 MHz) lower than that during the transmission period of the read data. The same is applied to the transmission of the write data.

Figure 10:
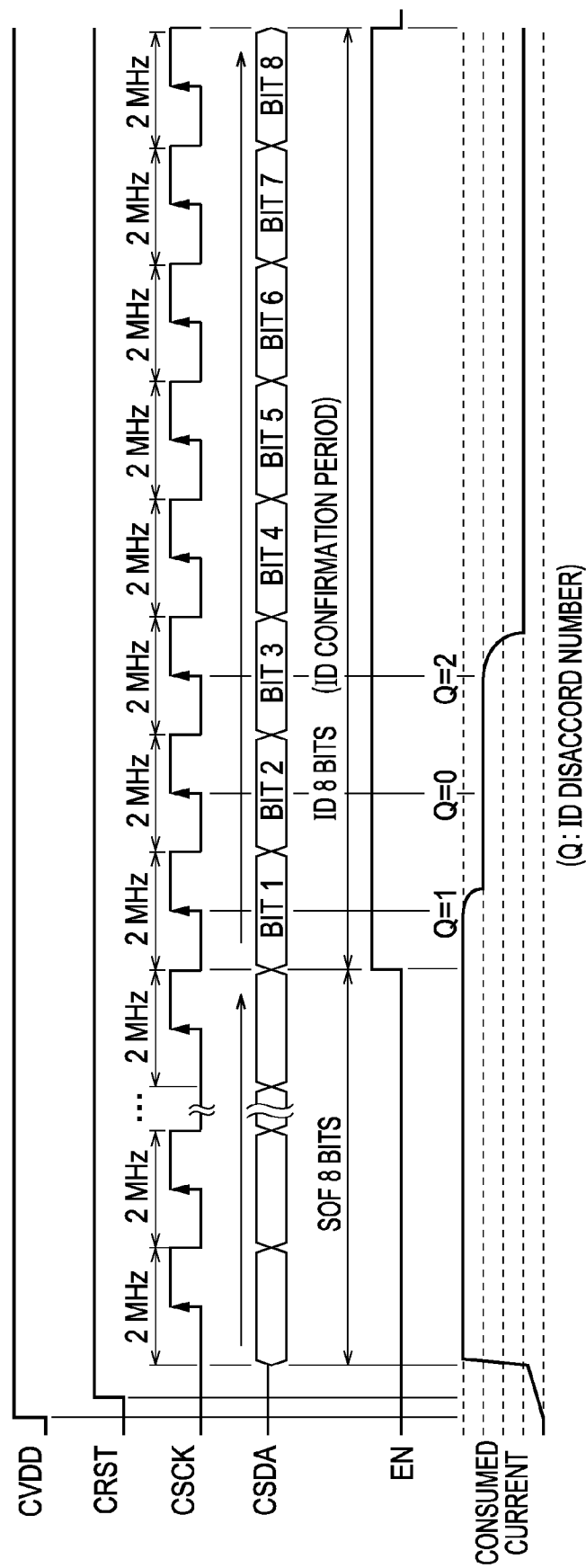
FIG. 10 is an explanatory diagram illustrating a variation in a consumed current during an ID confirmation period.

FIG. 10 is an explanatory diagram illustrating a variation in the consumed current of the data signal line LD1 during the ID confirmation period. Here, the operation period signal EN generated by the operation period control unit 174 (see FIG. 8) of the ID comparison unit M11 and the consumed current of the communication processing unit 55 are shown in addition to the four kinds of signals CVDD, CRST, CSCK, and CSDA shown in FIG. 9. The operation period signal EN is set to 1 only during the ID confirmation period and is set to 0 during other periods. The ID comparison unit M11 compares the identification data supplied from the communication processing unit 55 to the identification data read from the memory cell array 132 bit by bit in the received order during a period, in which the operation period signal EN is set to 1, to determine whether both the identification data are in accordance with each other. When the bit value of the received identification data and the bit value corresponding to the identification data read from the memory cell array 132 are not in accordance with each other, the ID comparison unit M11 ascends the disable flag DE from 0 to 1. As a consequence, since the 3-state buffers 154 and 156 of the changeover circuit 154 of the data transceiver unit M15 is set to the high impedance state, the connection between the data signal line LD1 and the storage device 130 is disconnected from each other.

In the example of FIG. 10, it is assumed that four storage devices 130 (that is, four ink cartridges) are mounted on the printer 20. When the SOF data starts to be transmitted, the consumed current flowing in the data signal line LD1 is greatly increased. This is because the SOF data is transmitted to all of the four storage devices 130. The identification data for one of the four storage devices 130 are determined to be not in accordance at a first bit of the identification data during the ID confirmation period (ID disaccord number Q=1). At this time, since the connection between the storage device 130 and the data signal line LD1 is set to the high impedance state, the consumed current decreases by one. The consumed current is not changed at a second bit of the identification data since there is no identification data determined to be not in accordance with each other. The consumed current decreases by two since the identification data for two of the remaining three storage devices 130 are determined to be not in accordance at a 3rd bit of the identification data. Only the one storage device selected in this way is continuously connected to the data signal line LD1, and then the one storage device becomes the access target. Even when the number of storage devices 130 is larger than four, the ID comparison process is performed so that only one storage device is selected as the access target.

In this embodiment, whenever the identification data is transmitted to the storage device 130 bit by bit, it is determined whether the transmitted identification data and the identification data registered in the storage device 130 are in accordance with each other. Therefore, it can be detected earlier that the identification data are not in accordance with each other. When the bit values corresponding to two identification data are not in accordance with each other, the connection between the storage device 130 and the data signal line LD1 is immediately set to the high impedance state by the storage device 130, thereby suppressing the consumed current to be small. Since a data transmission circuit of the communication processing unit 55 may have the current capacity to the extent that the maximum consumed current shown in FIG. 10 flows during the transmission period of the SOF data, the data transmission circuit can be mounted as a circuit having small rated current. In this point of view, the identification data is preferably allocated so that the connection between one or more storage devices 130 and the data signal line LD1 are set to the high impedance state at the first bit of the identification data. For example, it is desirable that the first bits of the identification data of the storage devices of a first group having about half N/2 of N storage devices 130 mounted on the printer and the first bits of the identification data of the storage devices of a second group having the remaining storage devices 130 mounted thereon are set to different values.

Figure 11:
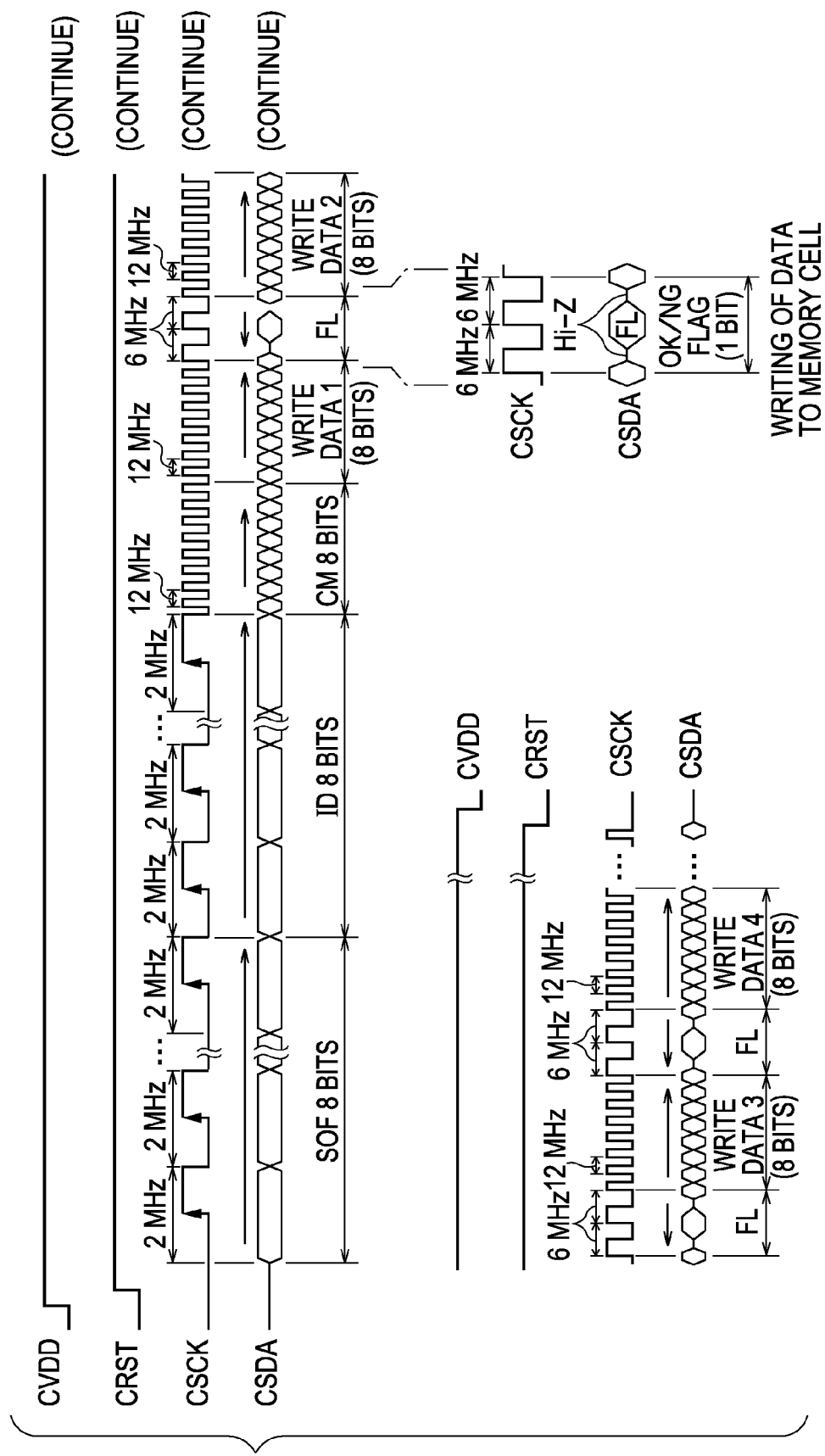
FIG. 11 is a timing chart schematically illustrating signals transmitted and received in a process of writing data to the storage device according to the first embodiment.

FIG. 11 is a timing chart schematically illustrating signals transmitted and received between the communication processing unit 55 of the printer 20 and the memory control circuit 136 of the storage device 130 in a one-time writing process from the storage device 130 according to the first embodiment. A process of transmitting the SOF data, the identification data, and the command data CM from the communication processing unit 55 to the storage device 130 is the same as the above-described reading process (see FIGS. 9 and 10). However, a writing command serving as the command data CM is transmitted to the storage device 130.

The communication processing unit 55 transmits the write data (writing data) to the storage device 130 from the pulse of the subsequent clock signal CSCK after the transmission of the command data CM ends. At this time, the communication processing unit 55 transmits 1-bit data in synchronization with the descending edge of the clock signal CSCK and the storage device 130 receives 1-bit data in synchronization with the ascending edge of the clock signal CSCK. The clock signal CSCK during the transmission period of the write data has the same high frequency (12 MHz) as that during the transmission period (see FIG. 9) of the read data. One pair of write data has 8 bits, and the value of the 8 bits is transmitted sequentially bit by bit to storage device 130 in synchronization with the clock signal CSCK. The number of bits of one pair of write data can be set to any number of two or more. One pair of write data preferably includes an error detection code (for example, parity bits).

The communication processing unit 55 receives a 1-bit response signal FL from the memory control circuit 136, when the transmission of one pair of write data ends. The response signal FL is a signal that indicates whether one pair of write data is correctly received by the storage device 130. Whether or not the write data is correctly received can be determined by performing parity check, for example. A high-level response signal FL (hereinafter, also referred to as an "OK response signal" or an "OK flag") indicates that the storage device 130 correctly receives one pair of write data. A low-level response signal FL (hereinafter, also referred to as a "failure response signal" or a "failure flag") indicates that the storage device 130 has not correctly receive one pair of write data. When the received response signal FL is the failure response signal, the communication processing unit 55 performs a predetermined error process (for example, data retransmission). On the other hand, when the received response signal FL is the OK response signal, the communication processing unit 55 transmits one pair of subsequent write data. One pair of write data correctly received is written to the memory cell array 132 within a transmission period of the response signal FL. In this way, the transmission of one pair of write data and the reception of the response signal FL are repeated until the transmission and writing of all write data to be transmitted end.

During a reception period of the response signal FL, the clock frequency is set to a value (6 MHz) lower than the clock frequency (12 MHz) during the transmission period of the write data. The reason is as follows. That is, the high clock frequency (12 MHz) is used to increase the data transmission speed during the transmission period of the write data. On the other hand, since the response signal FL is a 1-bit signal, the transmission speed does not excessively decrease even when the clock frequency of the response signal FL is lowered. The data transmission directions are changed when the transmission of the response signal FL starts and ends so that the data transmission directions can be understood from the directions of arrows of the data transmission direction in FIG. 11. When the data transmission direction is changed while the high clock frequency (12 MHz) is maintained like the transmission period of the write data, a so-called bus collision occurs. Therefore, there is a possibility that the bit value of a head of one pair of subsequent write data may not be correctly transmitted. On the other hand, when the clock frequency during the reception period of the response signal FL is set to a value smaller than the clock frequency during the transmission period of the write data, as shown in FIG. 11, the possibility of a bus collision can be reduced, thereby correctly transmitting the data.

As shown in the partly enlarged view of the right part of FIG. 11, the change-over circuit 564 (see FIG. 7) of the communication processing unit 55 is preferably set to the high impedance state during periods before and after the 1-bit response signal FL is transmitted and received. The change-over circuit 154 of the data transceiver unit M15 of the storage device 130 is preferably set to the high impedance state as well. Accordingly, the bus collision can be avoided more reliably.

The clock frequency during the reception period of the response signal FL is preferably set to the same frequency as a frequency at which one pair of write data is completely written to the memory cell array 132 during a period in which the storage device 130 transmits the 1-bit response signal FL. Then, since both the transmission and reception of the response signal FL and the writing to the memory cell array 132 can be completed, an advantage of simplifying the control of the entire process can be obtained. The clock frequency during the reception period of the response signal FL is preferably set to be lower than the clock frequency (12 MHz) during the transmission period of the write data and is preferably set to be higher than the clock frequency (2 MHz) during the ID confirmation period. The reason is that the time necessary for transmitting the data increases when the clock frequency during the reception period of the response signal FL is excessively lowered. However, the clock frequency during the reception period of the response signal FL may be set to the same value as the clock frequency during the ID confirmation period.

However, the clock frequency during the reception period of the response signal FL may be maintained to the same value as the clock frequency during the transmission period of the write data. Even in this case, it is preferable to select an appropriate clock frequency at which bus collisions do not occur when the data transmission direction is changed.

As described above, the following three technical methods are simultaneously used according to this embodiment.

(1) The clock frequency during the ID confirmation period (identification information transmission period) is set to a value lower than the clock frequency during the transmission period of the read data or the write data.

(2) When the identification data is confirmed bit by bit in the received order and it is determined that the identification data are not in accordance with each other, the connection between the storage device and the data signal line is immediately disconnected.

(3) The clock frequency during the reception period of the response signal is set to a value lower than the clock frequency during the transmission period of the write data.

However, the above three technical methods may not used simultaneously, but only one or two thereof may be used.

C. SECOND EMBODIMENT

Figure 12:
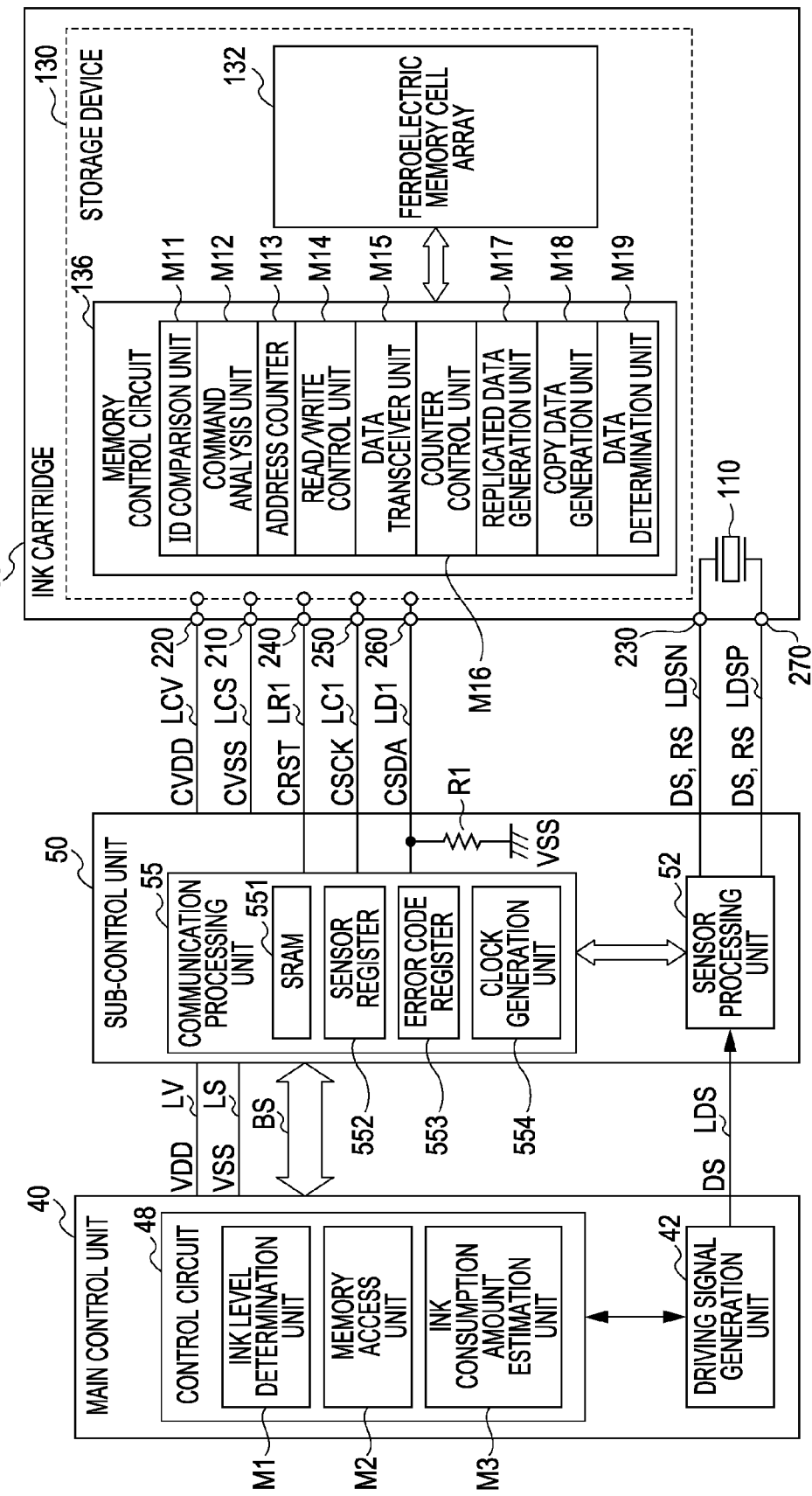
FIG. 12 is an explanatory diagram illustrating the electric configuration of a printer according to a second embodiment.

FIG. 12 is a block diagram illustrating the functional configuration of the main control unit 40 and the functional configurations of the sub-control unit 50 and the ink cartridge 100 according to a second embodiment and is a diagram corresponding to FIG. 6 of the first embodiment. The circuit configuration of FIG. 12 is the same as that of FIG. 6 except that a copy data generation unit M17, an inverted data generation unit M18, and a data determination unit M19 are further included in the memory control circuit 136 of the storage device 130 in FIG. 6. In the second embodiment, as described below, inverted data or mirror data is transmitted in addition to original data (also referred to as "raw data") as the read data or the write data. The copy data generation unit M17 has a function of copying the raw data to generate the mirror data of the same amount as that of the raw data. The inverted data generation unit M18 has a function of inverting the values of respective bits of the raw data to generate the inverted data of the same amount as that of the raw data. The data determination unit M19 has a function of performing a parity check on the raw data and the mirror data or performing an exclusive OR operation to determine consistency between data.

Figure 13:
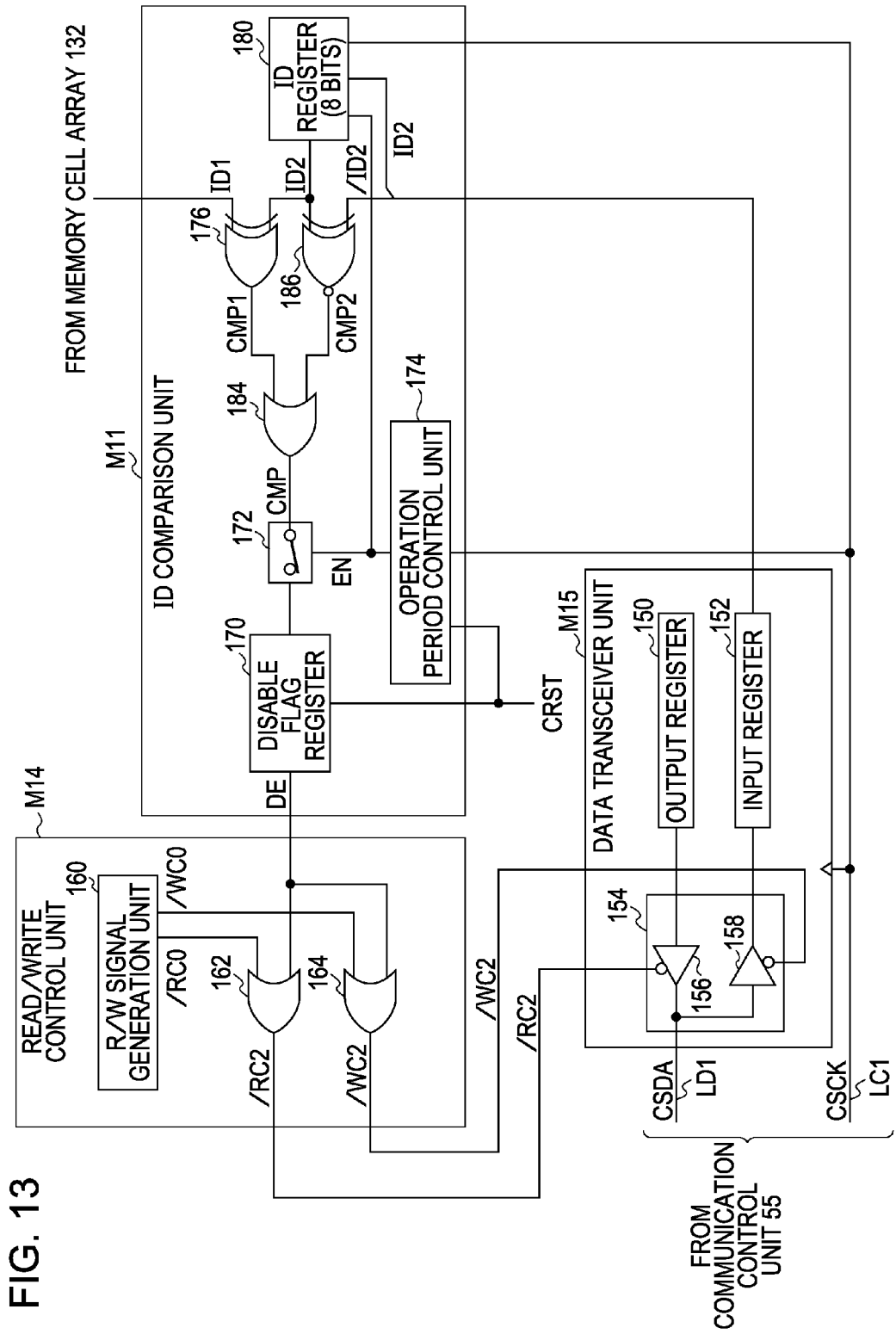
FIG. 13 is a block diagram illustrating the internal configurations of an ID comparison unit, a read/write control unit, and a data transceiver unit of the storage device according to the second embodiment.

FIG. 13 is an explanatory diagram illustrating the inner configurations of the ID comparison M11, the read/write control unit M14, and the data transceiver unit M15 according to the second embodiment. The configurations of the data transceiver unit M15 and the read/write control unit M14 are the same as that of first embodiment in FIG. 8, but the configuration of the ID comparison unit M11 is different from that of the first embodiment.

The ID comparison unit M11 according to the second embodiment further includes an OR circuit 182, an EX-NOR circuit 186, and an ID register 180 in addition to the configuration of the ID comparison unit M11 (see FIG. 8) of the first embodiment. The ID number (also referred to as "raw identification data ID2") and inverted identification data /ID2, which is inverted data of the ID number, are supplied bit by bit as identification information from the communication processing unit 55. For example, these identification data ID2 and /ID2 have 8 bits. The received raw identification data ID2 is temporarily stored in the ID register 180.

When the raw identification data ID2 is received and then the inverted identification data /ID2 is transmitted from the communication processing unit 55 to the storage device 130, the ID comparison unit M11 performs the following determination process.

First Determination Process

The EX-OR circuit 176 performs a first determination process to determine whether the raw identification data ID2 and the identification data ID1 read from the memory cell array 132 are in accordance with each other. The first comparison signal CMP1 indicating the result is set to 0 when the two data values ID1 and ID2 are in accordance with each other, and is set to 1 when the two data values ID1 and ID2 are not in accordance with each other.

Second Determination Process

The EX-NOR circuit 186 performs a second determination process to determine whether the inverted identification data /ID2 and the raw identification data ID2 are in accordance with each other. The second comparison signal CMP2 indicating the result is set to 1 when the two data values /ID2 and ID2 are in accordance with each other, and is set to 0 when the two data values /ID2 and ID2 are not in accordance with each other. Accordingly, the second comparison signal CMP2 is set to 0 when the inverted value of the inverted identification data /ID2 and the value of the raw identification data ID2 are in accordance with each other, and is set to 1 when the inverted value of the inverted identification data /ID2 and the value of the raw identification data ID2 are not in accordance with each other.

The first determination process is a process of determining whether the identification data ID2 transmitted from the communication processing unit 55 to the storage device 130 and the identification data ID1 registered in advance in the storage device 130 are in accordance with each other. The second determination process is a process of determining whether the raw identification data ID2 transmitted from the communication processing unit 55 to the storage device 130 and the inverted data /ID2 have an exact inverted relationship. The second determination process is a kind of process of determining whether a communication error occurs between the communication processing unit 55 and the storage device 130. In the first determination process, the inverted identification data /ID2 may be compared to the identification data ID1 registered in advance the storage device 130 by using the inverted identification data /ID2 instead of the raw identification data ID2. In this case, the EX-OR circuit 176 may be replaced by an EX-NOR circuit.

The first comparison signal CMP1 and the second comparison signal CMP2 obtained in this way are input to the OR circuit 182. The output (the comparison signal CMP) of the OR circuit 182 is supplied to the disable flag register 170 via the switch 172. As in the first embodiment, the disable flag register 170 increases the disable flag DE from 0 to 1 when the value of the comparison signal CMP is set to 1, and then maintains the value of the disable flag DE at 1.

According to the second embodiment, the first and second determination processes of the identification data are performed during the transmission period of the inverted identification data /ID2. Therefore, the operation period control unit 174 generates the operation period signal EN set to 1 only during the transmission period of the inverted identification data /ID2, and then supplies the operation period signal EN to the switch 172 and the ID register 180. The switch 172 turns on only in an ID comparison period in which the operation period signal EN is set to 1. The ID register 180 outputs the raw identification data ID2 sequentially bit by bit in synchronization with the clock signal CSCK during the ID comparison period. In this case, the first determination process may be performed during the transmission period of the raw identification data ID2.

The functions of the read/write control unit M14 and the data transceiver unit M15 in FIG. 13 are the same as the functions of the circuits described with reference to FIG. 8. That is, when the disable flag DE is set to 1, the connection between the data transceiver unit M15 and the data signal line LD1 is set to the high impedance state.

Figure 14:
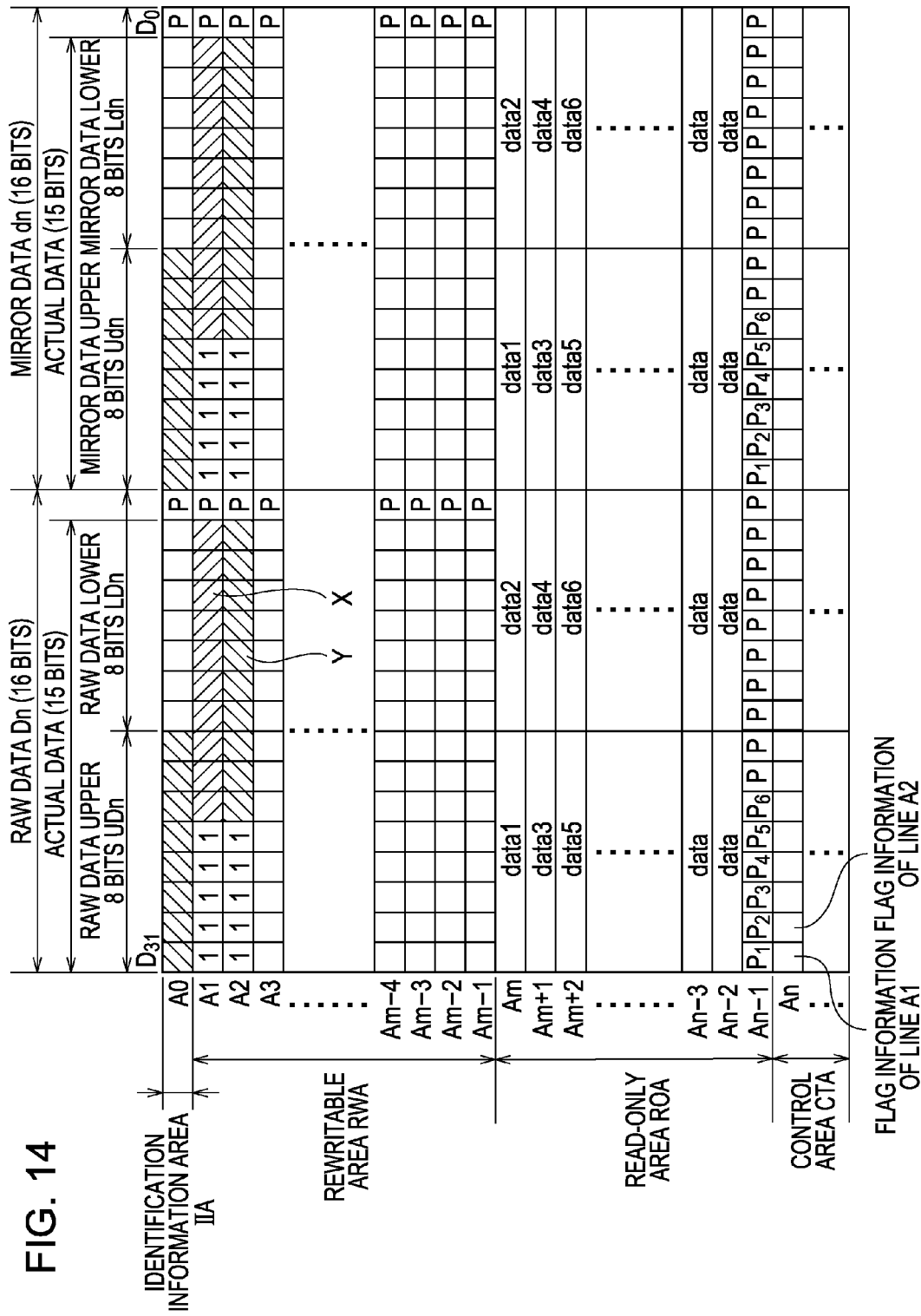
FIG. 14 is a diagram schematically illustrating a memory map of a storage area according to the second embodiment.

FIG. 14 is a diagram schematically illustrating a memory map of the ferroelectric memory cell array 132 according to the second embodiment. The ferroelectric memory cell array 132 includes a plurality of lines. One line includes 32-bit data D31 to D0. The one line corresponding to a line (that is, a word line) selected by the address counter M13. That is, the memory cell array 132 is sequentially accessed in order of lines selected by values indicated by the address counters. In the memory map, order of the sequential access is a direction from the upper side to the lower side by a line. Conveniently, memory cells on the further left side (the side of the most significant bit D31) are called upper cells in the same line. An upper line of a specific line means a line (line denoted by a smaller line number) which is located on the upper side from the specific line. A lower line of a specific line means a line (line denoted by a larger line number) which is located on the lower side from the specific line.

Data corresponding to one line of the memory cell array 132 corresponds to unit data (also referred to as an "access unit") when the memory control circuit 136 reads or writes data from or to the memory cell array 132. The access unit generally includes N bits (where N is an integer of two or more).

The memory cell array 132 is divided into an identification information area IIA, a rewritable area RWA, a read-only area ROA, and a control area CTA. The identification information area IIA which has a 32-bit storage area of line A0 is used for storing the ID number. The rewritable area RWA has a storage area corresponding to (m−1) lines from line A1 to line Am−1 (where m is an integer of two or more) and is an area in which the sub-control unit 50 of the printer 20 can write data. The read-only area ROA has a storage area corresponding to n−m lines from line Am to line An−1 (where n is an integer larger than m) and is an area in which the sub-control unit 50 of the printer 20 can only read data. The control area CTA is located in the lower area of the read-only area ROA and is a storage area where various kinds of flag information such as increment flag information and write lock flag information described below are stored.

The upper 16 bits of an arbitrary one line in the memory cell array 132 is a raw data area where raw data Dn is written. Here, the raw data Dn is the original data of the inverted data and the mirror data described below. Lower 16-bit of an arbitrary one line in the memory cell array 132 is a mirror data area where the mirror data dn is written. The mirror data is replicated data of the raw data Dn written in the upper 16 bits.

In a normal case, that is, when a problem, a writing error, or the like does not occur in the cells of each line, the raw data Dn and the mirror data dn have the same details for each line.

In the identification information area IIA and the rewritable area RWA, actual data is stored in the upper 15 bits of the raw data area of each line and a parity bit P associated with the actual data is stored in the final bit (16th bit). Here, the "actual data" refers to data used by the main control unit 40 of the printer 20 in order to perform various kinds of control (for example, control of a printing process and a user interface) of the printer 20. The actual data according to this embodiment includes data indicating the amount of consumed ink and data indicating a use start time of the ink cartridge. Likewise, the mirror data of the actual data of the raw data is stored in the upper 15 bits of the mirror data area and a parity bit P associated with the actual data of the raw data is stored in the final bit (16th bit). The parity bit P is a redundant bit set to "1" or "0" so that the number of "1"s in the 16-bit data including the parity bit P and the upper 15 bits is typically an odd number. Alternatively, the parity bit P may be set to "1" or "0" so that the number of "1"s in the 16-bit data including the parity bit P and the upper 15 bits is typically an even number. Instead of the parity bit P, a different type of redundant data or an error detection code may be used for the actual data.

Among m–n lines of the read-only area ROA, lines excluding the final line (line An–1) form an actual data area used for storing the actual data and the final line serves as a parity bit area used for storing the parity bit P. The parity bit P of the read-only area ROA may be assigned to each piece of information (for example, 8-bit actual data) of a predetermined unit in the actual data of the lines excluding the final line. One pair of actual data appended with the parity bit P in the read-only area ROA is called a "data set" or an "information set". If the number of bits of one data set is a constant value (for example, 8 bits or an integral multiple of 8 bits), the data set and the parity bit P can easily correspond to each other. When the number of sets of data is large, two or more lines may be assigned as the parity bit area of the read-only area ROA.

The reason for storing the parity bit P in the final line in the read-only area ROA is as follows. At least a part of the actual data stored in the read-only area ROA is represented by an 8-bit character code in some cases. In this case, when the parity bit P is appended immediately after the 8-bit code, the number of bits of one data set is 9 bits. Then, bit shift control of a 1-bit unit is necessary in order for the main control unit 40 to determine the compartmental location of the data set. On the other hand, when the parity bits P of the respective data sets of the read-only area ROA are all stored in the last line of the read-only area ROA, as shown in FIG. 14, it is possible to obtain an advantage where the main control unit 40 does not need to perform the bit shift control to obtain the actual data. In this embodiment, as described below, once reading of the data in the read-only area ROA suffices for reading data after the main control unit 40 of the printer 20 confirms the ink cartridge 100 (that is, the storage device 130) is mounted. Accordingly, there are scarcely any disadvantages that the actual data and the parity bits P are stored at the distant positions.

In the rewritable area RWA, on the other hand, the actual data is stored in the upper 15 bits of each 16-bit data and the parity bit P is stored in the final one bit. The reason is that the data in the rewritable area RWA can be written by a line and thus it is difficult to perform parity check upon writing data when the actual data and the parity bit P are stored at distant positions.

As known from the above description, the raw data includes the actual data and the parity bit P in the identification information area IIA and the rewritable area RWA. The raw data stored in the areas excluding the area for the final parity bit in the read-only area ROA is the actual data. The raw data stored in the final line of the read-only area ROA is the parity bit P. An advantage of the method of storing the actual data and the parity bit P in the storage device 130 will be described in detail after the reading process is described.

The 8-bit ID number (identification information) determined for every kind (color) of ink cartridge 100 is stored from the head cell in the head first line of the storage device 130, that is, line A0 of the identification information area IIA. The area storing the ID number is indicated by shading in FIG. 14. The remaining cells excluding the cells storing the parity bit P and the ID number of the raw data in line A0 are empty areas, and fixed data of 0 or 1 are stored in the empty areas. For example, when the number of kinds of ink cartridges 100 mounted on the printer 20 is M, the ID number takes M different values depending on the kinds of ink cartridges 100.

Information on the amount of consumed ink or various kinds of information such as use history information of the ink cartridge 100 is stored in the rewritable area RWA. A first ink consumption count value X is stored in the first line (line A1) of the rewritable area RWA. A second ink consumption count value Y is stored in the second line (line A2) of the rewritable area RWA. In FIG. 14, the areas storing the ink consumption count values X and Y are indicated by shading. The first ink consumption count value X is, for example, 10-bit information and is stored in cells corresponding to lower 10 bits among 15 bits excluding the parity bit P of line A1. Data is transmitted from the printer 20 so that 1s are typically stored in the upper 5 bits of line A1. The second ink consumption count value Y is also, for example, 10-bit information and is stored in cells corresponding to lower 10 bits among 15 bits excluding the parity bit P of line A2. Data is transmitted from the printer 20 so that 1s are typically stored in the upper 5 bits of line A2. The first ink consumption count value X and the second ink consumption count value Y are values indicating the cumulative amount of consumed ink of each ink cartridge 100 which can be calculated based on the amount of consumed ink estimated by the ink consumption amount estimation unit M3 (see FIG. 6). A difference between the two ink consumption count values X and Y will be described.

Ink end information is stored in a different predetermined line of the rewritable area RWA. The ink end information is, for example, 2-bit data and there are three kinds of ink end information: "01", "10", and "11". The value "01" indicates a state (hereinafter, also referred to as a full state) where the sensor 110 of the ink cartridge 100 does not detect that the level of the remaining ink is equal to or lower than the first threshold value Vref1, that is, the level of the remaining ink is larger than the first threshold value Vref1. The value "10" indicates a state (hereinafter, also referred to as a low state) where the level of the remaining ink is equal to or less than the first threshold value Vref1 and is larger than the ink end level (the first threshold value Vref1>the ink end level). The sensor 110 of the ink cartridge 100 detects that the level of the remaining ink is equal to or less than the first threshold value Vref1. The value "11" indicates a state (hereinafter, also referred to as an end state) where the level of the remaining ink is equal to or lower than the ink end level. The ink end level refers to a preferable level of the remaining ink at which the ink cartridge 100 is replaced due to air which may be mixed in the print head unit 60 due to the ink having been depleted if the printer 20 continues a printing process without stopping. For example, the first threshold value Vref1 is set to a level of remaining ink of about 1.5 g (gram) and the ink end level is set to a level of remaining ink of about 0.8 g. The process of using the ink end information will be described in detail below.

For example, manufacturer information indicating the manufacturer of the ink cartridge 100, manufacturing date of the ink cartridge 100, the capacity of the ink cartridge 100, kind of ink cartridge 100, and the like are stored in the read-only area ROA. At least a part of the information (for example, the kind of ink cartridge) is preferably described by an 8-bit character code in the read-only area ROA.

Various kinds of flag information such as increment flag information and write lock flag information are stored in the control area CTA. One bit of the increment flag information is prepared in each line of the memory cell array 132. The line in which the corresponding increment flag information is set to "1" is an area where rewriting (increment rewriting) a numeral value stored beforehand in the corresponding line into a numeral value larger than the numeral value is allowable but rewriting (decrement rewriting) the numeral value stored beforehand in the corresponding line into a numeral value smaller than the numeral value is not allowable. Rewriting is freely allowable in the line in which the corresponding increment flag information is set to "0". Referring to the increment flag information, the read/write control unit M14 of the memory control circuit 136 determines whether only the increment rewriting is allowed or the free rewriting is allowed. For example, the corresponding increment flag information is set to "1" in lines A1 and A2 in which the first ink consumption count value X and the second ink consumption count value Y are recorded, respectively. This is because the ink consumption count values X and Y are scarcely updated by the printer 20 except for in the direction of an increase. Accordingly, it is possible to reduce the possibility of erroneously writing data in lines A1 and A2. Hereinafter, like lines A1 and A2, a storage area where the corresponding increment flag information is set to "1" is called an "increment-only area". When the level of the remaining ink is stored replacing the amount of consumed ink, whether only the decrement rewriting is allowable or free rewriting is allowable may be controlled using decrement flag information instead of the increment flag information.

The write lock flag information registered in the control area CTA is prepared by one bit for each line of the identification information area IIA, the rewritable area RWA, and the read-only area ROA. A line in which the write lock flag information is set to "1" is an area where rewriting by access from the outside is not allowable. A line in which the write lock flag information is set to "0" is an area where rewriting by access from the outside is allowable. Referring to the write lock flag information, the read/write control unit M14 of the memory control circuit 136 determines whether or not the rewriting is allowable. The printer is shipped from a factory in the state where the write lock flag information is set to "0" in lines A1 to Am−1 of the rewritable area RWA, and thus erasing and writing data by the communication processing unit 55 of the printer 20 is allowable. In contrast, the printer is shipped from a factory in the state where the write lock flag information is set to "1" in line A0 of the identification information area IIA and lines Am to An of the read-only area ROA, and thus erasing and writing data by the communication processing unit 55 of the printer 20 is not allowable. The storage area where the write lock flag information is set to "1" is called a "write lock area".

Figure 15:
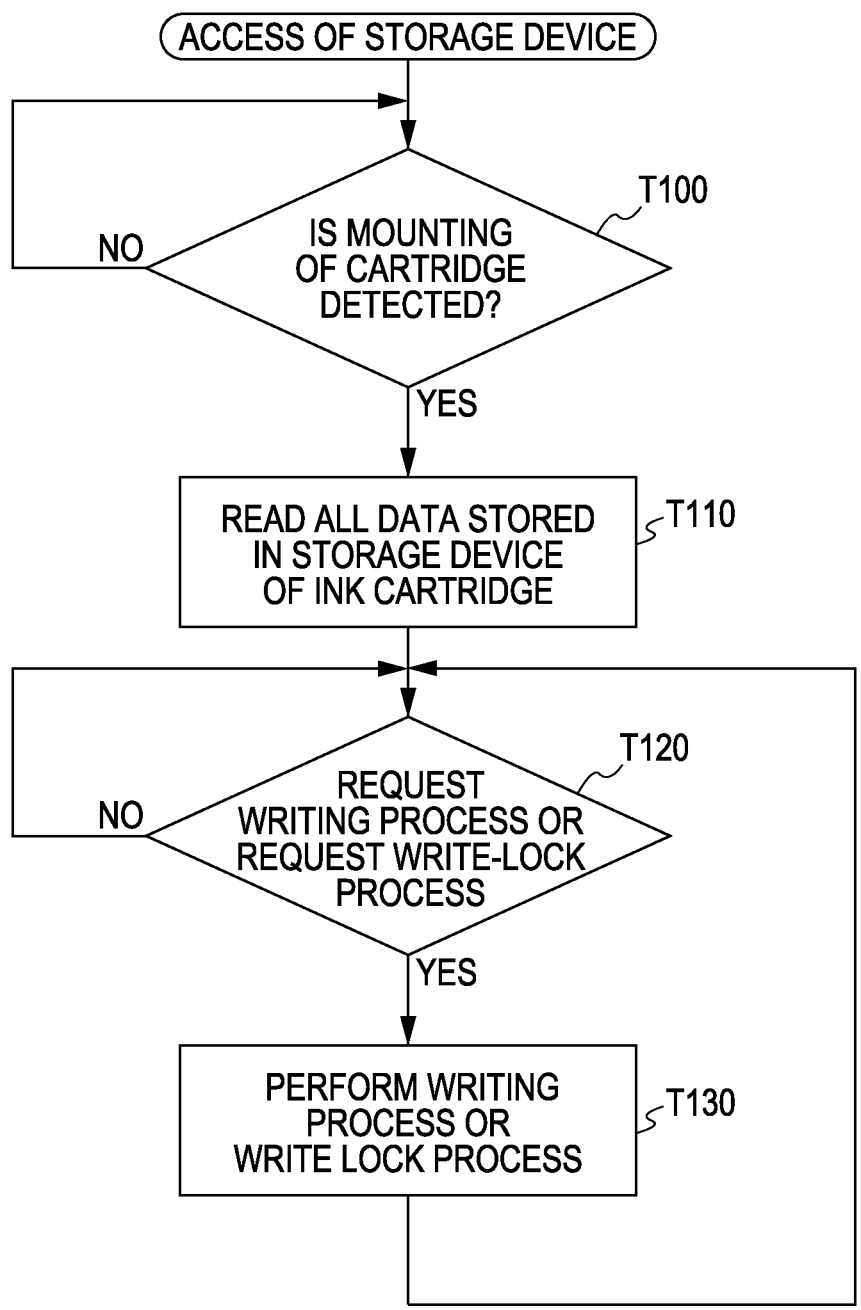
FIG. 15 is a flowchart illustrating the entire order of access to the storage device according to the second embodiment.

FIG. 15 is a flowchart illustrating the overall order of access to the storage device 130. This order is described mainly in terms of the sub-control unit 50. In step T100, when the sub-control unit 50 detects that the ink cartridge 100 is mounted on the printer 20, a process subsequent to step T110 starts. In step T110, the sub-control unit 50 reads all data stored in the storage device 130 of the mounted ink cartridge 100. The mounting of the ink cartridge 100 is detected (1) immediately after the printer 20 turns on and (2) when the ink cartridge 100 is exchanged. In the former case, reading data for all of the ink cartridges 100 mounted on the printer 20 in step T110 is performed. In the latter case, reading data only for a newly mounted ink cartridge 100 is performed. The read data is stored in the memory of the main control unit 40. Since the process is performed using the data stored in the memory of the main control unit 40 during the operation of the printer 20, it is not necessary to read the data again from the ink cartridge 100.

In step T120, the sub-control unit 50 waits until the main control unit 40 requests a writing process or requests a write lock process. In step T130, each process is performed in response to the request of the writing process or the request of the write lock process. The writing process is a process of writing data into the storage devices 130 of several ink cartridges 100. In the writing process, all data in the rewritable area RWA (see FIG. 14) of the storage device 130 to be accessed are generally written. The write lock process is a process of writing the write lock flag information (which is a flag indicating whether the writing process is allowable) in the control area CTA. The processes of steps T110 and T130 will be described in detail.

The overall order described in FIG. 15 is just an example, and thus the various processes may be performed in an order different from the above-described order. For example, data may be read from the storage device 130 irrespective of whether the ink cartridge is mounted. The range of reading or writing the data may be changed arbitrarily, as necessary. For example, a process of reading only the data in the rewritable area RWA may be performed at any timing to confirm the writing result of the data written in the storage device 130.

Figure 16:
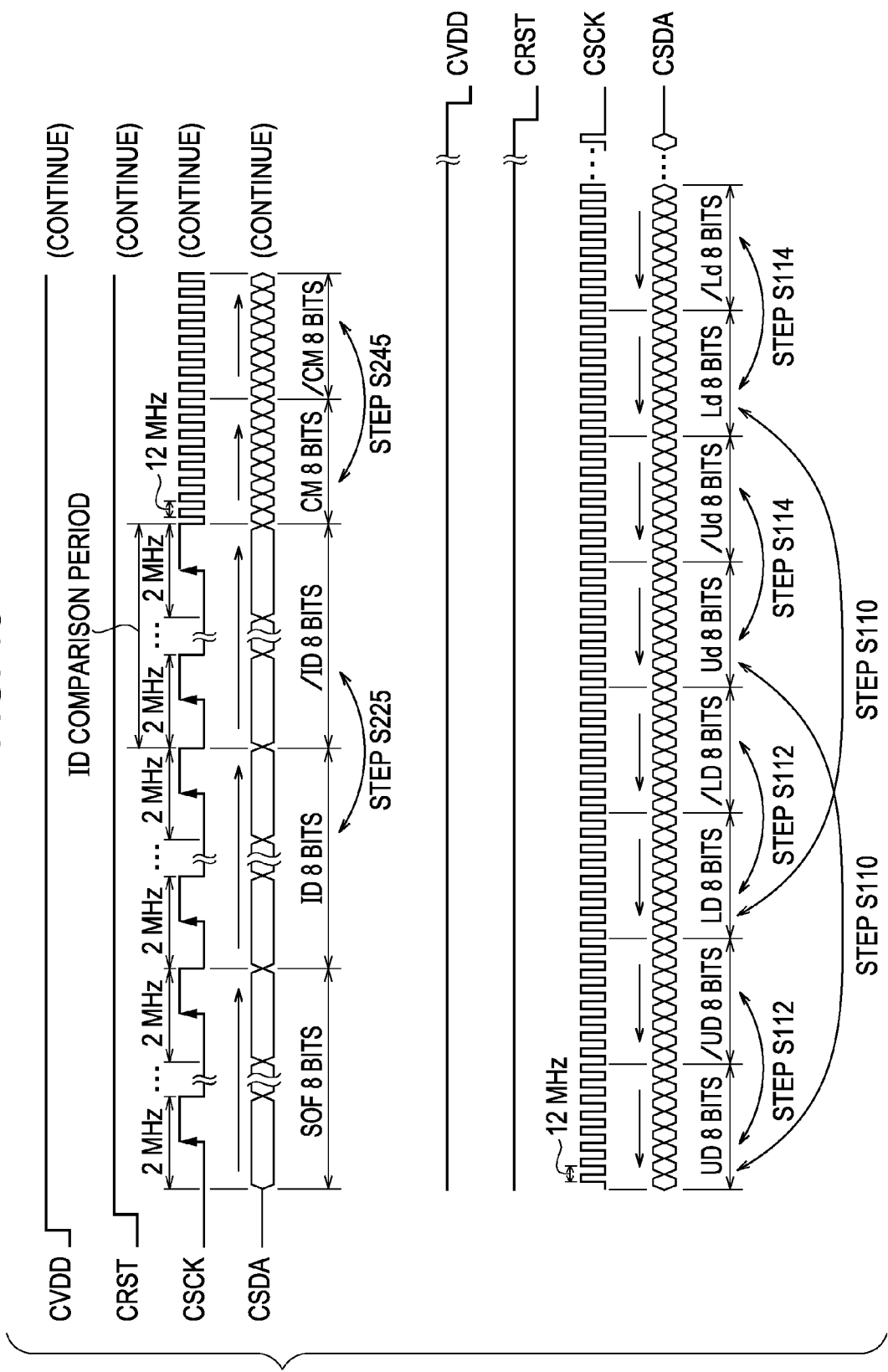
FIG. 16 is a timing chart schematically illustrating signals transmitted and received in a reading process from the storage device according to the second embodiment.

FIG. 16 is a timing chart schematically illustrating the signals transmitted and received between the communication processing unit 55 of the printer 20 and the memory control circuit 136 of the storage device 130 in the reading process from the storage device 130 according to the second embodiment. In FIG. 16, as in the first embodiment (see FIG. 9), the frequency of the clock signal CSCK is set to the low frequency (2 MHz) during the transmission period of the SOF data and the identification data and is set to the high frequency (12 MHz) during the transmission period of the command data CM and the read data. As a consequence, the consumption of current by the data signal line LD1 during the transmission period of the identification data can be reduced, and a high data transmission speed can be ensured. In the second embodiment, when the identification data ID1 and ID2 are compared to each other sequentially bit by bit and several bits are not in accordance with each other, as in the case described in FIG. 10, the data transceiver unit M15 is also set to the high impedance state immediately. Accordingly, the consumption of current by the data signal line LD1 can be reduced.

The main control unit 40 of the printer 20 transmits a reading command instructing the reading process from the storage device 130 of the ink cartridge 100 to the sub-control unit 50 via the bus BS. The communication processing unit 55 supplies the supply voltage CVDD to each ink cartridge 100 in response to the reading command. That is, an operational voltage is supplied to the storage device 130 of each ink cartridge 100 to set the state of the storage device 130 to an operable state. After the supply voltage CVDD is supplied, the low-level reset signal CRST is supplied to initialize the storage device 130. Typically, since the reset signal CRST is in the low level state upon ending the previous access, the reset signal CRST is set to the low level before the supply voltage CVDD is supplied to the storage device 130.

The communication processing unit 55 of the sub-control unit 50 starts the reading process when receiving the reading command from the main control unit 40. When the reading process starts, the communication processing unit 55 transfers the reset signal CRST to the low level and simultaneously transmits the clock signal CSCK with a predetermined frequency. When the reset signal CRST is transferred from the low level to the high level, the storage device 130 is set to a standby state of receiving the data signal CSDA from the communication processing unit 55.

Figure 17:
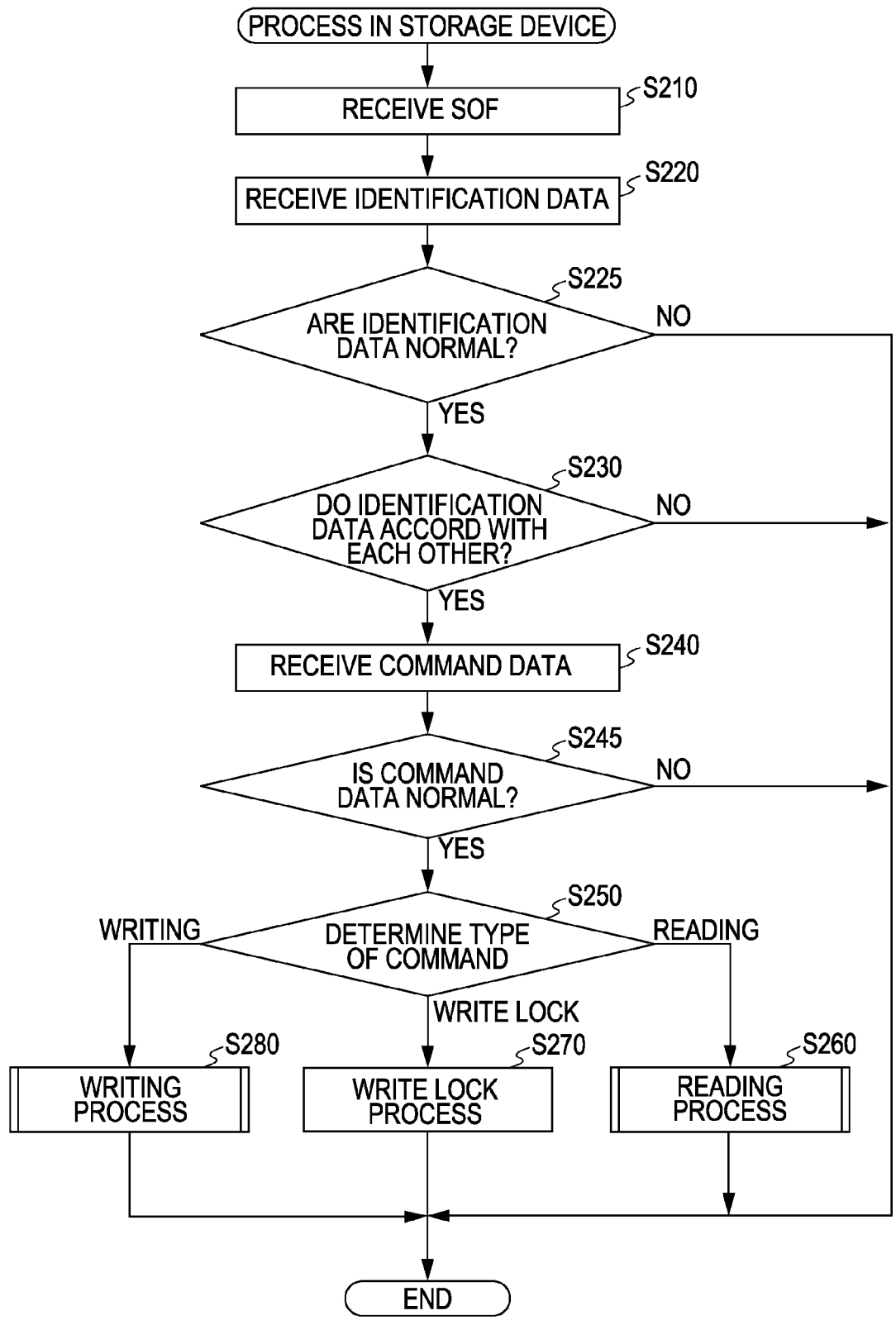
FIG. 17 is a flowchart illustrating a processing routine of a process (process in the storage device) in the storage device of an ink cartridge.

FIG. 17 is a flowchart illustrating a processing routine of the process (process in the storage device) performed in the storage device of the ink cartridge. The processing flow is executed by the memory control circuit 136 (see FIG. 6) and is not limited to the reading process. This processing flow is an overall processing flow including other processes (the writing process and the write lock process) in the storage device.

Before performing the process, the storage device 130 receives the supply voltage CVDD from the sub-control unit 50 to be activated and initializes the storage device 130 itself in accordance with the low-level reset signal CRST. In the initialization, the address counter M13 is reset to an initial value (=A0) and the various registers are reset to the initial value. The data transceiver unit M15 (see FIG. 13) of the storage device 130 sets transmission and reception directions of the data to a direction in which the storage device 130 receives the data from the sub-control unit 50.

When the process in the storage device starts, the memory control circuit 136 receives the SOF (Start Of Frame) data in step S210. The SOF data is a signal used for the sub-control unit 50 to instruct the storage device 130 of the communication start. In step S220, the memory control circuit 136 receives the identification data (ID number). As shown in FIG. 16, the identification data includes raw identification data ID and the inverted identification data /ID. The inverted identification data /ID is data obtained by inverting the raw identification data ID. In the specification, the inverted data is data having the same amount (the same number of bits) as that of the raw data and is data obtained by inverting the values of the respective bits of the raw data. Hereinafter, the inverted data of the raw data is denoted by a sign made by appending "/" (slash sign) to the head of the sign of the raw data. For example, in a case of the raw data ID=(01001001), the inverted data /ID=(10110110) is obtained.

In step S225, the ID comparison unit M11 determines whether the received identification data are normal. Specifically, the EX-NOR circuit 186 of the ID comparison unit M11 performs exclusive OR on the raw identification data ID2 and the inverted identification data /ID2 bit by bit to determine whether all values are 1 (see FIG. 16). Whether a communication error occurs in the received identification data can be determined by the process. When there is no communication error, it is determined that the received identification data is normal. When there is a communication error, it is determined that the received identification data is not normal. When it is determined that the received identification data is not normal, the ID comparison unit M11 does not perform any process and the process ends.

On the other hand, in step S230, the EX-OR circuit 176 (see FIG. 13) of the ID comparison unit M11 determines whether the first identification data ID1 (the first ID number) assigned by the storage device 130 itself and the received raw identification data ID2 (the second ID number) are in accordance with each other. At this time, the read/write control unit M14 reads the ID number stored in line A0 of FIG. 14. The ID comparison unit M11 compares the first ID number ID1 read by the read/write control unit M14 to the second ID number ID2 transmitted from the communication processing unit 55 bit by bit. When it is determined that the two ID numbers are not in accordance with each other, the memory control circuit 136 does not perform any process and the process ends. The data transceiver unit M15 (see FIG. 13) of the storage device 130 is set to the high impedance state. The circuit shown in FIG. 13 simultaneously performs the process of step S225 and the process of step S230. As understood from this example, the process of step S225 and the process of step S230 may be simultaneously performed, or one of the process of step S225 and the process of step S230 may be performed earlier than the other thereof.

When it is determined that the two ID numbers ID1 and the ID2 are in accordance with each other in this way, the memory control circuit 136 receives the command data supplied in the data signal CSDA in step S240. As shown in FIG. 16, the command data includes raw command data CM and inverted command data /CM. The inverted command data /CM is data obtained by inverting the raw command data CM. Among 8 bits of the raw command data CM, upper 4 bits and lower 4 bits have an inverted relationship to one another. In step S245, the command analysis unit M12 determines whether the received command data is normal. Specifically, the command analysis unit M12 determines whether the upper 4 bits and the lower 4 bits of the raw command data CM become the inverted data one another. The command analysis unit M12 determines whether the upper 4 bits and the lower 4 bits of the inverted command data /CM become the inverted data of one another. The command analysis unit M12 performs exclusive OR bit by bit on the raw command data CM and the inverted command data /CM to determine whether all values become 1. As a consequence, when (i) the upper 4 bits and the lower 4 bits of the raw command data CM become the inverted data of one another, (ii) the upper 4 bits and the lower 4 bits of the inverted command data /CM become the inverted data of one another, and (iii) all bits are 1 by the exclusive OR of the raw command data CM and the inverted command data /CM, the command analysis unit M12 determines that the received command data is normal (there is no communication error). On the other hand, when any of three conditions (i) to (iii) is not satisfied, the command analysis unit M12 determines that the received command data is not normal (there is a communication error).

When it is determined that the command data is not normal, the memory control circuit 136 terminates the process. On the other hand, when it is determined that the command data is normal, the command analysis unit M12 analyzes the command data to determine a type of command (type of access) in step S250. Here, the type of command data preferably includes at least a writing command, a reading command, and a write lock command. The writing command is a command for giving an instruction to write data to the ferroelectric memory cell array 132. The reading command is a command for giving an instruction to read data from the ferroelectric memory cell array 132. The write lock command is a command for giving an instruction to write the write lock flag to the control area CTA (see FIG. 14). The memory control circuit 136 performs each process in accordance with the command indicated by the command data (steps S260, S270, and S280). When any command in the storage device 130 does not correspond as the determination result of the type of command, the command analysis unit M12 determines that the analysis of the command data is not possible. When the command analysis unit M12 determines that the analysis of the command data is not possible, the memory control circuit 136 does not perform any process and the process ends (not shown).

The steps of the flowchart shown in FIG. 17 may be modified arbitrarily in the order within the range in which there is no contradiction in the processing details or may be performed in parallel. For example, the memory control circuit 136 may determine whether the identification data is normal in step S225, after confirming the ID numbers (the identification data) are in accordance with each other in step S230. The command data may be received in step S240 while it is determined whether the identification data is normal in step S225.

Figure 18:
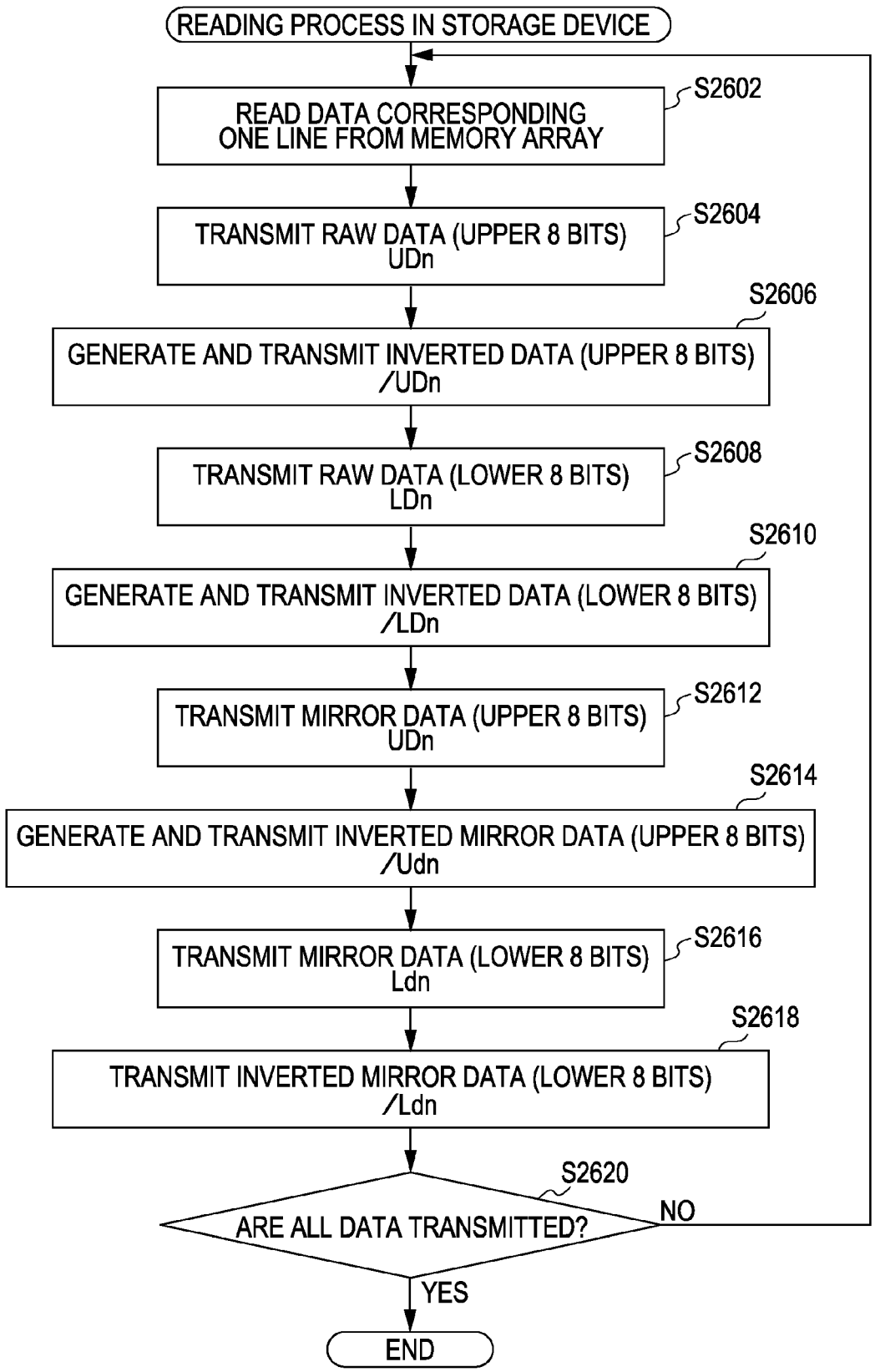
FIG. 18 is a flowchart illustrating a processing routine of a reading process in the storage device.

FIG. 18 is a flowchart illustrating a processing routine of the reading process (step S260 in FIG. 17) in the storage device. The read/write control unit M14 of the memory control circuit 136 reads data line by line from the ferroelectric memory cell array 132 in accordance with the address selected by the address counter M13, and transmits the data line by line as the data signal CSDA to the communication processing unit 55. In the reading process, the data transceiver unit M15 (see FIG. 13) sets the data transmission and reception directions to the transmission direction. The counter control unit M16 supplies the control signal to the address counter M13 so that line A1 (see FIG. 14) is designated as the initial line of a reading target. Thereafter, in step S2602, the read/write control unit M14 reads the data corresponding to one line (32 bits) from the ferroelectric memory cell array 132 based on the designated address of the count value of the address counter M13, and stores the read data in a register (not shown). The data to be transmitted to the communication processing unit 55 in the following processes is temporarily stored in the output register 150 (see FIG. 13) and then is transmitted.

The 32-bit data corresponding to one line includes the following four data (see FIG. 14):

(1) raw data upper 8 bits UDn (where n denotes a line address), (2) raw data lower 8 bits LDn, (3) mirror data upper 8 bits Udn (mirror data of raw data upper 8 bits UDn), and (4) mirror data lower 8 bits Ldn (mirror data of raw data lower 8 bits LDn).

The data transceiver unit M15 transmits the most significant 8 bits of the 32-bit data corresponding one line as the raw data upper 8 bits UDn to the sub-control unit 50 (step S2604). Then, the inverted data generation unit M18 inverts the respective bits of the raw data upper 8 bits UDn to generate inverted raw data upper 8 bits /UDn. Subsequently, the data transceiver unit M15 transmits the inverted raw data upper 8 bits /UDn to the sub-control unit 50 (step S2606). Subsequently, the data transceiver unit M15 transmits 8 bits of 9th to 16th bits as the raw data lower 8 bits LDn to the sub-control unit 50 (step S2608). Subsequently, the inverted data generation unit M18 inverts the respective bits of the raw data lower 8 bits LDn to generate inverted raw data lower 8 bits /LDn. Then, the data transceiver unit M15 transmits the generated inverted raw data lower 8 bits /LDn to the sub-control unit 50 (step S2610). Subsequently, the data transceiver unit M15 transmits 8 bits of 17th to 24th bits as the mirror data upper 8 bits Udn to the sub-control unit 50 (step S2612). Subsequently, the inverted data generation unit M18 inverts the respective bits of the mirror data upper 8 bits Udn to generate the inverted mirror data upper 8 bits /Udn. Then, the data transceiver unit M15 transmits the generated inverted mirror data upper 8 bits /Udn to the sub-control unit 50 (step S2614). Subsequently, the data transceiver unit M15 transmits 8 bits of 25th to 32nd bits as the mirror data lower 8 bits Ldn to the sub-control unit 50 (step S2616). Subsequently, the inverted data generation unit M18 inverts the respective bits of the mirror data lower 8 bits Ldn to generate inverted mirror data lower 8 bits /Ldn. Then, the data transceiver unit M15 transmits the generated inverted mirror data lower 8 bits /Ldn to the sub-control unit 50 (step S2618).

When the transmission of a total of 64 bits of the data corresponding to one line and the inverted data ends, the memory control circuit 136 determines whether the transmission of all of the data ends (step S2620). When the transmission of all of the data does not end, the process returns to step S2602 and the processes of steps S2602 to S2618 are repeatedly performed on the data of the subsequent line of the ferroelectric memory cell array 132. The memory control circuit 136 terminates the reading process, when the transmission of all of the data ends.

In the process of FIG. 18, the data corresponding one line is read from the memory cell array 132 in step S2602. However, the data may not be read line by line from the memory cell array 132, as long as the data can be transmitted in synchronization with the clock signal supplied to the storage device 130 in the order of step S2604 to step S2618 after the command data is received.

Figure 19:
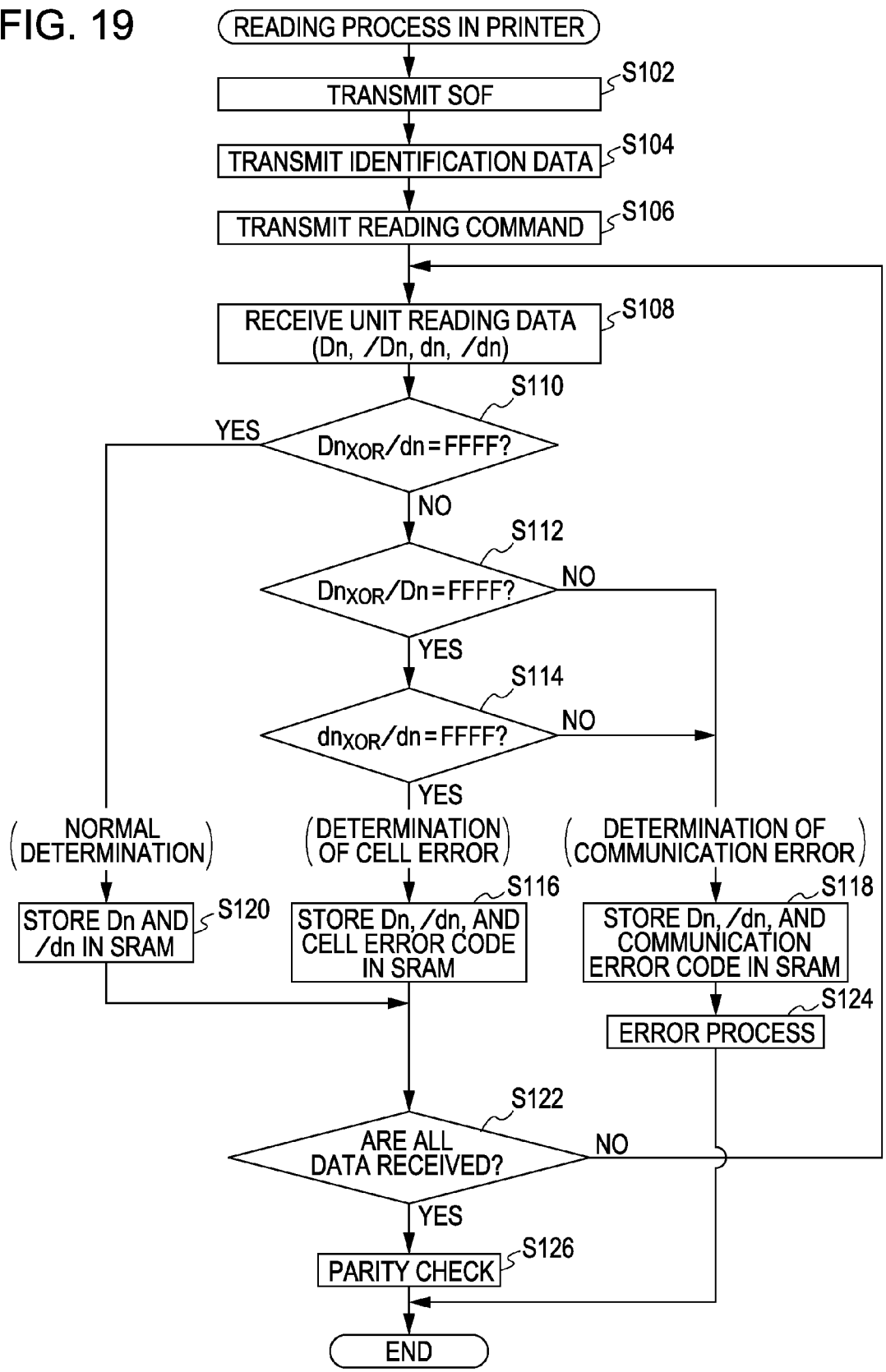
FIG. 19 is a flowchart illustrating a processing routine of a reading process from the storage device in the printer.

FIG. 19 is a flowchart illustrating a processing routine of a process of reading data from the storage device 130 by the sub-control unit 50 of the printer 20. In step S102, the communication processing unit 55 transmits the SOF data (see FIG. 16). In steps S104 and S106, the communication processing unit 55 transmits the operation code (see FIG. 16) after transmitting the SOF data. The operation code is data in which the identification data and the command data are continuous. The identification data is identification information used for designating the storage device 130 of the ink cartridge 100 to be read. The identification data includes 8-bit raw identification data ID and inverted identification data /ID thereof. The inverted identification data /ID is generated by the main control unit 40 or the communication processing unit 55 based on the raw identification data ID. By doubling the identification data in this way, it is possible to reduce the possibility that the storage device 130 of the ink cartridge 100 which is not a reading target operates erroneously.

In step S106, the communication processing unit 55 transmits the command data. The command data is data used for transmitting the type (reading, writing, or the like) of access to the storage device 130. The command data includes 8-bit raw command data CM and inverted command data /CM thereof (see FIG. 16). The command data transmitted by the reading process is a read command. Among 8 bits of the raw command data CM, upper 4 bits and lower 4 bits have an inverted relationship to one another. The inverted command data /CM is generated by the main control unit 40 or the communication processing unit 55 based on the raw command data CM. By doubling the command data in this way, it is possible to reduce the possibility that the storage device 130 operates erroneously.

In step S108, the communication processing unit 55 starts receiving the reading data transmitted from the storage device 130 from the subsequent clock signal CSCK after the transmission of the command data ends. The communication processing unit 55 receives the reading data corresponding to one line of the storage device 130 as one unit. Specifically, the communication processing unit 55 receives the unit reading data corresponding to 8 bits×8=64 bits sequentially bit by bit in synchronization with the ascending of the clock signal CSCK. The 64-bit unit reading data includes the following eight pieces of data (see FIG. 16):

(1) raw data upper 8 bits UDn (where n denotes a line address),
(2) inverted raw data upper 8 bits /UDn,
(3) raw data lower 8 bits LDn,
(4) inverted raw data lower 8 bits /LDn,
(5) mirror data upper 8 bits Udn (mirror data of raw data upper 8 bits UDn),
(6) inverted mirror data upper 8 bits /Udn,
(7) mirror data lower 8 bits Ldn (mirror data of raw data lower 8 bits LDn), and
(8) inverted mirror data lower 8 bits /Ldn.

The inverted data /UDn, /LDn, /Udn, and /Ldn are data generated by the inverted data generation unit M18 of the storage device 130.

In the specification, the following terms of the data are used:

(a) raw data Dn: raw data upper 8 bits UDn+raw data lower 8 bits LDn,
(b) inverted data /Dn: inverted raw data upper 8 bits /UDn+inverted raw data lower 8 bits /LDn
(c) mirror data dn: mirror data upper 8 bits Udn+mirror data lower 8 bits Ldn, and
(d) inverted mirror data /dn: inverted mirror data upper 8 bits /Udn+inverted mirror data lower 8 bits /Ldn.

That is, the unit reading data received by the communication processing unit 55 can be said to be data including the raw data Dn, the inverted data /Dn, the mirror data dn, and the inverted mirror data /dn. Finally, the communication processing unit 55 reads all of the data in the storage device 130 by repeatedly receiving the unit reading data.

When receiving one pair of unit reading data, the communication processing unit 55 temporarily stores the unit reading data in a register (not shown) and performs the processes subsequent to step S110 of FIG. 19. In step S110, the communication processing unit 55 first determines whether the result of exclusive OR of an m-th (where m is an integer in the range from 1 to 16) value of the raw data Dn and an m-th value of the inverted mirror data /dn among the unit reading data is true "1" for all m's (see FIG. 16). When the result of the exclusive OR is true for all of 16 bits, that is, FFFFh (where the last "h" indicates a hexadecimal form), the communication processing unit 55 determines that a communication state and a memory cell of a reading source are normal. That is, when the exclusive OR of the raw data Dn and the inverted mirror data /dn is FFFFh, it can be estimated that the raw data Dn and the mirror data dn stored in the storage device 130 are the same as each other and both the raw data Dn and the inverted mirror data /dn are correctly transmitted. Accordingly, in this case, it can be determined that both the state of the memory cell in the storage device 130 and the communication state between the communication processing unit 55 and the storage device 130 are normal. In step S120, the communication processing unit 55 stores the raw data Dn and the inverted mirror data /dn in the SRAM 551, when determining that both the memory cell and the communication state are normal.

On the other hand, when the result of the exclusive OR is false "0" in either of 16 bits, that is, is not FFFFh, the communication processing unit 55 determines whether exclusive OR of the raw data Dn and the inverted data /Dn is FFFFh in step S112. When the result of the exclusive OR is FFFFh, the communication processing unit 55 determines whether exclusive OR of the mirror data dn and the inverted mirror data /dn is FFFFh in step S114. When the result of the exclusive OR of the raw data Dn and the inverted data /Dn is not FFFFh or when exclusive OR of the mirror data dn and the inverted mirror data /dn is not FFFFh, the communication processing unit 55 determines that a communication error occurs. The reason for determining that the communication error occurs is that the mutually inverted data are not correctly received. In this case, in step S118, the communication processing unit 55 stores the raw data Dn and the inverted mirror data /dn in the SRAM 551 and also stores a predetermined communication error code indicating a communication error in an error code register 553 of the communication processing unit 55. Then, in step S124, the communication processing unit 55 performs a predetermined error process and the process ends. Information identifying whether a communication error occurs in the transmission of the raw data from the storage device (No in steps S112 and S114) and identifying whether a communication error occurs in the transmission of the mirror data from the storage device (Yes in step S114) may be stored in the error code register 553. In the error process of step S124, for example, the main control unit 40 may be notified of a communication error or may be notified that the reading process ends. Alternatively, step S124 may be omitted. Since data may not be correctly received in the state where a communication error occurs, the communication processing unit 55 terminates the reading process after step S124.

Since the main control unit 40 can recognize occurrence of a communication error with reference to the communication error code stored in the SRAM 551, the main control unit 40 can perform a process suitable for the communication error. For example, when the main control unit 40 can recognize the occurrence of a communication error in either the raw data Dn or the mirror data dn, the main control unit 40 performs various processes (for example, a process of checking the level of remaining ink and a process of notifying a user of the level of remaining ink) using the data used when no communication error occurs. Alternatively, the main control unit 40 may try to remedy the communication state (the contact state of the terminals) by moving and stopping the carriage 30 using the carriage motor 32 (see FIG. 1) and then may transmit the reading command again to the sub-control unit 50 to perform the reading process.

When the exclusive OR of the raw data Dn and the inverted data /Dn is FFFFh in step S112 and the exclusive OR of the mirror data dn and the inverted mirror data /dn is FFFFh in step S114, the communication processing unit 55 determines that there is a memory cell error of the storage device 130. The reason for determining that there is the memory cell error is that no communication error occurs since the mutually inverted data are correctly received, and there is a high possibility that there is no consistency between the data stored in the raw data area and the data stored in the mirror data area in the storage device 130. In this case, in step S116, the communication processing unit 55 stores the raw data Dn and the inverted mirror data /dn in the SRAM 551 and also stores a predetermined memory cell error code indicating a memory cell error in the error code register 553 of the communication processing unit 55. The memory cell error is a problem occurring when either a memory cell storing the raw data Dn to be processed or a memory cell storing the mirror data do to be processed is damaged, and thus the stored information is not correctly stored.

After step S120 or Step S116 is executed, the communication processing unit 55 determines whether all of the data to be read are completely received in step S122. When all of the data are completely received, the communication processing unit 55 terminates the reading process. Specifically, when terminating the reading process, as shown in FIG. 16, the communication processing unit 55 changes the reset signal CRST from a high level to a low level and also stops supplying the clock signal CSCK. The communication processing unit 55 stops supplying the supply voltage CVDD, when stopping supplying the clock signal CSCK. When the reading of all of the data is completed, the process returns to step S108 and the above-described process is repeated for the subsequent unit reading data. For example, the unit reading data D1, /D1, d1, and /d1 of a first line are subjected to the processes of steps S108 to S122, and then the unit reading data D2, /D2, d2, and /d2 of a second line are subjected to the above processes. Here, the "first line" corresponds to line A1 in FIG. 14 and the "second line" corresponds to line A2. The reading process is repeated until all of the data in the storage device 130 are read. Alternatively, the main control unit 40 designates the final line of the reading process and the sub-control unit 50 may perform the reading process up to the designated line.

All of the data in the storage device 130 are temporarily stored in the SRAM 551 by the reading process. Even when a communication error or a memory cell error occurs in the data in the rewritable area RWA, an error code corresponding to the communication error or the memory cell error is stored in the error code register 553 of the communication processing unit 55. The raw data Dn, the inverted mirror data /dn, the communication error, and the cell error code stored in the communication processing unit 55 are acquired by the main control unit 40 and are stored in the memory of the main control unit 40.

In step S126, the main control unit 40 performs parity check on the raw data Dn and the inverted mirror data /dn determined that the memory cell error occurs. As described in FIG. 14, the raw data Dn and the inverted mirror data /dn stored in the rewritable area RWA each include the 15-bit actual data and the parity bit P. The main control unit 40 can perform various processes (the process of checking the level of remaining ink and the process of notifying a user of the level of remaining ink) associated with the level of remaining ink by using the data in which the actual data and the parity bits are consistent among the raw data Dn and the inverted mirror data /dn determined that the memory cell error occurs. When a parity error occurs in both of the raw data Dn and the inverted mirror data /dn as the result of the parity check or when both the data Dn and /Dn are consistent with each other in the parity bits, there is a high possibility that a memory cell error occurs. In this case, a message notifying a user of the memory cell error of the ink cartridge 100 may be displayed on a display panel of the operation unit 70. When reading the data in the rewritable area RWA to confirm the written result of the data written in the rewritable area RWA, the main control unit 40 may determine whether the data are correct by comparing the writing data stored in the main control unit 40 to the raw data Dn and the inverted mirror data /dn determined that the memory cell error occurs.

The data in the read-only area ROA is preferably subjected to the parity check in step S126. The parity check is not performed during the reading process, but is performed after the reading process is completed. Even when the parity bits P of the read-only area ROA are stored in the final line of the read-only area ROA, as shown in FIG. 14, the reading process or the parity check is not delayed. When the parity bit P is arranged in the final line due to the fact that the data in the read-only area ROA includes the 8-bit character code, an advantage is obtained that it is not necessary for the main control unit 40 to perform the bit shift control to obtain the actual data. On the other hand, the data in the rewritable area RWA does not include the 8-bit character code and the actual data can be sufficiently expressed by 15 or less bits. Therefore, when the parity bit P is arranged in the final bit of 16 bits, an advantage can be obtained that it is easy to handle the data in the writing process or the reading process.

In the reading process according to this embodiment, the parity check is not performed when it is determined that the read data are normal or a communication error occurs by the determination of steps S110 to S114. The parity check is performed only when it is determined that a memory cell error occurs. Accordingly, the process can be further simplified compared to a case where the parity check is performed on all of the data. However, even when it is determined that a communication error occurs in the read data, the parity check may be performed. In this case, when there is no consistency between the raw data Dn and the inverted mirror data /dn, the parity check is performed.

The consistency between the raw data Dn and the inverted mirror data /dn is determined in step S110. Instead, the consistency between the raw data Dn and the mirror data dn may be determined or the consistency between the inverted data of the raw data Dn and the mirror data dn may be determined. It can be understood that the three kinds of determination are common in that the consistency between the raw data Dn and the mirror data dn (that is, two pairs of data included in one line of the memory cell array) is determined. The parity check in the reading process is preferably performed when there is no consistency between two pairs of data read from the memory cell array. Accordingly, it is possible to improve reliability of the data transmitted and received by communication.

After the reading process, the main control unit 40 performs a predetermined control process (for example, a process of checking the level of remaining ink, a process of notifying a user of the level of remaining ink, or the like) on the raw data Dn and the inverted mirror data /dn to which an error code is not assigned by using the raw data Dn. When there are the raw data Dn and the inverted mirror data /dn to which the communication error code is assigned, the main control unit 40 performs a process of solving a communication error, for example, by displaying a message prompting a user to readjust the mounted ink cartridge 100 on the display panel of the operation unit 70.

In the above-described reading process, the raw data Dn and the inverted data /Dn are transmitted from the storage device 130 to the sub-control unit 50. Therefore, the sub-control unit 50 can determine whether a communication error occurs by confirming the consistency between the raw data Dn and the inverted data /Dn. As a consequence, reliability of the communication between the sub-control unit 50 and the storage device 130 can be improved. Accordingly, it is possible to reduce the possibility that a problem such as an erroneous operation of the printer 20 may occur. In the reading process from the storage device 130, the respective bits of the raw data Dn and the inverted data /Dn have the inverted relationship. Therefore, it is possible to determine a communication error reliably, for example, when there is a communication error in which only either one of the low level and the high level is shown on the data signal line LD1 due to a contact failure between the data terminal 260 of the ink cartridge 100 and the corresponding terminal of the printer 20. In the reading process from the storage device 130, the storage device 130 transmits the mirror data dn, which is substantially the same as the raw data Dn, and the inverted mirror data /dn, which is substantially the same as the inverted data /Dn, to the sub-control unit 50. Therefore, for example, even when there is no consistency between the raw data Dn and the inverted data /Dn due to a communication error, but when there is the consistency between the mirror data dn and the inverted mirror data /dn, the printer 20 continues the process using either the mirror data dn or the inverted mirror data /dn, thereby improving a communication error resistance characteristic. Moreover, since the storage device 130 stores both the raw data Dn and the mirror data dn in the ferroelectric memory cell array 132, the storage device 130 can transmit both to the printer 20. As a consequence, even when a memory cell error occurs in either the raw data area or the mirror data area of the ferroelectric memory cell array 132, the printer 20 can continue the normal process using the data stored in an area where no memory cell error occurs. Accordingly, a cell error resistance characteristic is improved, and thus the failure rate of the storage device 130 can be greatly reduced.

The printer 20 according to this embodiment first checks the consistency between the raw data Dn and the inverted mirror data /dn, when receiving the raw data Dn, the inverted data /Dn, the mirror data dn, and the inverted mirror data /dn. When there is no consistency between the raw data Dn and the inverted mirror data /dn, the printer 20 checks the consistency between the raw data Dn and the inverted data /Dn and the consistency between the mirror data dn and the inverted mirror data /dn. When there is no consistency between the raw data Dn and the inverted mirror data /dn and there is consistency between the raw data Dn and the inverted data /Dn and the consistency between the mirror data dn and the inverted mirror data /dn, it is determined that a memory cell error occurs. When there is no consistency between the raw data Dn and the inverted mirror data /dn and there is no consistency between the raw data Dn and the inverted data /Dn and the consistency between the mirror data dn and the inverted mirror data /dn, it is determined that a communication error occurs. Accordingly, the printer 20 can correctly recognize the types of error and thus can perform a process suitable for the types of error.

In this embodiment, in the ferroelectric memory cell array 132 (see FIG. 14), the actual data and the parity bit P are stored in the raw data area and the actual data and the parity bit P are also stored in the mirror data area. In the reading process from the rewritable area RWA, the actual data (upper 15 bits) and the parity bit P (lower 1 bit) stored in the raw data area are transmitted from the storage device 130 to the sub-control unit 50, and the actual data (upper 15 bits) and the parity bit P (lower 1 bit) stored in the mirror data area are simultaneously transmitted from the storage device 130 to the sub-control unit 50. Accordingly, the printer 20 receiving these data can perform the parity check on the actual data stored in the raw data area and can simultaneously perform the parity check on the actual data stored in the mirror data area. The main control unit 40 can continue the normal process using the actual data in which no parity error occurs, even when the parity error occurs in either the actual data stored in the raw data area or the actual data stored in the mirror data area. As a consequence, the communication error resistance characteristic and the cell error resistance characteristic can be improved.

Figure 20:
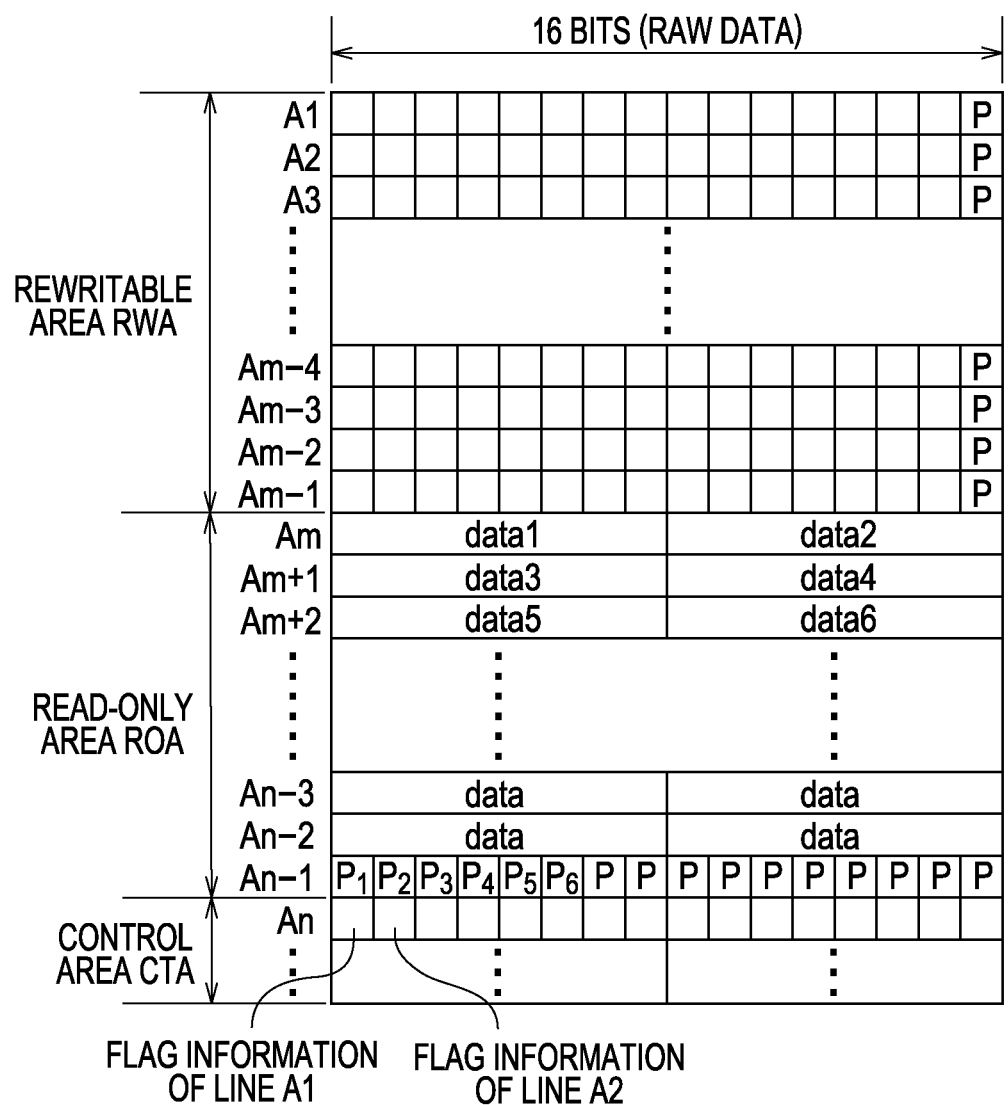
FIG. 20 is a diagram schematically illustrating a memory map recognized in the printer for a writing process to the storage device.

FIG. 20 is a diagram schematically illustrating a memory map of the storage device 130 recognized by the main control unit 40 of the printer 20 in the writing process to the storage device 130. In the writing process, the main control unit 40 and the sub-control unit 50 recognize the memory map as a memory map of a writing target area in the storage device 130. That is, in the writing process, the main control unit 40 and the sub-control unit 50 recognize that only the raw data area (left half part of FIG. 14) of the actual ferroelectric memory cell array 132 (FIG. 14) exists and the mirror data area does not exists. It is recognized that one line of the raw data area has 16 bits. In the SRAM 551 of the sub-control unit 50, the memory area represented as the memory map is secured as a writing data area. However, as the number of lines of the writing data area, the same line number as the line number of the rewritable area RWA may be prepared, and the read-only area ROA or the control area CTA may be omitted.

The main control unit 40 of the printer 20 writes the data to be written in the storage device 130 of the predetermined ink cartridge 100 in the SRAM 551 of the sub-control unit 50 via the bus BS. In the writing process, as described above, the main control unit 40 recognizes that the storage device 130 is a memory with 16 bits in one line. Therefore, the data to be written in the storage device 130 are the actual data with the upper 15 bits and the parity bit P with the lower 1 bit. The parity bit P may be generated by the main control unit 40 and may be appended to the actual data with the upper 15 bits, and thus may be written as the data with a total of 16 bits in the SRAM 551. Alternatively, the parity bit P may be generated by the sub-control unit 50 and may be appended whenever the main control unit 40 writes the 15-bit data in the SRAM 551. Thereafter, the main control unit 40 notifies the sub-control unit 50 of one writing target storage device 130 via the bus BS and also transmits the writing command instructing that the data written in SRAM 551 are written in the writing target storage device 130. When receiving the writing command, the sub-control unit 50 starts the writing process.

Figure 21:
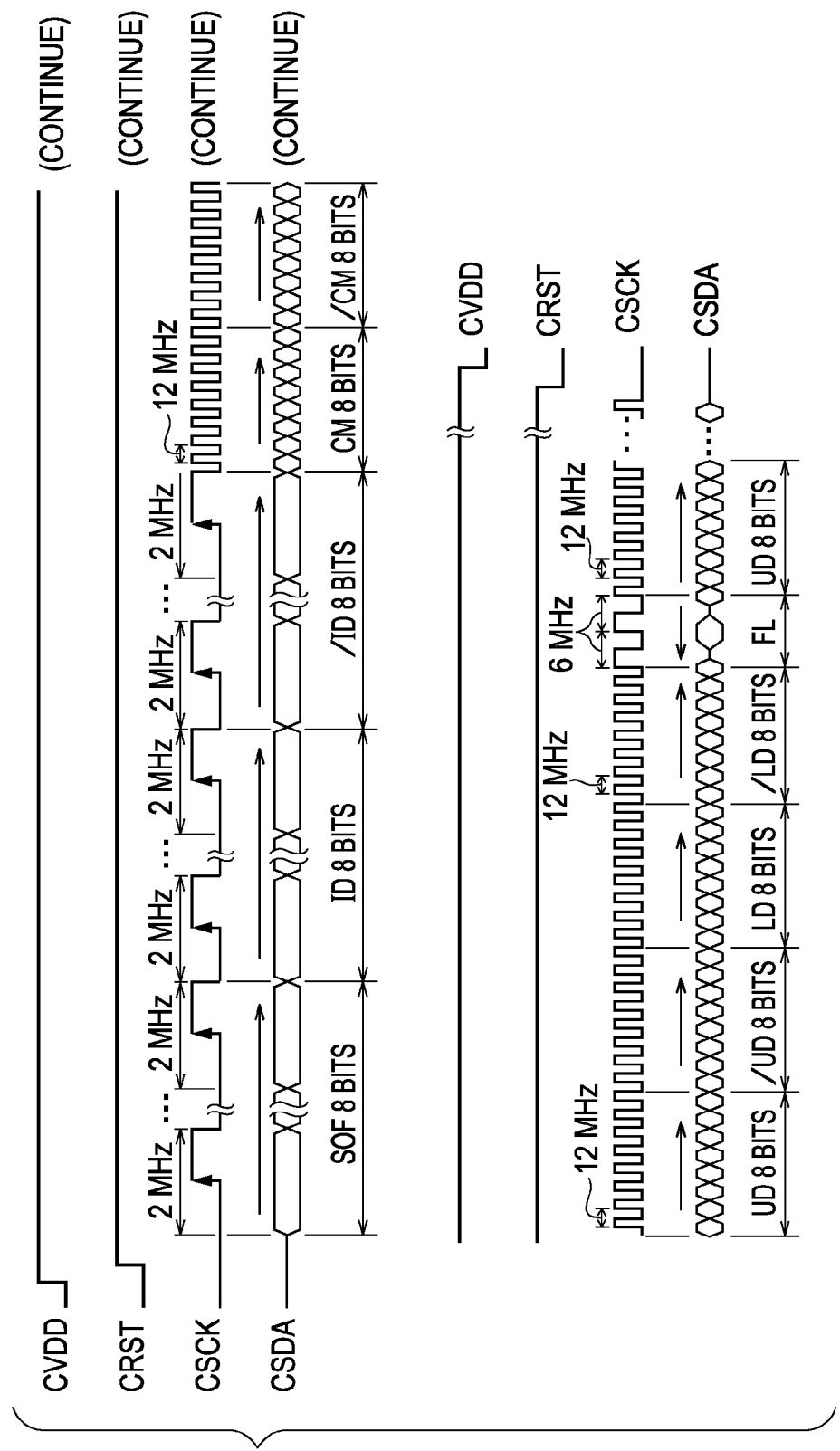
FIG. 21 is a timing chart schematically illustrating signals transmitted and received in a writing process to the storage device according to the second embodiment.

FIG. 21 is a timing chart schematically illustrating the signals transmitted and received between the communication processing unit 55 of the printer 20 and the memory control circuit 136 of the storage device 130 in the writing process to the storage device 130 according to the second embodiment. In FIG. 21, as in the first embodiment (see FIG. 11), the frequency of the clock signal CSCK is set to the low frequency (2 MHz) during the transmission period of the SOF data and the identification data and is set to the high frequency (12 MHz) during the transmission period of the command data CM and the read data. As a consequence, the consumption of current by the data signal line LD1 during the transmission period of the identification data can be reduced and a high data transmission speed can be ensured. Moreover, since the clock frequency is set to the value (6 MHz) lower than the clock frequency (12 MHz) during the transmission period of the response signal FL, the possibility of bus collisions is reduced, thereby correctly transmitting the data.

When receiving the writing command from the main control unit 40, the sub-control unit 50 first supplies the supply voltage CVDD to each ink cartridge 100 and sets the storage device 130 of each ink cartridge 100 to an operable state. After the supply voltage CVDD is supplied from the sub-control unit 50, the low-level reset signal CRST is supplied from the sub-control unit 50 and thus the storage device 130 is initialized. Since the reset signal is at the low level upon terminating the previous access, the low-level reset signal is maintained before the supply voltage CVDD is supplied to the storage device 130. Thereafter, the communication processing unit 55 of the sub-control unit 50 starts the following writing process.

When starting the writing process, the communication processing unit 55 first transfers the reset signal CRST from the low level to the high level and simultaneously transmits the clock signal CSCK with a predetermined frequency. When the reset signal CRST is transferred from the low level to the high level, the memory control circuit 136 of the storage device 130 is set to a standby state to receive the data signal CSDA from the communication processing unit 55.

Figure 22:
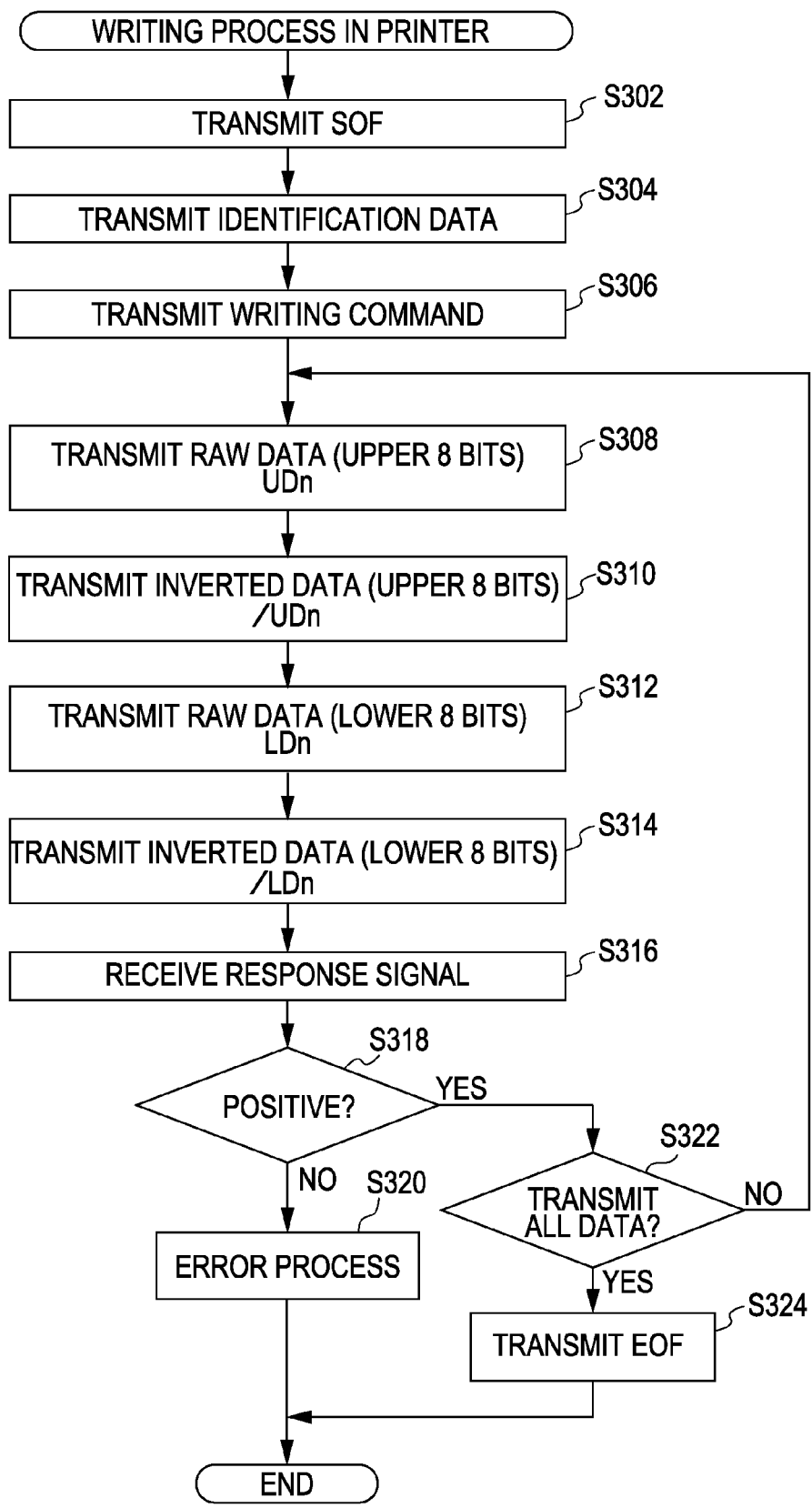
FIG. 22 is a flowchart illustrating a processing routine of a writing process to the storage device in the printer.

FIG. 22 is a flowchart illustrating a processing routine of the writing process of writing data in the storage device 130 by the sub-control unit 50 of the printer 20. The communication processing unit 55 first transmits the SOF data as the data signal CSDA after the SOF data, like the above-described reading process (step S302). The communication processing unit 55 transmits the identification data as the data signal CSDA, like the above-described reading process (step S304). The communication processing unit 55 transmits the command data as the data signal CSDA after the identification data (step S306). The command data transmitted in the writing process is the write command.

The communication processing unit 55 transmits the writing data to the storage device 130 from the subsequent clock signal CSCK after the transmission of the command data ends. At this time, the data are transmitted in synchronization with the descending edge of the clock signal CSCK and the data are received in the storage device 130 in synchronization with the ascending edge of the clock signal CSCK. The writing data are transmitted in the line order from the data written in line A1 among the data corresponding to the raw data. Specifically, the communication processing unit 55 transmits the unit writing data corresponding to 8 bits×4=32 bits sequentially bit by bit (see FIG. 21). The 32-bit unit writing data includes, the raw data upper 8 bit UDn, the inverted raw data upper 8 bits /UDn, the raw data lower 8 bits LDn, and the inverted raw data lower 8 bits /LDn. The communication processing unit 55 sequentially transmits a total of 32 bits of the data UDn, /UDn, LDn, and /LDn (steps S308 to S314).

The communication processing unit 55 receives a 1-bit response signal from the memory control circuit 136 in synchronization with the ascending of the subsequent clock signal CSCK after the transmission of the unit writing data ends (step S316). A high-level response signal (hereinafter, also referred to as an "OK response signal" or an "OK flag") is a signal indicating that the storage device 130 correctly receives the unit writing data. A low-level response signal (hereinafter, also referred to as a "failure response signal" or a "failure flag") is a signal indicating that the storage device 130 may not correctly receive the unit writing data. As for the response signal, the reason for setting the OK response signal to a high level is that the data signal line LD1 is connected to a low level potential via the pull-down resistor R1, as shown in FIG. 6. With such a configuration, for example, when a contact failure occurs in the data terminal 260, it is possible to reduce the possibility that the OK response signal is erroneously input to the communication processing unit 55.

When the received response signal is the failure response signal, the communication processing unit 55 performs a predetermined error process (step S320), and then the writing process ends. In the error process, for example, when only the failure response signal is obtained as the result obtained by retrying the transmission of the same unit writing data a predetermined number of times, the main control unit 40 is notified of this result. In this case, the main control unit 40 may perform a communication error solving process such as a process of displaying a message prompting a user to view the mounting of the ink cartridge 100 on the display panel of the operation unit 70.

On the other hand, when the received response signal is the OK response signal, the communication processing unit 55 determines whether all of the data to be written are transmitted (step S322). When all of the data to be written are transmitted, the communication processing unit 55 transmits an EOF (End Of Frame) data to the storage device 130 (step S324), and then the writing process ends. When the writing process ends, as shown in FIG. 21, the communication processing unit 55 transfers the reset signal CRST from the high level to the low level and simultaneously stops supplying the clock signal CSCK. For example, the EOF data may be 8-bit data, meaningful data, or simple dummy data. When all of the data to be written are not transmitted, the communication processing unit 55 returns the process from step S322 to step S308 and repeatedly performs the above-described process on the subsequent unit writing data. For example, the communication processing unit 55 performs the above-described process on the unit writing data UD1, /UD1, LD1, and /LD1 of line A1, and then performs the above-described process on the unit writing data UD2, /UD2, LD2, and /LD2 of line A2.

Figure 23:
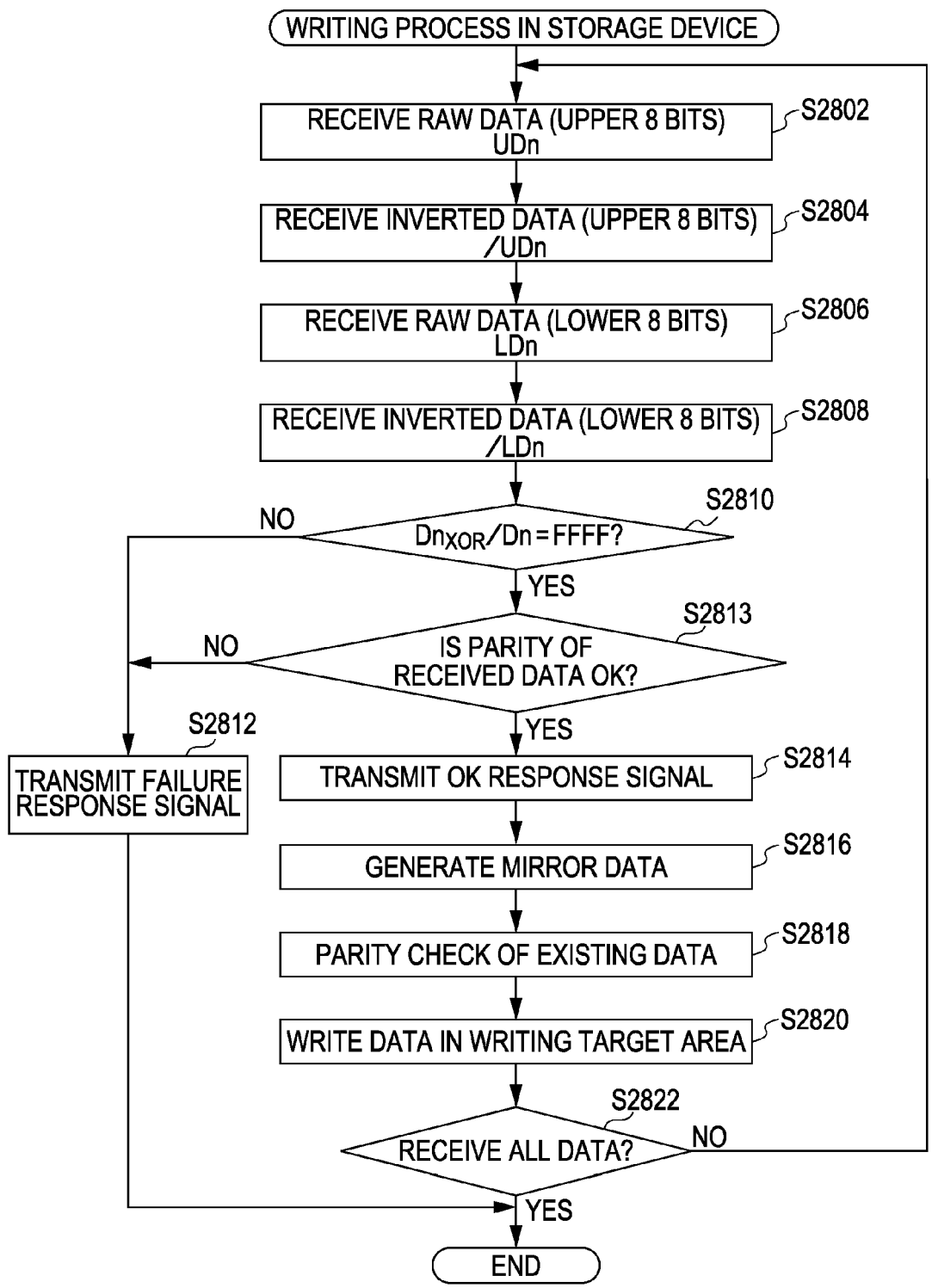
FIG. 23 is a flowchart illustrating a processing routine of a writing process in the storage device.

FIG. 23 is a flowchart illustrating processing steps of the writing process in the storage device. The writing process is performed in the same way as that of the above-described processes of steps S210 to S250 of FIG. 17. In the writing process, a command received in step S240 by the memory control circuit 136 of the storage device 130 is the write command. The memory control circuit 136 receiving the write command performs the writing process in the storage device in step S280. In FIG. 23, the detailed order of step S280 of FIG. 17 is shown.

In the writing process, like the reading process, the counter control unit M16 initializes the count value of the address counter M13 so that line A1 is designated as a writing target initial line. Thereafter, the data transceiver unit M15 of the memory control circuit 136 receives the signal shown on the data signal line LD1 after the command data bit by bit in synchronization with the ascending of the clock signal CSCK and sequentially stores the signal in the input register 152 (see FIG. 13). As a consequence, the data transceiver unit M15 sequentially receives the 32-bit unit writing data UDn, /UDn, LDn, and /LDn (steps S2802 to S2808 of FIG. 23). After step S2808 ends, the data transceiver unit M15 sets the data transmission and reception directions to the transmission direction in order to transmit the response signal (the failure response signal or the OK response signal) from the storage device 130 to the sub-control unit 50.

When the unit writing data are received, the data determination unit M19 determines whether the result of the exclusive OR of the raw data Dn and the inverted data /Dn are all true for 16 bits, that is, FFFFh (step S2810). Here, the raw data Dn is 16-bit data including the raw data upper 8 bits UDn received in step S2802 and the raw data lower 8 bits LDn received in step S2806. The inverted data /Dn is 16-bit data including the inverted raw data upper 8 bits /UDn received in step S2804 and the inverted raw data lower 8 bits /LDn received in step S2808.

When the result of the exclusive OR (the result determined by the data determination unit M19) is not FFFFh, the data transceiver unit M15 transmits the failure response signal to the communication processing unit 55 of the sub-control unit 50 (step S2812). When the failure response signal is transmitted, the writing process in the storage device ends (abnormally ends).

On the other hand, when the result of the exclusive OR (the result determined by the data determination unit M19) is FFFFh, the data determination unit M19 determines the consistency between the data by performing parity check of the received 16-bit raw data Dn (step S2813). When it is determined there is no consistency between the data as the result of the parity check, the data transceiver unit M15 transmits the failure response signal to the communication processing unit 55 of the sub-control unit 50 (step S2812). When the failure response signal is transmitted, the writing process in the storage device ends (abnormally ends). On the other hand, when there is consistency between the data as the result of the parity check, the data transceiver unit M15 transmits the OK response signal to the communication processing unit 55 of the sub-control unit 50 via the data terminals (step S2814).

The response signal (the failure response signal or the OK response signal) is transmitted in synchronization with the subsequent descending of the clock signal CSCK after the unit writing data is received (see FIG. 21). That is, the storage device 130 transmits the response signal to the sub-control unit 50 in synchronization with the clock signal CSCK transmitted from the sub-control unit 50 after the storage device 130 receives the unit writing data in synchronization with the clock signal CSCK transmitted from the sub-control unit 50.

When the OK response signal is transmitted, the copy data generation unit M17 of the memory control circuit 136 generates the mirror data dn which is a copy data of the received 16-bit raw data Dn (step S2816). Specifically, the input register 152 receiving the raw data Dn and a 16-bit register storing the mirror data dn are prepared in the memory control circuit 136, and the mirror data dn is stored in the latter register.

Next, the read/write control unit M14 reads the existing data from the storage area (the writing target area RWA) in which the raw data Dn and the mirror data dn are written and the data determination unit M19 executes the parity check on the read exiting data (step S2818). The writing target area which becomes a writing target once is one line on the memory map in FIG. 14. As shown in FIG. 14, upper 16 bits of the writing target area (an area corresponding to one line) are the raw data area in which the raw data Dn is written and the parity bit P is stored in the final bit of the raw data area. Lower 16 bits of the writing target area (an area corresponding to one line) are the mirror data area in which the mirror data dn is written, and the parity bit P is stored in the final bit of the mirror data area, like the raw data area. In step S2818, the parity check is performed on the existing data stored in the raw data area of the writing target area and the existing data stored in the mirror data area of the writing target area.

When the parity check ends, the read/write control unit M14 writes the data in the writing target area (step S2820). When there is no parity error in both the existing data of the raw data area of the writing target area and the existing data of the mirror data area of the writing target area as the result of the parity check of the existing data, the read/write control unit M14 writes the raw data Dn received in steps S2802 and S2806 in the raw data area and writes the mirror data dn generated in step S2816 in the mirror data area. On the other hand, when there is a parity error in the existing data of the raw data area of the writing target area and there is no parity error in the existing data of the mirror data area of the writing target area as the result of the parity check, the read/write control unit M14 does not write the received raw data Dn but writes the existing data in which the parity error occurs in the raw data area, and writes the mirror data dn generated in step S2816 in the mirror data area. When there is no parity error in the existing data of the raw data area of the writing target area and there is a parity error in the existing data of the mirror data area of the writing target area as the result of the parity check, the read/write control unit M14 writes the received raw data Dn in the raw data area and writes the existing data in the mirror data area. When there is a parity error in both the existing data of the raw data area of the writing target area and the existing data of the mirror data area of the writing target area as the result of the parity check, the read/write control unit M14 rewrites the existing data in the raw data area and the mirror data area, respectively. That is, the read/write control unit M14 rewrites the existing data in the storage area in which there is a parity error and updates the data in the storage area in which there is no parity error. The reason for updating the data is that the parity error state may continue since there is a high possibility that either one of the cells included in the storage area in which there is a parity error is an unreliable cell (defective cell). In this state, a parity error occurs when the main control unit 40 of the printer reads the data of this storage area and performs the parity check (step S126 of FIG. 19). Therefore, the main control unit 40 may not use the data. Data may not be written in the area in which a parity error is detected, instead of rewriting the existing data in the area in which the parity error is detected.

When the data are written in the writing target area, the command analysis unit M12 of the memory control circuit 136 determines whether all of the data to be written are received (step S2822). When the EOF data is received, the command analysis unit M12 determines that all of the data to be written are received. Alternatively, when it is detected that the reset signal CRST is transferred from the high level to the low level, the command analysis unit M12 may determine that all of the data to be written are received. When all of the data to be written are received, the memory control circuit 136 terminates the writing process. When all of the data to be written are not received, the process returns to step S2802 and the memory control circuit 136 repeats the above-described processes on the subsequent unit writing data. For example, after the unit writing data D1 and /D1 of a first line are received and the above-described processes are performed, the unit writing data D2 and /D2 of a second line are received and the above-described processes are performed. Here, the "first line" corresponds to line A1 and the "second line" corresponds to line A2 in FIG. 14. In this embodiment, since the address counter M13 sequentially designates the word addresses, the writing process is performed sequentially for line A2, line A3, and so on after line A1. After transmitting the OK response signal (step S2814), the data transceiver unit M15 sets the data transmission and reception directions to a direction in which the storage device 130 receives the data from the sub-control unit 50 in order to receive the subsequent unit writing data.

The order of steps of the flowchart shown in FIG. 23 may be arbitrarily within the range in which there is no contradiction in the processing details, or may be performed in parallel. For example, the memory control circuit 136 may generate the mirror data before transmitting the OK response signal or may perform the parity check on the existing data while generating the mirror data.

In the above-described writing process to the storage device 130, the storage device 130 confirms the consistency between the raw data Dn and the inverted data /Dn and transmits a response signal indicating whether there is a consistency in every 16 bits of the raw data Dn. As a consequence, it is possible to improve the communication reliability between the sub-control unit 50 and the storage device 130. When there is no consistency between the raw data Dn and the inverted data /Dn, the storage device 130 can reduce the possibility that the ferroelectric memory cell array 132 is erroneously updated since the raw data Dn is not written in the ferroelectric memory cell array 132. Moreover, in the writing process to the storage device 130, the respective bits of the raw data Dn and the inverted data /Dn have the inverted relationship to one another. Therefore, it is possible to detect a communication error reliably, for example, when there is a communication error in which only either one of the low level and the high level is shown on the data signal line LD1 due to a contact failure between the data terminal 260 of the ink cartridge 100 and the corresponding terminal of the printer 20. Moreover, it is possible to perform the easy and reliable communication error detection since the consistency (whether there is a communication error) between the raw data Dn and the inverted data /Dn is determined by calculating exclusive OR of the respective bits of the raw data Dn and the inverted data /Dn.

In the writing process according to this embodiment, the storage device 130 performs the parity check on 16 bits of the existing data stored in the raw data area of the writing target area and on 16 bits of the existing data stored in the mirror data area of the writing target area. As a consequence, the existing data is rewritten in the area in which a parity error is detected and new data is written in the area in which no parity error is detected. Since it is considered that a defect of the memory cell exists in the area in which a parity error is detected, the parity check may be said to be a method of detecting a defect of the storage area. As a consequence, since the data is updated in the area in which a defect occurs, it is possible to reduce the possibility that an unexpected defect occurs when the data is updated in the area in which the defect occurs. Moreover, by rewriting the existing data in the area in which a parity error is detected, it is possible to reduce a possibility that the data of the area in which a memory cell error occurs is changed due to a data retention problem. Here, the "data retention problem" refers to a problem in which the value of the stored data is changed as the charge of the cell of the memory gradually disappears. When the data is changed due to the data retention problem in the area in which a memory cell error occurs, the consistency of the parity may be correct by accident and thus the memory cell error may not be correctly detected.

Figure 24:
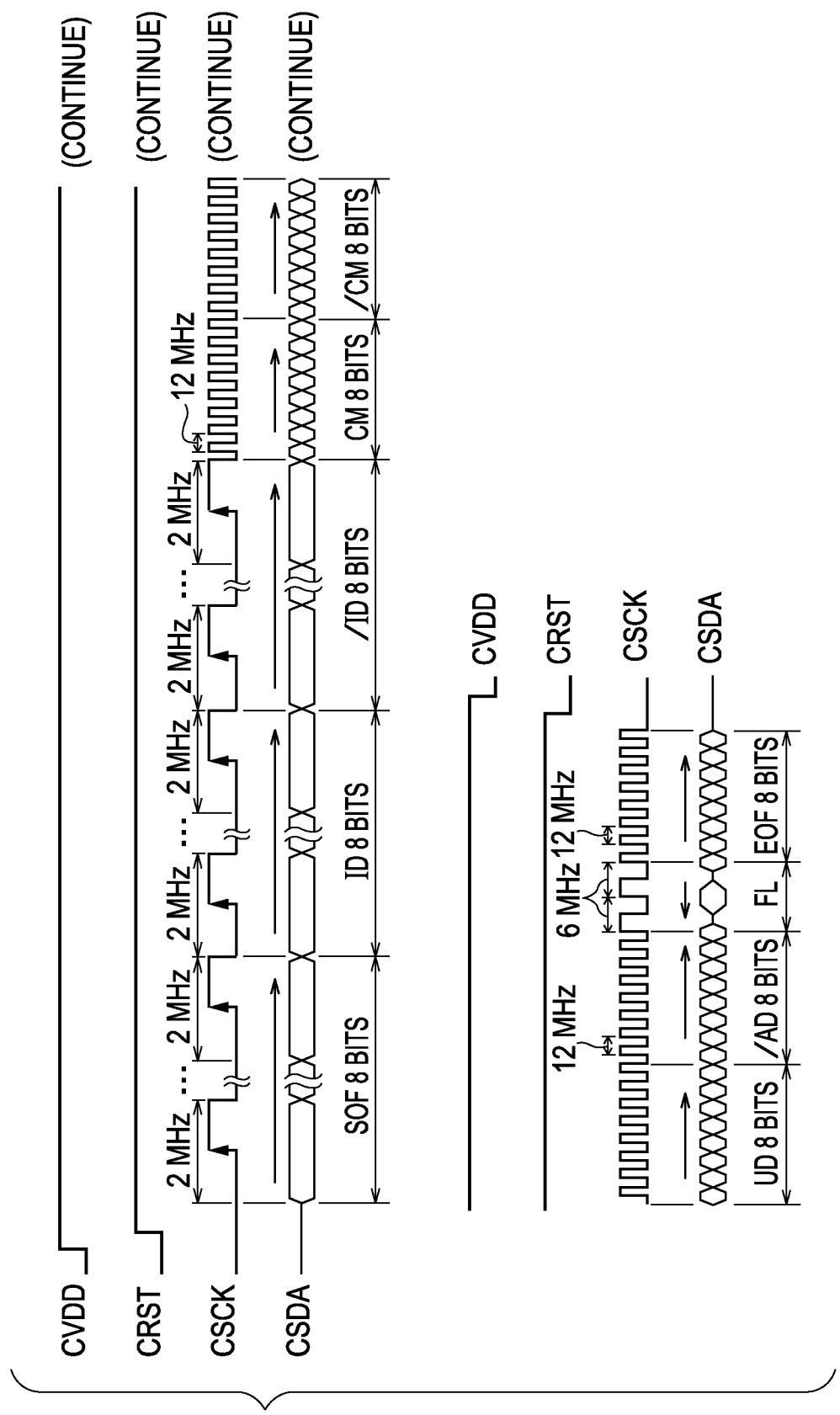
FIG. 24 is a timing chart schematically illustrating signals transmitted and received in a write lock process for the storage device.

FIG. 24 is a timing chart schematically illustrating signals transmitted and received between the communication processing unit 55 of the printer 20 and the memory control circuit 136 of the storage device 130 in the write lock process for the storage device. The write lock process is a process of changing the storage area of the rewritable area RWA of the memory map (see FIG. 14) of the ferroelectric memory cell array 132 into a write lock area line by line. The line changed into the write lock area is not rewritable by access from an external unit (for example, the communication processing unit 55 of the sub-control unit 50).

First, the communication processing unit 55 sequentially transmits the SOF data, the identification data, and the command data as the data signal CSDA, like the reading process and the writing process described above. The command data transmitted in the write lock process is a command (write lock command) indicating the write lock process. After transmitting the command data, the communication processing unit 55 transmits write lock target address data AD and inverted write lock target address data /AD. The write lock target address data AD is, for example, 8-bit data and is data specifying the line changed into the write lock area among the lines of the rewritable area RWA. The inverted write lock address data /AD is 8-bit data formed by inverting the values of bits of the write lock target address data AD.

After transmitting the write lock target address data AD and the inverted write lock target address data /AD, the communication processing unit 55 receives a 1-bit response signal from the memory control circuit 136. The high-level response signal (the OK response signal) indicates that the storage device 130 correctly receives the write lock target address data AD and the inverted write lock target address data /AD. The low-level response signal (the failure response signal) indicates that the storage device 130 may not correctly receive the write lock target address data AD and the inverted write lock target address data /AD.

When receiving the failure response signal, the communication processing unit 55 terminates the write lock process by performing a predetermined error process. The error process may be the same process as the error process performed when the failure response signal is received in the above-described writing process. On the other hand, when receiving the OK response signal, the communication processing unit 55 transmits the EOF (End Of Frame) data to the storage device 130 and terminates the write lock process (see FIG. 22). The clock frequency in the write lock process shown in FIG. 24 may be varied in the same way as the clock frequency in the writing process shown in FIG. 21.

The steps of the write lock process in the storage device are executed in the above-described order of FIG. 17. In the write lock process, a command received by the memory control circuit 136 of the storage device 130 in step S240 of FIG. 17 is the write lock command. Accordingly, in step S270, the memory control circuit 136 receiving the write lock command performs the write lock process described below.

When the write lock process starts, the data transceiver unit M15 of the memory control circuit 136 sequentially reads a signal shown on the data signal line LD1 bit by bit in synchronization with the ascending of the clock signal CSCK after the command data, and sequentially stores the signal in the input register 152. As a consequence, the memory control circuit 136 sequentially receives the write lock target address data AD and the inverted write lock target address data /AD.

The data determination unit M19 determines whether the result obtained through exclusive OR of the received write lock target address data AD and the inverted write lock target address data /AD is true for all 8 bits, that is, FFh. When it is determined that the result obtained through the exclusive OR is not FFh, the data transceiver unit M15 transmits the failure response signal (low-level response signal) to the communication processing unit 55 of the sub-control unit 50. When the failure response signal is transmitted, the write lock process in the storage device ends (abnormally ends).

On the other hand, when it is determined that the result of the exclusive OR is FFh, the read/write control unit M14 changes one line (hereinafter, referred to as a "write lock target line") of the rewritable area RWA specified by the write lock target address data AD into the write lock area. Specifically, the counter control unit M16 sets a counter value of the address counter M13 so that the head line An (see FIG. 14) of the control area CTA is selected. The counter control unit M16 counts up so that the line including the cell storing a flag of the write lock target line in the control area CTA is selected. After the address counter M13 selects the line including the cell storing the flag of the write lock target line as the writing target line, the read/write control unit M14 updates the entire one line of the control area CTA so that flag information of the write lock target cell is set from "0" to "1".

According to the above-described write lock process, the main control unit 40 changes an arbitrary line of the rewritable area RWA into the write lock area so that data is not rewritable from the outside after the change into the write lock area. As a consequence, since the data value of the line can be maintained a desired timing, it is possible to prevent the data value from being incorrectly rewritten.

Figure 25:
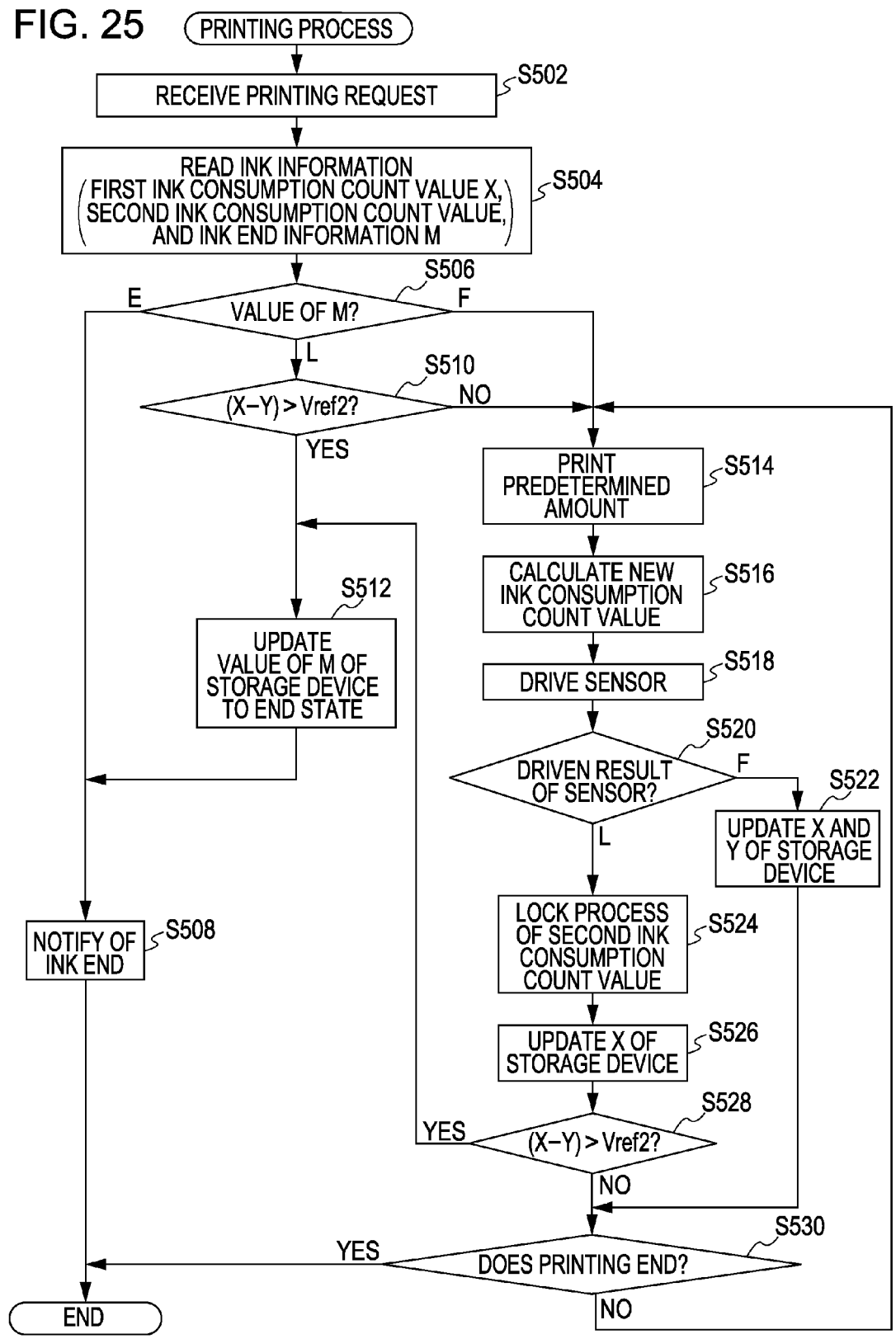
FIG. 25 is a flowchart illustrating processing steps of a printing process.

FIG. 25 is a flowchart illustrating steps of the printing process performed mainly by the main control unit 40. In the printing process described below, one ink cartridge 100 will mainly be described for facilitating description, but the same process is performed in each ink cartridge 100 mounted on the printer 20 in effect.

The printing process starts when the main control unit 40 receives a printing request from a user through the computer 90 or the operation unit 70 (step S502). When the printing request is received, the main control unit 40 performs the reading process from the above-described storage device 130 to read ink information from the storage device 130 of the ink cartridge 100 (step S504). The data stored in the memory of the main control unit 40 in step T110 of FIG. 15 may be read instead of performing the reading process from the storage device 130.

The ink information read in step S504 preferably includes the first ink consumption count value X, the second ink consumption count value Y, and the ink end information M in the rewritable area RWA. The first ink consumption count value X and the second ink consumption count value Y refer to values indicating the cumulative amount of consumed ink of each ink cartridge 100 calculated based on the ink consumption amount estimated by the ink consumption amount estimation unit M3 in the printer 20. For example, the ink end information M is 2-bit data. M="01" indicates a state (full state) where the level of remaining ink detected by the sensor 110 is larger than the first threshold value Vref1. M="10" indicates a state (low state) where the level of remaining ink is equal to or lower than the first threshold value Vref1 and is larger than the ink end level. M="11" indicates a state (end state) where the level of remaining ink is equal to or lower than the ink end level.

The main control unit 40 determines whether the value of the ink end information M is the full state, the low state, or the end state (step S506). The main control unit 40 notifies a user of the ink end when determining that the ink end information M indicates the end state (step S508). The user is notified of the ink end, for example, by displaying a message prompting the user to exchange the ink cartridge 100 on the display panel of the operation unit 70.

When determining that the ink end information M is the low state, the main control unit 40 determines whether a difference value (X−Y) between the first ink consumption count value X and the second ink consumption count value Y is equal to or larger than the second threshold value Vref2 (step S510). Since the line of the storage device 130 storing the second ink consumption count value Y is subjected to the write lock process when the ink end is detected, as described below, the second ink consumption count value Y is not updated. When the difference value (X−Y) is equal to or larger than the second threshold value Vref2, the main control unit 40 updates the value of the ink end information M of the storage device 130 to the end state (step S512). Specifically, the main control unit 40 performs the writing process to the above-described storage device 130 to update the value of the ink end information M to "11". When the value of the ink end information M is updated, the main control unit 40 performs the above-described notification of the ink end (step S508).

On the other hand, when determining that the ink end information M is the full state or when the difference value (X−Y) is smaller than the second threshold value Vref2, the main control unit 40 performs the predetermined amount printing in the printing process in response to the printing request (step S514). Here, the "predetermined amount printing" refers to the printing process in which a predetermined length (for example, 2 cm) is printed on a print sheet in the sub-scanning direction.

When the predetermined amount printing is performed, the main control unit 40 calculates a new ink consumption amount count value (step S516). Specifically, the main control unit 40 estimates the ink consumption amount of the printing process based on the execution details in the predetermined amount printing. The main control unit 40 sets a value obtained by adding a count value corresponding to the estimated ink consumption amount to the first ink consumption count value X read from the storage device 130 in step S504 to the new ink consumption amount count value.

When the new ink consumption amount count value is calculated, the main control unit 40 drives the sensor 110 (step S518). Based on the drive result of the sensor 110, the main control unit 40 determines whether the level of remaining ink of the ink cartridge 100 is equal to or larger than the first threshold value Vref1 (the full state) or is lower than the first threshold value Vref1 (the low state) (step S520).

When determining that the level of remaining ink of the ink cartridge 100 is equal to or larger than the first threshold value Vref1, the main control unit 40 updates the first ink consumption count value X and the second ink consumption count value Y stored in the storage device 130 to the new ink consumption amount count value calculated in step S516 (step S522). As a consequence, the first ink consumption count value X and the second ink consumption count value Y become equal to each other.

On the other hand, when the level of remaining ink of the ink cartridge 100 is lower than the first threshold value Vref1, the main control unit 40 confirms whether the storage area (line A2 in FIG. 14) storing the second ink consumption count value Y is the write lock area. The storage area can be confirmed with reference to the flag in the control area CTA of the storage device 130 among the data stored in the memory of the main control unit 40. When the storage area does not become the write lock area, line A2 storing the second ink consumption count value Y is subjected to the write lock process (step S524). When the write lock process is performed, the value of the second ink consumption count value Y in the storage device 130 becomes a value of an unchangeable state. Accordingly, the value of the second ink consumption count value Y in the storage device 130 is maintained at the ink consumption amount count value immediately before it is detected that the level of remaining ink is first lower than the first threshold value Vref1 by the driving of the sensor 110.

When the write lock process of the second ink consumption count value ends, the main control unit 40 updates the first ink consumption count value X stored in the storage device 130 to the new ink consumption amount count value calculated in step S516 (step S526). At this time, the value of the second ink consumption count value Y in the write lock state is not updated.

When the value of the first ink consumption count value X is updated, the main control unit 40 determines whether the difference value (X−Y) between the first ink consumption count value X and the second ink consumption count value Y is equal to or larger than the second threshold value Vref2 (step S528). The used first ink consumption count value X is the value updated in step S526. On the other hand, the used second ink consumption count value Y is a new value between the value read in step S504 and the value updated in step S522. When the difference value (X−Y) is equal to or larger than the second threshold value Vref2, the main control unit 40 updates the value of the ink end information M of the storage device 130 to the end state (step S512) and performs the above-described ink end notification (step S508).

After the first ink consumption count value X and the second ink consumption count value Y are updated in step S522 or when the difference value (X−Y) is smaller than the second threshold value Vref2 in step S528, the main control unit 40 determines whether all of the printing in response to the printing request ends (step S530). When all of the printing ends, the printing process ends. When all of the printing does not end, the process returns to step S514 and the predetermined amount printing is performed again.

When the sensor 110 is driven and it is determined that the level of remaining ink of the ink cartridge 100 is lower than the first threshold value Vref1, as described above, the printer 20 according to this embodiment performs a prohibition request (write lock process) on the storage area of the storage device 130 storing the second ink consumption count value Y so that the second ink consumption count value Y is not updated. As a consequence, after the prohibition request, the storage device 130 does not receive any update request for the second ink consumption count value Y. As a consequence, the second ink consumption count value Y is maintained at the ink consumption count value immediately before the sensor detects that the level of remaining ink is lower than the first threshold value Vref1, thereby preventing the second ink consumption count value Y from being erroneously updated. The first ink consumption count value X is updated even when the updating of the second ink consumption count value Y is stopped. Therefore, it is possible to accurately recognize the amount of ink consumed after the sensor detects that the level of remaining ink is lower than the first threshold value Vref1 based on the difference value (X−Y). As a consequence, since the ink end can be determined accurately, it is possible to use the ink stored in the ink cartridge 100 without waste.

D. MODIFIED EXAMPLES

Although the embodiments of the invention have hitherto been described, the invention is not limited to the embodiments, but may be modified in various forms within the scope of the invention without departing from the gist of the invention.

First Modified Example

In the second embodiment, the raw data Dn and the inverted data /Dn are used as the data to confirm the consistency with the raw data Dn. However, other data having a predetermined logical relationship with the raw data Dn may be used instead. Specifically, the following related data may be used:

(1) a copy of the raw data Dn,
(2) data obtained by adding a predetermined value to the raw data Dn,
(3) data obtained by subtracting a predetermined value from the raw data Dn,
(4) data obtained by multiplying the raw data Dn by a predetermined value,
(5) data obtained by shifting the raw data Dn by predetermined bits, and
(6) data obtained through predetermined bit rotation of the raw data Dn.

In general, the raw data Dn and the data related to the raw data Dn may be used as long as the raw data Dn and the related data have a predetermined logical relationship to one another and whether there is the predetermined logical relationship between the raw data Dn and the related data can be determined. However, the raw data Dn and the related data preferably have the same data amount in terms of reliability.

The predetermined logical relationship includes a bi-directional logical relationship, such as "inversion", "copy (mirror)", and "bit rotation", in which one of the raw data and the related data (first data and second data) can be generated from the other thereof by logical calculation. There is a one-directional logical relationship, such as "bit shift", in which specific one of the raw data and the related data can be generated from the other thereof by the logical calculation, but the other thereof may not be generated from the one thereof. The raw data and the related data having the bi-directional logical relationship are preferably used.

Second Modified Example

In the above-described second embodiment, the raw data area and the mirror data area are provided in the memory cell array 132, but the configuration of the data areas in the memory cell array 132 may be modified in various forms. For example, only the raw data area may exist in the memory cell array 132. In this case, the memory control circuit 136 preferably includes a reading copy data generation unit copying the data stored in the raw data area and generating the mirror data do (copied data) and an inverted data generation unit inverting the respective bits of the data stored in the raw data area and generating the inverted data /Dn and the inverted mirror data /dn. In the reading process of the storage device 130, the data transceiver unit M15 of the memory control circuit 136 can transmit the data stored as the raw data Dn in the raw data area to the sub-control unit 50, and can also transmit the mirror data dn, the inverted data /Dn, and the inverted mirror data /dn generated using the raw data Dn to the sub-control unit 50. The data transceiver unit M15 may retain the data read from the raw data area in the output register and then transmit the data as the raw data, and may transmit the data stored as the mirror data in the output register.

Alternatively, the raw data area and the inverted data area may be provided in the memory cell array 132. In this case, the read/write control unit M14 may store the raw data Dn in the raw data area and may also store the inverted data /Dn in the inverted data area. In the reading process, the data transceiver unit M15 of the memory control circuit 136 may transmit the data read from the raw data area as the raw data Dn and the data read from the inverted data area as the inverted data /Dn to the sub-control unit 50, and may also transmit the data read from the same raw data area as the mirror data dn and the data read from the same inverted data area as the inverted mirror data /dn to the sub-control unit 50. Even in this case, the host circuit can detect a communication error or a memory cell error in steps S110 to S114 of FIG. 19. The raw data and the inverted data determined that there is a memory cell error may each be subjected to the parity check (step S126), thereby using the data having the consistency of the parity.

The memory cell array 132 may be provided with the raw data area storing the raw data Dn, the inverted data area storing the inverted data /Dn of the raw data Dn, the mirror data area storing the mirror data dn of the raw data Dn, and the inverted mirror data area storing the inverted mirror data /dn which is an inverted data of the mirror data dn. In this case, the read/write control unit M14 and the data transceiver unit M15 of the memory control circuit 136 may read and transmit the stored data without change.

As understood from the above description, one-line data (an access unit by the memory control circuit 136) of the memory cell array 132 preferably includes the raw data (first data) and another data (second data) having a predetermined logical relationship with and raw data Dn.

Third Modified Example

In the reading process according to the above-described second embodiment, the raw data Dn, the inverted data /Dn, the mirror data dn, and the inverted mirror data /dn are transmitted from the storage device 130 to the sub-control unit 50, but the data transmitted in the reading process may also be modified in various forms. For example, only the raw data Dn and the inverted data /Dn may be transmitted, and the mirror data dn and the inverted mirror data /dn may not be transmitted. Alternatively, only the raw data Dn and the mirror data dn may be transmitted, and the inverted data /Dn and the inverted mirror data /dn may not be transmitted.

Fourth Modified Example

In the writing process according to the above-described second embodiment, the 32-bit data is transmitted from the sub-control unit 50 to the storage device 130 in the order of the raw data upper 8 bits UDn, the inverted mirror data upper 8 bits /Udn, the raw data lower 8 bits LDn, and the inverted raw data lower 8 bits /LDn. However, the transmission order may be modified arbitrarily. The 16-bit raw data Dn may be first transmitted, and then the 16-bit inverted data /Dn may be transmitted. Alternatively, the inverted data /Dn may be first transmitted, and then the raw data Dn may be transmitted.

In the writing process according to the above-described second embodiment, the 32-bit data is transmitted as one pair of unit data from the sub-control unit 50 to the storage device 130, and the response signals are replied from the storage device 130 to the sub-control unit 50 when the transmission of the unit data ends. However, the length of the unit data may be modified arbitrarily. For example, a total of 128 bits of 64-bit raw data and inverted data thereof may be one pair of unit data.

In the writing process according to the above-described second embodiment, both the actual data and the parity bit to be stored in the memory cell array 132 are generated in the printer 20 and are transmitted to the storage device 130. Instead, the printer 20 may transmit only the actual data to the storage device 130 and the storage device 130 may generate the parity bit. In this case, the memory control circuit 136 may be provided with a parity acquisition unit generating the 1-bit parity bit which is consistent with the 15-bit actual data transmitted from the printer 20.

Fifth Modified Example

In the above-described second embodiment, the memory cell array 132 records the first ink consumption count value X and the second ink consumption count value Y indicating the amount of consumed ink, but may record remaining amount information indicating the level of remaining ink. In this case, an initial value of the remaining amount information is a value indicating the amount of ink filled in the ink cartridge 100. In the printing process, the printer 20 rewrites the remaining information in a direction of decreasing the remaining amount information stored in the memory cell array 132 in response to the amount of ink consumed in the printing. In this case, the storage area storing the remaining amount information is preferably set as a decrement area. The decrement area is an area where only the rewriting process in the direction of decreasing the numeral value is allowable but the rewriting process in a direction of increasing the numeral value is not allowable. This decrement area is preferably set by writing decrement flag information in the read-only area, like the increment area of the second embodiment.

Sixth Modified Example

In the above-described second embodiment, the first ink consumption count value X and the second ink consumption count value Y are stored in the memory cell array 132, and the ink end is determined based on the difference value (X−Y) (step S510 in FIG. 25). Instead, only the second ink consumption count value Y may be stored in the memory cell array 132. In this case, the first ink consumption count value X may be stored in the non-volatile memory installed in the printer 20 and the same process as that of the second embodiment may be performed.

Seventh Modified Example

The various signals exchanged between the storage device 130 and the sub-control unit 50 in the above-described embodiments may be also modified in various forms. For example, in the examples of FIGS. 9 to 11, 16, and 21, the reset signal CRST is supplied form the sub-control unit 50 to the storage device 130, but the reset signal CRST may not be supplied. In this case, the reset terminal 240 of the storage device 130, the terminal 440 of the printer 20 corresponding to the reset terminal 240, and the reset signal line LR1 are omitted. As for the initialization of the storage device 130, for example, the storage device 130 is spontaneously initialized when the storage device 130 receives the supply voltage CVDD and is activated. After the storage device 130 is activated, the clock signal CSCK and the data signal CSDA can be supplied from the sub-control unit 50 and the storage device can operate, as in the first and second embodiments.

Eighth Modified Example

In the above-described second embodiment, the storage device 130 has been described as a semiconductor storage device including the ferroelectric memory cell array 132, but the invention is not limited thereto. A semiconductor storage device (EEPROM or flash memory) using no ferroelectric memory cell may be used. Alternatively, a storage device other than a semiconductor storage device may be used.

Ninth Modified Example

In the above-described embodiments, the sub-control unit 50 of the printer 20 is used as the host circuit, but a circuit such as any calculator may be used in the host circuit. In the above-described embodiments, the storage device 130 of the ink cartridge 100 is used as a storage device, but any non-volatile storage device may be used. In this case, the invention is effective when the host circuit and the storage device are electrically connected to each other via circuit terminals electrically connected to the host circuit and storage device terminals electrically connected to and detachably mounted on the storage device. Then, since it can be detected that a communication error occurs due to a contact failure between the storage device terminals and the circuit terminals, it is possible to improve communication reliability between the host circuit and the storage device.

Tenth Modified Example

In the above-described embodiments, the sensor 110 using the piezoelectric element is used, but an oscillation device, such as an oscillation circuit, returning a response signal with a frequency typically indicating that ink is present may be used instead. A processor, such as a CPU or an ASIC, communicating with the sub-control unit 50 or a simpler IC may be used instead of the sensor 110. The invention is applicable to the ink cartridge 100 mounted with only a storage device without a sensor being mounted.

Eleventh Modified Example

In the above-described embodiments, the ink jet printing apparatus and the ink cartridge are used, but a liquid ejecting apparatus discharging or ejecting other liquids other than ink and a liquid container supplying a liquid to the liquid ejecting apparatus may be used. Here, examples of the liquid include a liquid-like material in which particles of a function material are dispersed in a solvent and a fluid-formed substance such as a gel-formed substance. Examples of the liquid ejecting apparatus include a liquid ejecting apparatus that ejects a liquid including an electrode material or a color material used for manufacturing a liquid crystal display, an EL (electroluminescence) display, a field emission display, or a color filter in a dispersed or dissolved form; a liquid ejecting apparatus that ejects a bio-organism used for manufacturing a bio-chip, and a liquid ejecting apparatus that ejects a liquid as a sample used with a precise pipette. Moreover, a liquid ejecting apparatus that ejects a lubricant by a pin point toward a precise apparatus such as a clock or a camera; a liquid ejecting apparatus that ejects a transparent resin liquid, such as ultraviolet curing resin, on a substrate to form a minute hemispherical lens (optical lens) used in an optical communication device or the like; a liquid ejecting apparatus that ejects an acid or alkali etchant to etch a substrate or the like; and a liquid container that supplies a liquid to the liquid ejecting apparatuses may be used. The invention is applicable to any one of these ejecting apparatuses and the liquid container. The invention is not limited to the ink jet printer, but the invention is applicable to a laser printer and a toner cartridge performing printing using a recording material such as toner.

Twelfth Modified Example

In the above-described embodiments, the liquid supply unit is an ink cartridge in which a substrate is fixed to the main body of a liquid container, and the substrate is integrated with the main body of the liquid container and is mounted on the holder disposed in the print head unit. However, in the liquid supply unit to which the invention is applied, the cover to which the substrate is fixed and the main body of the liquid container storing a liquid may be mounted separately on the holder. For example, after the cover to which the substrate is fixed is inserted in a predetermined insertion direction and is mounted, the main body of the liquid container is mounted on the holder. In this case, the liquid in the main body of the liquid container is used up, only the main body of the liquid container is replaced and liquid consumption amount information (the liquid consumption count values X and Y) stored in the storage device may be reset when the main body is replaced.

In the above-described embodiments, a liquid containing unit is mounted on the holder of the print head unit and the ink is directly supplied from the ink supply port to the print head. However, the liquid containing unit may be mounted at a position distant from the head in the liquid ejecting apparatus and a liquid may be supplied to the head via a tube connected to the liquid supply port of the liquid containing unit.

Thirteen Modified Example

The following various processes may be used as the process of determining a communication error in the storage device:

(a) a process of providing an error detection code (for example, a parity bit) in data received by the storage device and determining whether there is an error in the received data using the error detection code; and (b) a process of receiving the raw data and data having a logical relationship with the raw data and determining whether the logical relationship is correct.

Fourteen Modified Example

In the above-described embodiments, the plurality of storage devices are connected through the reset signal line LR1, the clock signal line LC1, the data signal line LD1, the first ground line LCS, the first supply line LCV, the first sensor driving signal line LDSN, and the second sensor driving signal line LDSP. However, a part or all of these lines may be omitted except for the data signal line LD1.

Fifteen Modified Example

In the above-described embodiments, a part of the configuration realized by hardware may be replaced by software. In contrast, a part of the configuration realized by software may be replaced by hardware.

The entire disclosure of Japanese Patent Application No. 2009-269527, filed Nov. 27, 2009 is expressly incorporated by reference herein.

What is claimed is:

1. A system comprising:
a plurality of storage devices; and
a controller,
wherein the plurality of storage devices are bus-connected to the controller via one clock signal line and one data signal line,
wherein each of the plurality of storage devices stores identification information in advance to distinguish the storage devices from each other,
wherein the controller transmits data using (i) an identification information transmission period in which one storage device is selected from the plurality of storage devices by transmitting the identification information of the one storage device to the plurality of storage devices via the data signal line from the controller and (ii) a data transmission period in which the data is transmitted to the selected one storage device, and
wherein a frequency of a clock signal during the identification information transmission period is set to be lower than a frequency of the clock signal during the data transmission period.

2. The system according to claim 1, wherein each storage device sets connection with the data signal line to a high impedance state during the data transmission period, when each storage device confirms that the identification information transmitted from the controller during identification information transmission period and the identification information stored in advance are not in accordance with each other.

3. The system according to claim 2, wherein each storage device confirms bit by bit whether the identification information transmitted form the controller is not in accordance with the identification information stored in advance during the identification information transmission period and sets the connection with the data signal line to the high impedance state even during the subsequent identification information transmission period when confirming the identification information transmitted from the controller is not in accordance with the identification information stored in advance.

4. A method of transmitting data between a plurality of storage devices, which is bus-connected to a controller via one clock signal line and one data signal line, and the controller, each of the plurality of storage devices storing identification information in advance to distinguish the storage devices from each other, the method comprising:
  (i) transmitting, by the controller, the identification information of one storage device of the plurality of storage devices to the plurality of storage devices via the data signal line to select the one storage device; and
  (ii) transmitting, by the controller, the data to the selected one storage device,
  wherein a frequency of a clock signal during the identification information transmission period is set to be lower than a frequency of the clock signal during the data transmission period.

* * * * *